United States Patent
Ko et al.

(10) Patent No.: US 10,158,453 B2
(45) Date of Patent: *Dec. 18, 2018

(54) BROADCAST SIGNAL TRANSMITTER/RECEIVER, AND BROADCAST SIGNAL TRANSCEIVING METHOD

(71) Applicant: LG ELECTRONICS INC., Seoul (KR)

(72) Inventors: Woosuk Ko, Seoul (KR); Seoyoung Baek, Seoul (KR); Sangchul Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/706,441

(22) Filed: Sep. 15, 2017

(65) Prior Publication Data

US 2018/0006766 A1 Jan. 4, 2018

Related U.S. Application Data

(63) Continuation of application No. 15/365,821, filed on Nov. 30, 2016, now Pat. No. 9,806,852, which is a
(Continued)

(51) Int. Cl.
*H04L 27/00* (2006.01)
*H04L 1/00* (2006.01)
(Continued)

(52) U.S. Cl.
CPC .......... *H04L 1/0041* (2013.01); *H04H 20/71* (2013.01); *H04L 1/004* (2013.01); *H04L 1/007* (2013.01);
(Continued)

(58) Field of Classification Search
CPC ..... H04L 1/0041; H04L 1/007; H04L 1/0618; H04L 1/004; H04L 1/0071; H04L 5/0053;
(Continued)

(56) References Cited

U.S. PATENT DOCUMENTS 8,009,685 B2 8/2011 Himmanen et al.
9,008,218 B2 4/2015 Ko et al.
(Continued)

FOREIGN PATENT DOCUMENTS

EP 2071795 A1 6/2009
EP 2086193 A2 8/2009
(Continued)

*Primary Examiner* — Dhaval Patel
(74) *Attorney, Agent, or Firm* — Dentons US LLP

(57) ABSTRACT

Disclosed are a broadcast signal transmitter, a broadcast signal receiver, and a method for transceiving a broadcast signal in the broadcast signal transmitter/receiver. A method for transmitting a broadcast signal comprises the following steps: signaling in-band signaling information to at least one of a service component physical layer pipe (PLP) including at least one service component of a broadcast service, a first information PLP including first service information applied to one broadcast service and a second information PLP including second service information applied commonly to a variety of broadcast services; performing the FEC encoding on data included in each PLP; performing time-interleaving on the FEC encoded data; generating a transmission frame including the time-interleaved data; and modulating the transmission frame and transmitting a broadcast signal including the modulated transmission frame.

10 Claims, 38 Drawing Sheets

Related U.S. Application Data continuation of application No. 14/663,144, filed on Mar. 19, 2015, now Pat. No. 9,544,088, which is a continuation of application No. 13/989,254, filed as application No. PCT/KR2011/008913 on Nov. 22, 2011, now Pat. No. 9,008,218.

(60) Provisional application No. 61/416,298, filed on Nov. 23, 2010, provisional application No. 61/418,409, filed on Dec. 1, 2010, provisional application No. 61/420,331, filed on Dec. 7, 2010.

(51) Int. Cl.
*H04L 27/26* (2006.01)
*H04N 21/236* (2011.01)
*H04H 20/71* (2008.01)
*H04N 21/2343* (2011.01)
*H04L 1/06* (2006.01)
*H04L 5/00* (2006.01)

(52) U.S. Cl.
CPC .......... *H04L 1/0071* (2013.01); *H04L 1/0618* (2013.01); *H04L 5/0044* (2013.01); *H04L 5/0053* (2013.01); *H04L 27/2602* (2013.01); *H04L 27/2605* (2013.01); *H04L 27/2613* (2013.01); *H04N 21/23614* (2013.01); *H04N 21/234327* (2013.01); *H04L 5/0023* (2013.01); *H04L 5/0091* (2013.01)

(58) Field of Classification Search
CPC . H04L 5/0044; H04L 27/2602; H04L 5/0023; H04L 5/0091; H04N 21/234327; H04N 21/23614; H04H 20/71
USPC ....... 375/260, 261, 262, 265, 267, 298, 316, 375/340, 343, 346, 347, 350; 370/20, 370/203–210
See application file for complete search history.

(56) References Cited

U.S. PATENT DOCUMENTS

| | | |
|---|---|---|
| 9,544,088 B2 | 1/2017 | Ko et al. |
| 2009/0094356 A1 | 4/2009 | Vare |
| 2009/0103649 A1 | 4/2009 | Vare et al. |
| 2009/0190039 A1 | 7/2009 | Yun et al. |
| 2009/0190677 A1 | 7/2009 | Jokela et al. |
| 2010/0195633 A1 | 8/2010 | Vare et al. |
| 2010/0262708 A1* | 10/2010 | Bouazizi ............ H04N 21/2381 709/231 |
| 2010/0265904 A1 | 10/2010 | Yang et al. |
| 2012/0272117 A1 | 10/2012 | Stadelmeier et al. |

FOREIGN PATENT DOCUMENTS

| | | |
|---|---|---|
| KR | 1020090085515 A | 8/2009 |
| WO | 2009075539 A2 | 6/2009 |
| WO | WO 2009075539 A2 | 6/2009 |

\* cited by examiner

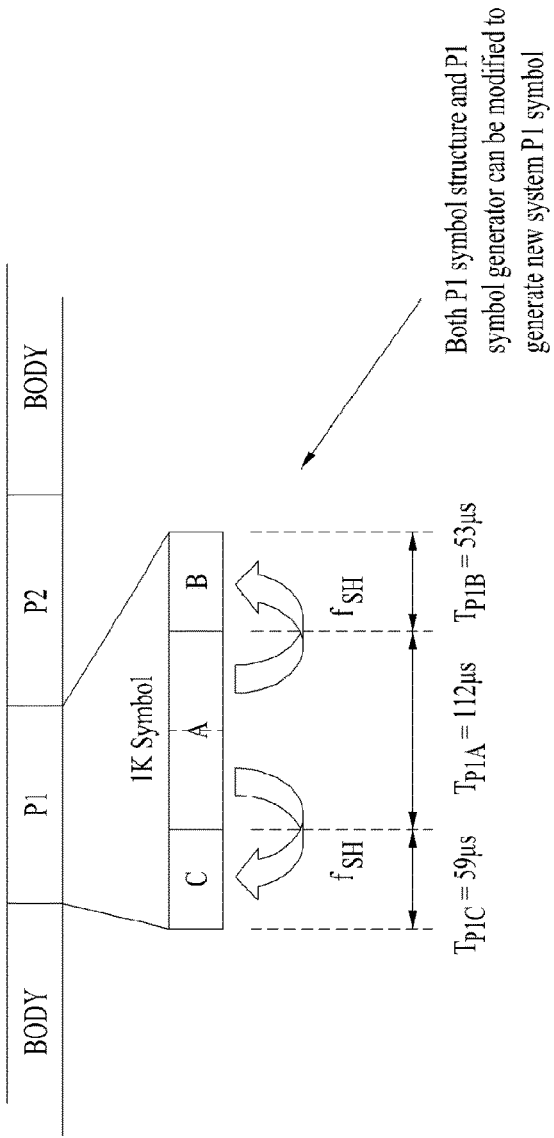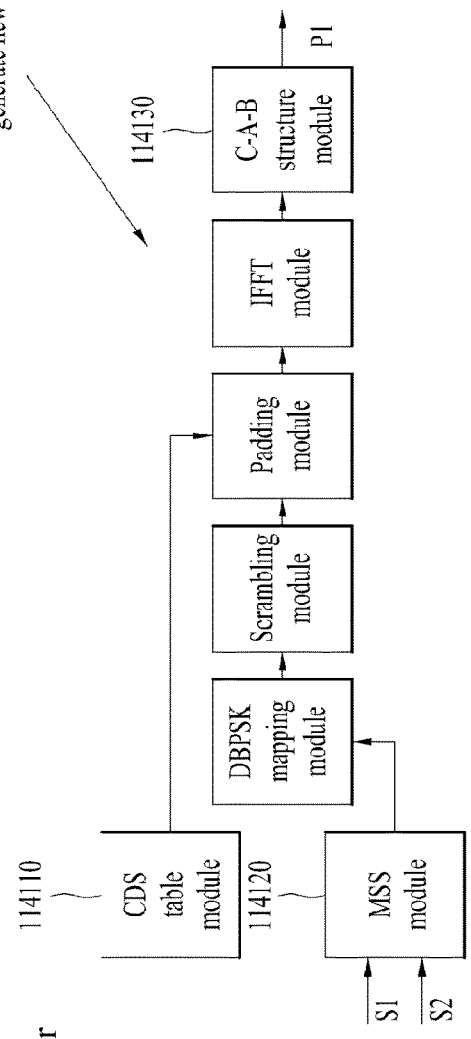
FIG. 5 (A)
P1 symbol structure
FIG. 5 (B)
P1 symbol generator FIG. 9
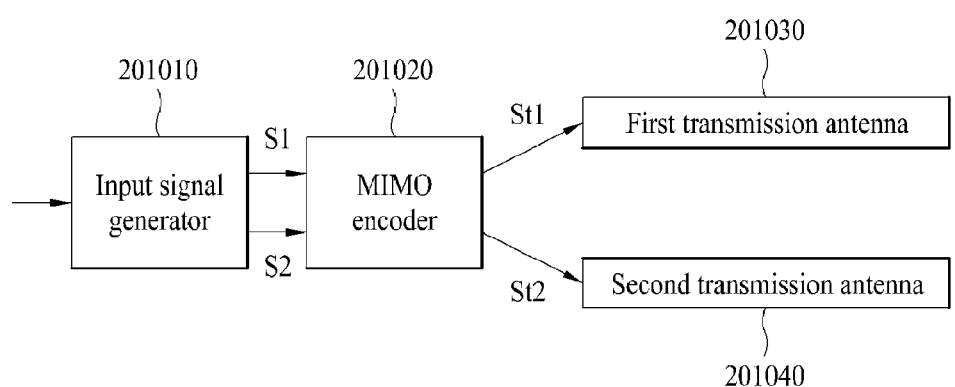
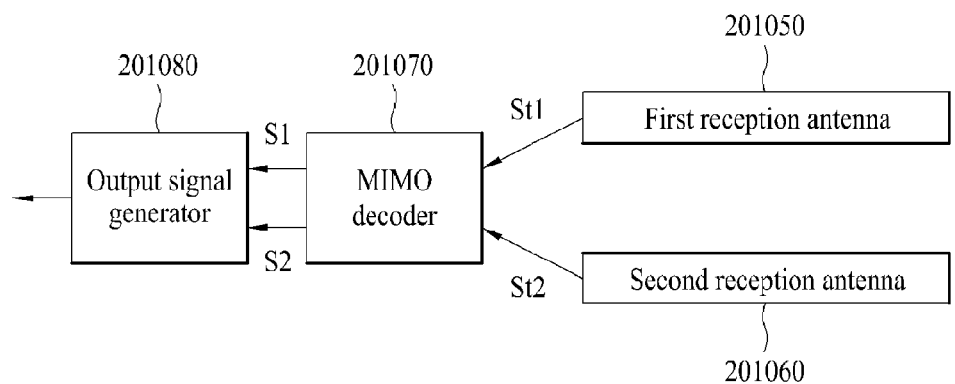

FIG. 32

| Field | Bits |
|---|---|
| IF S2=='xxx1' {<br>   FEF_TYPE<br>   T2_LENGTH<br>} | <br>4<br>3<br> |

FIG. 33

| Field | Bits |
|---|---|
| IF S2=='xxx1' {<br>   FEF_TYPE<br>   FEF_INTERVAL<br>   T2_NUM_DATA_SYMBOLS<br>   T2_FFT_SIZE<br>   T2_GUARD_INTERVAL<br>} | <br>4<br>8<br>12<br>3<br>3<br> |

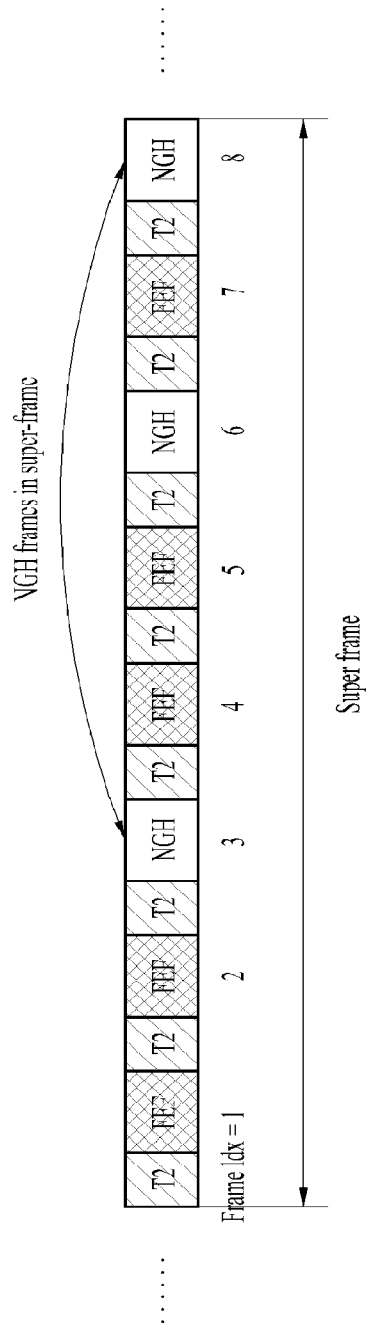
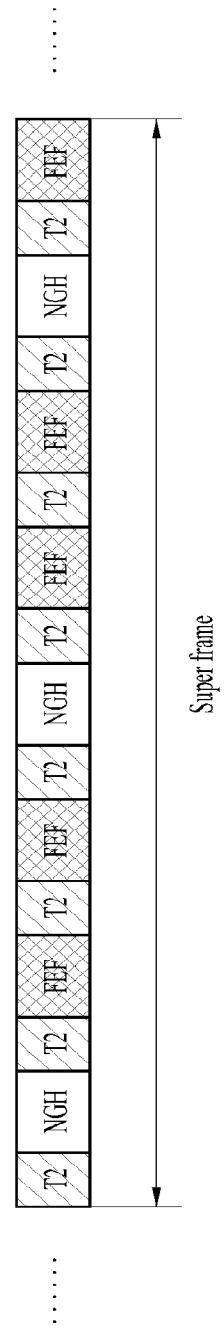
FIG. 38 (A)
FIG. 38 (B)

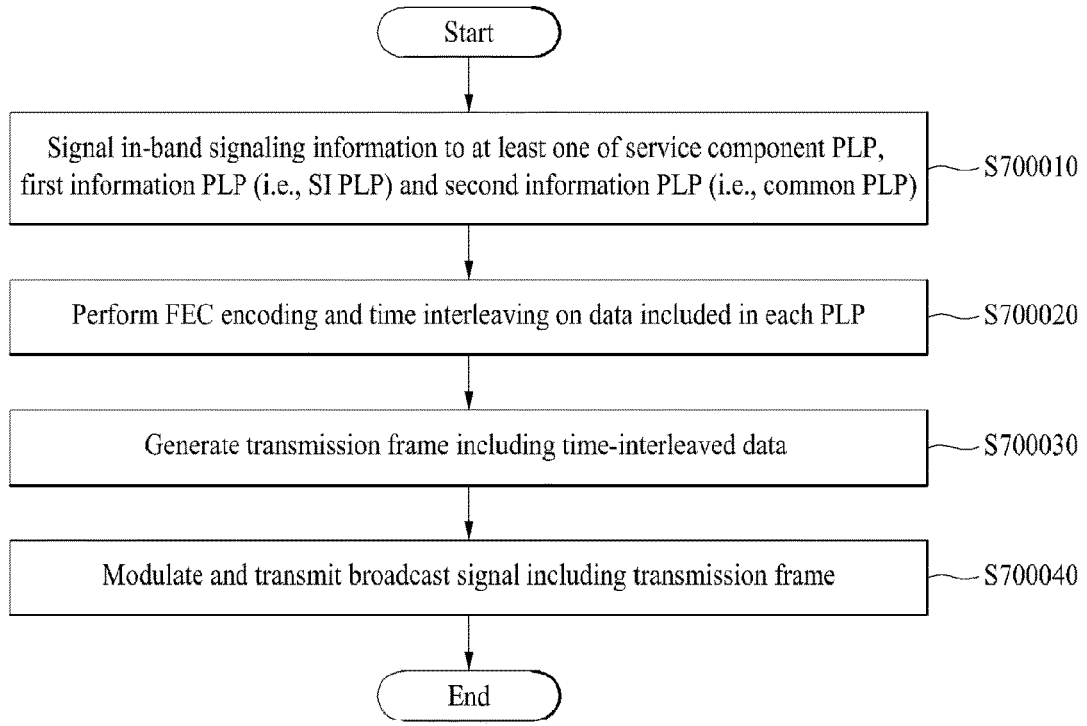

BROADCAST SIGNAL TRANSMITTER/RECEIVER, AND BROADCAST SIGNAL TRANSCEIVING METHOD

This application is a continuation of U.S. patent application Ser. No. 15/365,821 filed Nov. 30, 2016, which is a continuation of U.S. patent application Ser. No. 14/663,144 filed Mar. 19, 2015, now U.S. Pat. No. 9,544,088 issued Jan. 10, 2017, which is a continuation of U.S. patent application Ser. No. 13/989,254 filed May 23, 2013, now U.S. Pat. No. 9,008,218 issued Apr. 14, 2015, which is a National Stage Application of International Application No. PCT/KR2011/008913 filed Nov. 22, 2011, and claims priority to and benefit of U.S. Provisional Application Nos. 61/416,298 filed Nov. 23, 2010, 61/418,409 filed Dec. 1, 2010, and 61/420,331 filed Dec. 7, 2010, all of which are hereby incorporated by reference for all purposes as if fully set forth herein.

TECHNICAL FIELD

The present invention relates to a broadcast signal transmitter/receiver and a method for transmitting and receiving a broadcast signal and more particularly to a broadcast signal transmitter/receiver, which can transmit/receive broadcast signals compatible with a conventional broadcast signal transmitter/receiver while increasing data transmission efficiency, and a method for transmitting and receiving a broadcast signal for the broadcast signal transmitter/receiver.

BACKGROUND ART

As analog broadcasting will soon end, a variety of technologies for transmitting and receiving digital broadcast signals has been developed. Digital broadcast signals can transmit a greater capacity of video/audio data than analog broadcast signals, and can include a variety of optional data in addition to video/audio data.

A digital broadcast system can provide High Definition (HD) images, multi-channel sound, and a variety of optional services. However, data transmission efficiency for high capacity data transmission, robustness of transmitting and receiving networks, and flexibility of networks in consideration of mobile receiving equipment are problems that should still be improved.

DISCLOSURE

Technical Problem

An object of the present invention is to provide transmitter/receiver and transmitting/receiving method for transceiving broadcast signals, which can receive digital broadcast signals without error even under an indoor environment or using mobile receiving equipment.

Another object of the present invention is to provide transmitter/receiver and transmitting/receiving method for transceiving broadcast signals, which can maintain compatibility with a conventional broadcast system in addition to achieving the above described objects.

Yet another object of the present invention is to provide a signaling method of in-band signaling information, transmitter/receiver and transmitting/receiving method for transceiving of in-band signaling information.

Technical Solution

A broadcast signal transmitting method according to an embodiment of the present invention to achieve the above objects includes signaling in-band signaling information to at least one of a service component physical layer pipe (PLP) including at least one service component constituting a broadcast service, a first information PLP including first service information applied to one broadcast service, and a second information PLP including second service information commonly applied to various broadcast services; FEC encoding data included in each of the PLPs; time interleaving the FEC-encoded data; generating a transmission frame including the time-interleaved data; and modulating the transmission frame and transmitting the broadcast signal including the modulated transmission frame.

When a plurality of service component PLPs are present and the plurality of service component PLPs include a base layer service component PLP and an enhancement layer service component PLP, the base layer service component PLP includes in-band signaling information of the enhancement layer service component PLP.

The in-band signaling information includes information regarding a next interleaving frame of each PLP and the interleaving frame is a unit for performing of time interleaving.

A broadcast signal transmitter according to an embodiment of the present invention to achieve the above objects includes an input processor for signaling in-band signaling information to at least one of a service component physical layer pipe (PLP) including at least one service component constituting a broadcast service, a first information PLP including first service information applied to one broadcast service, and a second information PLP including second service information commonly applied to various broadcast services; an FEC encoder for FEC encoding data included in each of the PLPs; a time interleaver for time interleaving the FEC-encoded data; a frame builder for generating a transmission frame including the time-interleaved data; and a modulator for modulating the transmission frame and transmitting a broadcast signal including the modulated transmission frame.

Advantageous Effects

According to the present invention, in a digital broadcast system, it is possible to enhance data transmission efficiency and increase robustness in terms of transmission and reception of broadcast signals, by virtue of provision of a MIMO system.

Further, according to the present invention, in a digital broadcast system, it is possible to decode MIMO receiving signals efficiently using MIMO processing of the present invention even under a diverse broadcast environment.

In addition, according to the present invention, a broadcast system using MIMO of the present invention can achieve the above described advantages while maintaining compatibility with a conventional broadcast system not using MIMO.

Further, according to the present invention, it is possible to provide a method and apparatus for transceiving broadcast signals, which can receive digital broadcast signals without error even under an indoor environment or using mobile reception equipment.

According to the present invention, in-band signaling information is signaled to a service component physical layer pipe (PLP) transmitting data, and thus, the in-band signaling information may have the same robustness as that of data.

According to the present invention, in-band signaling information is signaled to an SI PLP transmitting service information (SI), and thus, in-band signaling robustness unlike in data PLP may be achieved. In addition, by intensively signaling and transmitting the in-band signaling information, frame configuration and common information does not have to be transmitted to all PLPs, thereby reducing signaling overhead.

According to the present invention, in-band signaling information is signaled to a common PLP, and thus, robustness and low overhead unlike in a data PLP may be achieved.

In particular, according to the present invention, in-band signaling information is signaled to at least one of a data PLP, a common PLP, and an SI PLP, and thus, overhead and robustness of the in-band signaling information may be adjusted.

In addition, according to the present invention, when data of both a base layer and an enhancement layer is transmitted using scalable video coding (SVC), in-band signaling information of a base layer and in-band signaling information of an enhancement layer are signaled to base layer service component, and in-band signaling information is not signaled to the enhancement layer service component, and thus, the in-band signaling information of the base and enhancement layer service components may be effectively signaled.

DESCRIPTION OF DRAWINGS

FIG. 5(A) and FIG. 5(B) show a process of generating a P1 symbol in order to perceive an additional frame according to an embodiment of the present invention, FIG. 9 illustrates block diagrams showing a MIMO transmitting/receiving system according to an embodiment of the present invention.

FIG. 32 illustrates a syntax structure for signaling length information of a T2 frame according to an embodiment of the present invention, FIG. 33 illustrates a syntax structure for signaling length information of a T2 frame according to another embodiment of the present invention, FIG. 38(A) and FIG. 38(B) illustrate a method for configurably signaling next NGH frame information according to another embodiment of the present invention, and FIG. 39 illustrates a flowchart of a method of signaling and transmitting in-band signaling information by a broadcast signal transmitter according to the present invention.

BEST MODE

Figure 1:
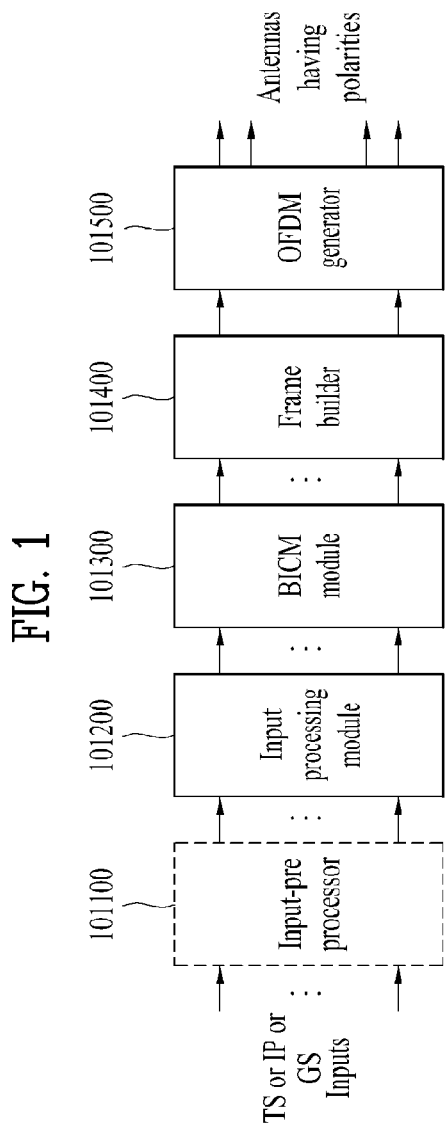
FIG. 1 illustrates a block diagram showing a broadcast signal transmitter using a MIMO method according to an embodiment of the present invention.

Hereinafter, although the preferred embodiments of the present invention will be described in detail with reference to the accompanying drawings and contents as described with relation to the accompanying drawings, it is to be understood that the present invention is not limited to the embodiments.

Various technologies have been introduced to increase transmission efficiency and to perform robust communication in a digital broadcast system. One of such technologies is a method of using a plurality of antennas at a transmitting side or a receiving side. This method may be classified into a Single-Input Single-Output (SISO) scheme in which transmission is performed through a single antenna and reception is performed through a single antenna, a Single-Input Multi-Output (SIMO) scheme in which transmission is performed through a single antenna and reception is performed through multiple antennas, a Multi-Input Single-Output (MISO) scheme in which transmission is performed through multiple antennas and reception is performed through a single antenna, and a Multi-Input Multi-Output (MIMO) scheme in which transmission is performed through multiple antennas and reception is performed through multiple antennas. Although the multiple antennas may be exemplified by 2 antennas for ease of explanation in the following description, the description of the present invention may be applied to systems that use 2 or more antennas.

The SISO scheme corresponds to a general broadcast system that uses 1 transmission antenna and 1 reception antenna. The SIMO scheme corresponds to a broadcast system that uses 1 transmission antenna and a plurality of reception antennas.

The MISO scheme corresponds to a broadcast system that uses a plurality of transmission antennas and 1 reception antenna to provide transmit diversity. An example of the MISO scheme is an Alamouti scheme. In the MISO scheme, it is possible to receive data through 1 antenna without performance loss. Although a reception system can receive the same data through a plurality of reception antennas in order to improve performance, this case will be described as belonging to MISO cases in this specification.

The MIMO scheme corresponds to a broadcast system that uses a plurality of transmission antennas and a plurality of reception antennas to provide transmission/reception diversity and high transmission efficiency. In the MIMO scheme, it may be possible to achieve diversity effects and high transmission efficiency by processing signals in temporal and spatial dimensions in different ways and transmitting a plurality of data streams through parallel paths that simultaneously operate in the same frequency band.

The performance of a system that employs the MIMO technology depends on characteristics of a transmission channel. The efficiency of such a system is high, especially, when the system has independent channel environments. That is, the performance of the system that employs the MIMO technology may improve when channels of all antennas ranging from antennas of the transmitting side and antennas of the receiving side are independent channels that have no correlation to each other. However, in a channel environment in which the correlations between channels of transmission and reception antennas are very high as in a line-of-sight (LOS) environment, the performance of the system that employs the MIMO technology may be significantly reduced or the system may not be able to operate.

In addition, if the MIMO scheme is applied to a broadcast system that uses the SISO and MISO schemes, it is possible to increase data transmission efficiency. However, in addition to the above problems, there is a need to maintain compatibility to allow a receiver having a single antenna to receive services. Accordingly, the present invention suggests a method for solving such existing problems.

In addition, the present invention can provide a broadcast signal transmitter/receiver and a broadcast transmission and reception method for a conventional terrestrial broadcast system and a system that can transmit and receive additional broadcast signals (or enhanced broadcast signals), for example, mobile broadcast signals, while sharing an RF frequency band with a terrestrial broadcast system such as DVB-T2.

To accomplish this, in the present invention, it is possible to use a video coding method having scalability in which a basic video component which has low image quality although it is robust to a communication environment and an extended video component which is slightly weak to a communication environment although it can provide a high-quality image can be distinguishably transmitted. Although the present invention will be described with reference to SVC as a video coding method having scalability, the present invention may be applied to any other video coding methods. Embodiment of the present invention will be described in more detail with reference to the drawings.

A broadcast signal transmitter and receiver of the present invention can perform MISO processing and MIMO processing on a plurality of signals that are transmitted and received through a plurality of antennas. The following is a description of a broadcast signal transmitter and receiver that performs signal processing on 2 signals that are transmitted and received through 2 antennas.

FIG. 1 illustrates a broadcast signal transmitter using the MIMO scheme according to an embodiment of the present invention.

As shown in FIG. 1, the broadcast signal transmitter according to the present invention may include an input pre-processor 101100, an input processing module 101200, a Bit Interleaved Coded Modulation (BICM) encoder 101300, a frame builder 101400, and an Orthogonal Frequency-Division Multiplexing (OFDM) generator (or transmitter) 101500. The broadcast signal transmitter according to the present invention may receive at least one of MPEG-TS streams, Internet Protocol (IP) streams, and a General Stream Encapsulation (GSE) streams (or GS streams).

The input processor 101100 generates one or multiple PLPs (physical layer pipes) on a service basis (or a service component basis) in order to give robustness to a plurality of input streams, i.e., MPEG-TS streams or IP streams or GSE streams.

A PLP is data (or stream) unit that is identified in the physical layer. Specifically, a PLP is data having the same physical layer attribute which is processed in the transmission path and may be mapped on a cell by cell basis in a frame. In addition, a PLP may be considered a physical layer Time Division Multiplexing (TDM) channel that carries one or a plurality of services. Specifically, a path through which such a service is transmitted is transmitted or a stream identifiable in the physical layer which is transmitted through the path is referred to as a PLP.

In the present invention, one service may be transmitted to one PLP, and components configuring a service may be divided (or differentiated), so that each of the differentiated components can be transmitted to a different PLP. If service components configuring a single service are differentiated from one another so as to be respectively transmitted to a different PLP, the receiver may gather (or collect) the multiple components, so as to combine the collected components to a single service. In the present invention, the service component and the component will be used to have the same meaning.

Thereafter, the input processing module 101200 may generate a Base Band (BB) frame including a plurality of generated PLPs. The BICM module 101300 may add redundancy to the BB frame to correct an error in a transmission channel and may interleave PLP data included in the BB frame.

The frame builder 101400 may accomplish a transmission frame structure by mapping the plurality of PLPs to a transmission frame and adding signaling information thereto. The OFDM generator 101500 may modulate input data from the frame builder 101400 according to OFDM to divide the input data into a plurality of paths such that the input data is transmitted through a plurality of antennas.

Figure 2:
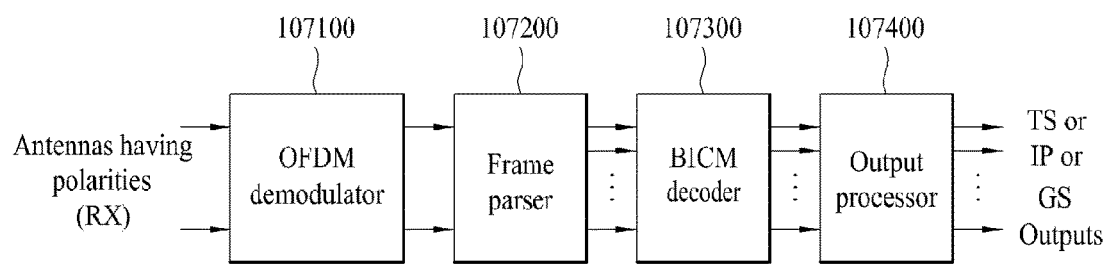
FIG. 2 illustrates a block diagram showing a broadcast signal receiver according to an embodiment of the present invention.

FIG. 2 illustrates a broadcast signal receiver according to an embodiment of the present invention.

As shown in FIG. 2, the broadcast signal receiver may include an OFDM demodulator 107100, a frame parser (demapper) 107200, a BICM decoder 107300, and an output processor 107400. The OFDM demodulator 107100 may convert signals received through a plurality of reception antennas into signals in the frequency domain. The frame parser 107200 may output PLPs for a necessary service from among the converted signals. The BICM decoder 107300 may correct an error generated according to a transmission channel. The output processor 107400 may perform procedures necessary to generate at least one of output TS, IP, and GS streams. Here, input antenna signals may be received as dual polarity signals and at least one of output TS, IP, GS streams may be output as one or more streams.

Figure 3:
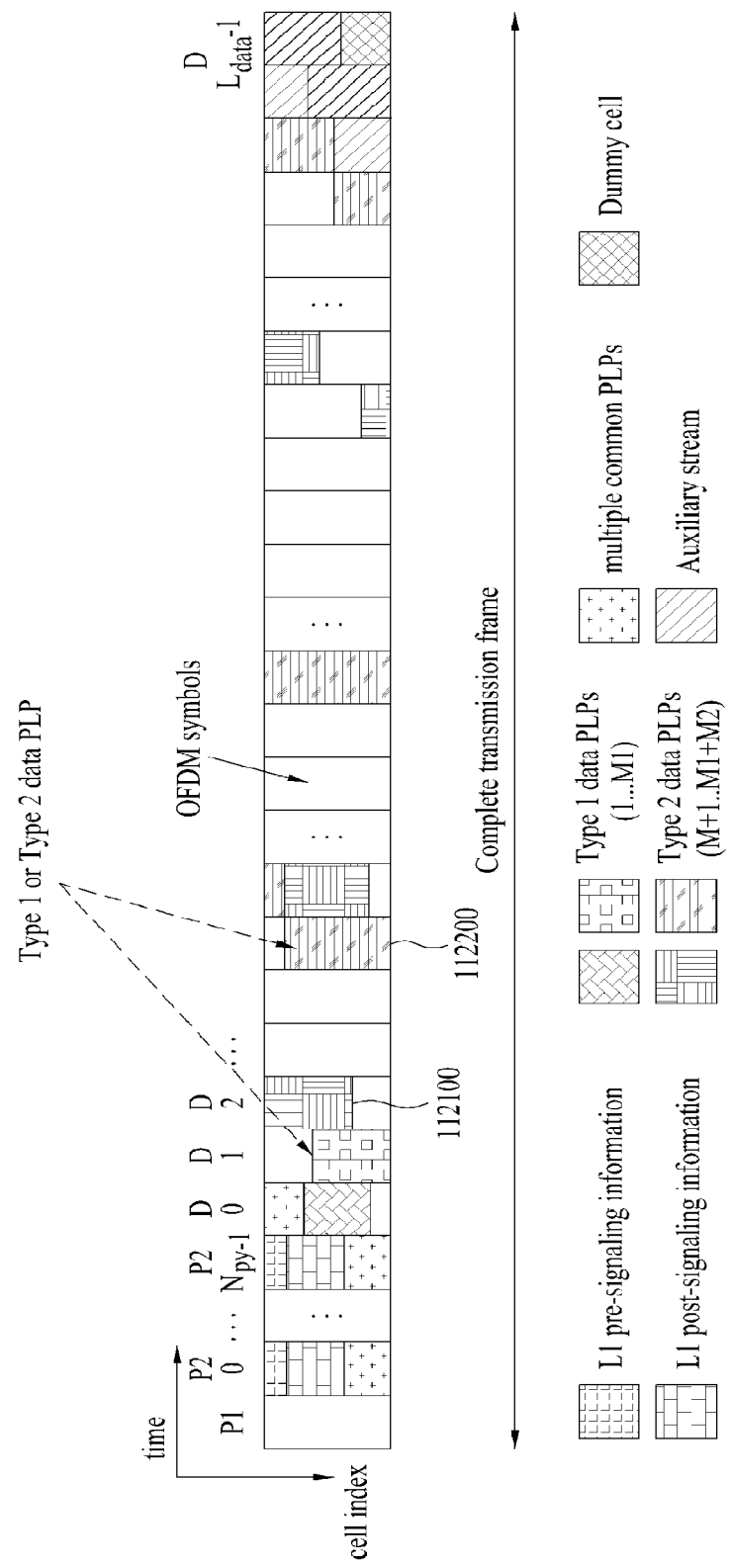
FIG. 3 shows an additional frame structure based on PLP according to an embodiment of the present invention.

FIG. 3 illustrates an additional frame structure based on PLP according to an embodiment of the present invention.

As shown in FIG. 3, a frame according to an embodiment of the present invention may include a preamble area and a data area. The preamble area may include a P1 symbol and a P2 symbol and the data area may include a plurality of data symbols. The P1 symbol may transmit P1 signaling information and P2 symbol may transmit L1-signaling information.

In this case, a preamble symbol may be additionally allocated to the preamble. This additional preamble symbol is referred to as an Additional Preamble 1 (AP1). In an embodiment of the present invention, one or more AP1 symbols may be added to a frame in order to improve detection performance of a mobile broadcast signal under very low SNR or time-selective fading conditions. AP1 signaling information transmitted through the AP1 symbol may include an additional transmission parameter.

AP1 signaling information according to an embodiment of the present invention includes pilot pattern information in a frame. Thus, according to an embodiment of the present invention the broadcast signal receiver does not transmit P2 symbol, if L1 signaling information is spread in data symbols of the data area, pilot pattern information can be discovered by using the AP1 signaling information before L1 signaling information in the data area is decoded.

Also, if the L1-signaling information in the data area of a frame is spread, AP1 signaling information can include information necessary for the broadcast signal receiver to decode signaling information spread in a frame of the data area. According to the present invention, a preamble area of a frame includes a P1 symbol, more than one AP1 symbols, and more than one P2 symbols. And the data area comprises a plurality of data symbols, also known as data OFDM symbol. A P2 symbol is optional and whether it is inserted is determined by signaling AP1 signaling information through AP1 symbols according to an embodiment of the present invention.

In an embodiment of the present invention, a P1 insertion module in the OFDM generator OFDM generator 101500 of the broadcast signal transmitter may insert the P1 symbol and the AP1 symbol into every symbol. That is, the P1 insertion module may insert 2 or more preamble symbols into every frame. In another embodiment, an AP1 insertion module may be added downstream of (or next to) the P1 insertion module and the AP1 insertion module may insert the AP1 symbol. If 2 or more preamble symbols are used as in the present invention, there are advantages in that robustness to burst fading that may occur in a mobile fading environment is further increased and signal detection performance is also improved.

The P1 symbol may transmit P1 signaling information associated with a basic transmission parameter and transmission type and a corresponding preamble identifier and the receiver may detect the frame using the P1 symbol. A plurality of P2 symbols may be provided and may carry L1 signaling information and signaling information such as a command PLP. The L1 signaling information may include L1-pre signaling information and L1-post signaling information. Herein, the L1-pre signaling information includes information required by the receiver to receive and decode L1-post signaling information. And, the L1-post signaling information includes parameters required by the receiver for accessing the PLP. The L1-post signaling information may be located next to the L1-pre signaling information as shown in FIG. 3.

The L1-post signaling information may include a configurable block (or configurable L1-post signaling information), a dynamic block (or dynamic L1-post signaling information), an extension block, a Cyclic Redundancy Check (CRC) block, and an L1 padding block.

The configurable block may include information that may be equally applied to one frame and the dynamic block may include specific information corresponding to a currently transmitted frame.

The extension block may be a block that can be used when the L1-post signaling information is extended and the CRC block may include information items used for error correction of the L1-post signaling information and may have a size of 32 bits. When the L1-post signaling information is separately transmitted through a number of encoding blocks, the padding block may be used to match the size of information included in each encoding block and the size thereof may be variable.

The common PLP may include network information such as a Network Information Table (NIT), PLP information, and service information such as a Service Description Table (SDT) or an Event Information Table (EIT). The preamble of the present invention may include only the P1 symbol, the L1-pre signaling information, and the L1-post signaling information or may include all of the P1 symbol, the L1-pre signaling information, the L1-post signaling information, and the common PLP according to designer intention. A plurality of data symbols located next to the P1 symbol may include a plurality of PLPs. The plurality of PLPs may include audio, video, and data streams and PSI/SI information such as a Program Association Table (PAT) and a Program Map Table (PMT). In the present invention, a PLP that transmits actual data such as audio, video, and data streams may be referred to as a data PLP. Furthermore, in the present invention, a PLP that includes service information (SI) required to decode the data PLP by the receiver may be referred to as a base PLP (or a signaling PLP or an SI PLP or an anchor PLP). The SI may include PAT, PMT and so on. In addition, the PLPs may include a type-1 PLP that is transmitted through one sub-slice per frame and a type-2 PLP that is transmitted through two subslices per frame. One data PLP may transmit one service and may also transmit at least one service component included in one service. When the PLPs transmit service components, the transmitting side may transmit signaling information which indicates that the PLPs transmit service components.

In addition, additional data (or an enhanced broadcast signal) in addition to basic data may be transmitted through a specific PLP while sharing an RF frequency band with the conventional terrestrial broadcast system according to an embodiment of the present invention. In this case, the transmitting side may define a system or a signal that is currently transmitted through signaling information of the P1 symbol described above. The following description is given with reference to the case in which the additional data is video data. That is, as shown in FIG. 3, PLP M1 112100 and PLP (M1+M2) 112200 which are type 2 PLPs may be transmitted while including additional video data. In addition, in the present invention, a frame that transmits such additional video data may be referred to as an additional frame (or an FEF part) and a frame that transmits basic data may be referred to as a basic frame (or T2 frame).

In addition, a frame that can transmit not only additional data but also data associated with a new broadcast system different from the conventional terrestrial broadcast system may be referred to as an additional frame. In this case, a frame that transmits a conventional terrestrial broadcast may be referred to as a terrestrial broadcast frame (or T2 frame) and an additional frame may transmit additional data or basic data associated with the new broadcast system.

In the present invention, a super frame may be configured of multiple T2 frames (or referred to as a terrestrial broadcasting frames) and multiple non-T2 frames (or additional frames) for an additional broadcast signal. The non-T2 frames may include FEF (Future Extension Frame) parts. The FEF parts are not consecutive and may be inserted in-between the T2 frames. The additional broadcast signal may be included in the T2 frame or FEF part, thereby being transmitted. Hereinafter, the FEF part and the FEF will be used as the same meaning. When the present invention transmits a mobile broadcast signal through the FEF, such FEF will be referred to as a Next Generation Handheld (NGH) frame. A signal frame used in the present invention can became any one of the T2 frame, the FEF and the NGH frame.

Figure 4:
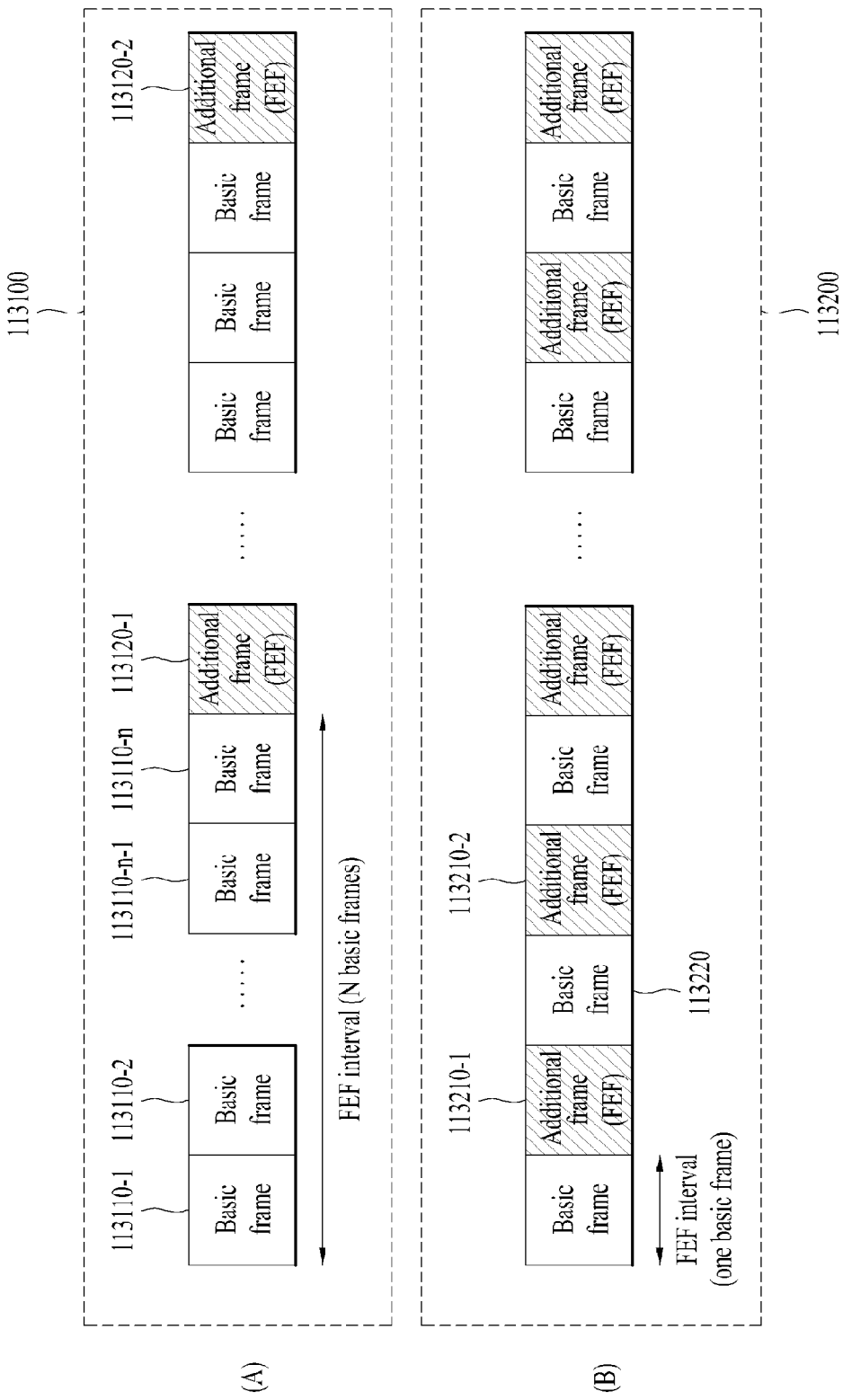
FIG. 4 shows an additional frame structure based on FEF according to an embodiment of the present invention.

FIG. 4 illustrates a structure of an additional frame based on FEF according to an embodiment of the present invention.

Specifically, FIG. 4 shows the case in which a Future Extension Frame (FEF) is used in order to transmit additional broadcast signals. In the present invention, a frame that transmits basic broadcast signals may be referred to as a basic frame and an FEF that transmits additional broadcast signals may be referred to as an additional frame.

FIG. 4 shows structures of superframes 113100 and 113200 in each of which a basic frame and an additional frame are multiplexed. Frames 113100-1 to **113100-*n* that are not shaded from among frames included in the superframe 113100 are basic frames and shaded frames 113120-1 and 113120-2** are additional frames.

FIG. 4(A) shows the case in which the ratio of basic frames to additional frames is N:1. That is, one additional frame is transmitted every N basic frames. In this case, the time required for the receiver to receive a next additional frame 113120-2 after receiving one additional frame 113120-1 may correspond to N basic frames.

FIG. 4(B) shows the case in which the ratio of basic frames to additional frames is 1:1. That is, the basic frame and the additional frame are alternately transmitted. In this case, the proportion of additional frames in the superframe 113200 may be maximized and therefore the additional frames may have a structure very similar to that of the basic frames in order to maximize the extent of sharing with the basic frames. In addition, in this case, the time required for the receiver to receive a next additional frame 113210-2 after receiving one additional frame 113210-1 corresponds to 1 basic frame 113220 and therefore the superframe period is shorter than that of FIG. 4(A).

FIGS. 5(A) and 5(B) illustrate a P1 symbol generation procedure for identifying additional frames according to an embodiment of the present invention.

In the case in which additional video data is transmitted through additional frames which are distinguished from basic frames as shown in FIG. 4, there is a need to transmit additional signaling information for enabling the receiver to identify and process an additional frame. An additional frame of the present invention may include a P1 symbol for transmitting such additional signaling information and the P1 symbol may be referred to as a new_system_P1 symbol. This new_system_P1 symbol may be different from a P1 symbol that is used in a conventional frame and a plurality of new_system_P1 symbols may be provided. In an embodiment, the new_system_P1 symbol may be located before a first P2 symbol in a preamble area of the frame.

In the present invention, a P1 symbol of a conventional frame may be modified and used to generate the minimum Hamming distance. The present invention suggests a method in which a minimum Hamming distance is generated by modifying the structure of the P1 symbol of the conventional frame or is generated by changing the symbol generator 114100 that generates symbols.

FIG. 5(A) shows the structure of the P1 symbol of the conventional frame. In the present invention, the structure of the P1 symbol of the conventional frame shown in FIG. 5(A) may be modified to generate a minimum Hamming distance. In this case, the minimum Hamming distance may be generated by changing a frequency displacement f_SH for the prefix and postfix of the conventional P1 symbol or changing the length (specifically, the size of T_P1C or T_P1B) of the P1 symbol. However, in the case in which the minimum Hamming distance is generated by modifying the structure of the P1 symbol, there is a need to appropriately modify parameters (the sizes of T_P1C and T_P1B and f_SH) used in the P1 symbol structure.

FIG. 5(B) shows the P1 symbol generator that generates P1 symbols. In the present invention, the P1 symbol generator shown in FIG. 5(B) may be modified to generate a minimum Hamming distance. In this case, a minimum Hamming distance may be generated using a method which changes the distribution of active carriers used for a P1 symbol in a CDS table module 114110, an MSS module 114120, and a C-A-B structure module 114130 included in the P1 symbol generator (for example, a method in which the CDS table module 114110 uses a different Complementary Set of Sequence (CSS)) or a method which changes a pattern for information that is transmitted through a P1 symbol (for example, a method in which the MSS module 114120 uses a different Complementary Set of Sequence (CSS)).

In addition, the AP1 symbol of the present invention described above with reference to FIG. 3 may be generated through the procedure described above with reference to FIG. 5.

In addition, the present invention proposes a MIMO system using scalable video coding (SVC). SVC is a video coding method developed to cope with a variety of terminals and communication environments and variations in the terminals and communication environments. SVC can code a video hierarchically such that desired definition is generated and transmit additional video data having a base layer from which video data about an image having basic definition can be restored and an enhancement layer from which an image having higher definition can be restored. Accordingly, a receiver can acquire the basic definition image by receiving and decoding only the video data of the base layer, or obtain the higher definition image by decoding the video data of the base layer and the video data of the enhancement layer according to characteristics thereof. In the following description, the base layer can include video data corresponding to the base layer and the enhancement layer can include video data corresponding to the enhancement layer. In the following, video data may not be a target of SVC, the base layer can include data capable of providing a fundamental service including basic video/audio/data corresponding to the base layer, and the enhancement layer can include data capable of providing a higher service including higher video/audio/data corresponding to the enhancement layer.

The present invention proposes a method of transmitting the base layer of SVC through a path through which signals can be received according to SISO or MISO using SVC and transmitting the enhancement layer of SVC through a path through which signals can be received according to MIMO in the broadcast system of the present invention. That is, the present invention provides a method by which a receiver having a single antenna acquires an image with basic definition by receiving the base layer using SISO or MISO and a receiver having a plurality of antennas acquires an image with higher definition by receiving the base layer and the enhancement layer using MIMO.

A description will be given of a method of transmitting the MIMO broadcast data including the base layer and the enhancement layer in association with terrestrial broadcast frames for transmitting terrestrial broadcast signals.

(1) Method of Transmitting MIMO Broadcast Data Using Predetermined PLP

It is possible to transmit the MIMO broadcast data included in a predetermined PLP while distinguishing the predetermined PLP from a PLP including terrestrial broadcast data. In this case, the predetermined PLP is used to transmit the MIMO broadcast data, and signaling information for describing the predetermined PLP may be additionally transmitted to prevent an error in the conventional receiving system. In the following, the predetermined PLP including the MIMO broadcast data may be referred to as a MIMO broadcast PLP and the PLP including the terrestrial broadcast data may be referred to as a terrestrial broadcast PLP.

As MIMO broadcast data may not be implemented in a terrestrial broadcast receiver, it is necessary to have additional information for signaling to distinguish terrestrial PLP and MIMO broadcast PLP. In this case, signaling can use a reserved field in the L1 signaling information of the terrestrial broadcast system. When a plurality of antenna is used for transmitting MIMO broadcast data on the transmitting side, the terrestrial broadcast data can be transmitted by MISO. The present invention, in order to perceive PLP, utilizes L1-post signaling information.

(2) Method of Transmitting MIMO Broadcast Data Using Predetermined Frame

It is possible to include the MIMO broadcast data generated as described above in a predetermined frame and to transmit the predetermined frame including the MIMO broadcast data while distinguishing the predetermined frame from a terrestrial broadcast frame. In this case, the predetermined frame is used to transmit the MIMO broadcast data, and signaling information for describing the predetermined frame may be additionally transmitted to prevent an error in the conventional receiving system. Hereinafter, the predetermined frame transmitting MIMO broadcast data may by referred to as an MIMO broadcast frame and a frame including terrestrial broadcast data may be referred to as a terrestrial broadcast frame. Moreover, the MIMO broadcast frame may be included in the FEF of the terrestrial broadcast system and, in this case, the FEF may be referred to as the MIMO broadcast frame.

(3) Method of Transmitting MIMO Broadcast PLP Using Terrestrial Broadcast Frame and MIMO Broadcast Frame PLPs including MIMO broadcast data may be transmitted through a terrestrial broadcast frame and a MIMO broadcast frame. Since a MIMO broadcast PLP may be present in the terrestrial broadcast frame (or basic frame), distinguished from the above-mentioned embodiments, it is necessary to signal the connection relationship between connected PLPs present in the terrestrial broadcast frame and the MIMO broadcast frame. To achieve this, the MIMO broadcast frame may also include L1 signaling information, and information about the MIMO broadcast PLP present in the broadcast frame may be transmitted along with L1 signaling information of the terrestrial broadcast frame.

MIMO broadcast PLP data in different frames are connected by using PLP fields including L1-post signaling information. According to an embodiment of the present invention, the receiving system includes as L1-post signaling information PLP_ID information, PLP+TYPE information, PLP_PAYLOAD_TYPE information, PLP_GROYP_ID information, uses those information to check the PLP connection between MIMO broadcast PLP data. It then acquires services by continuously decoding desired MIMO broadcast PLP data.

The terrestrial broadcast PLP in the terrestrial broadcast frames can be transmitted as a preset mode and also as mentioned a new mode to support the MIMO system can be transmitted. According to an embodiment of the present invention, the MIMO broadcast PLP in the terrestrial broadcast frames as a base layer can be transmitted by MISO or SISO method and MIMO broadcast PLP in MIMO broadcast frames as an enhancement layer can be transmitted by the MIMO method.

Figure 6:
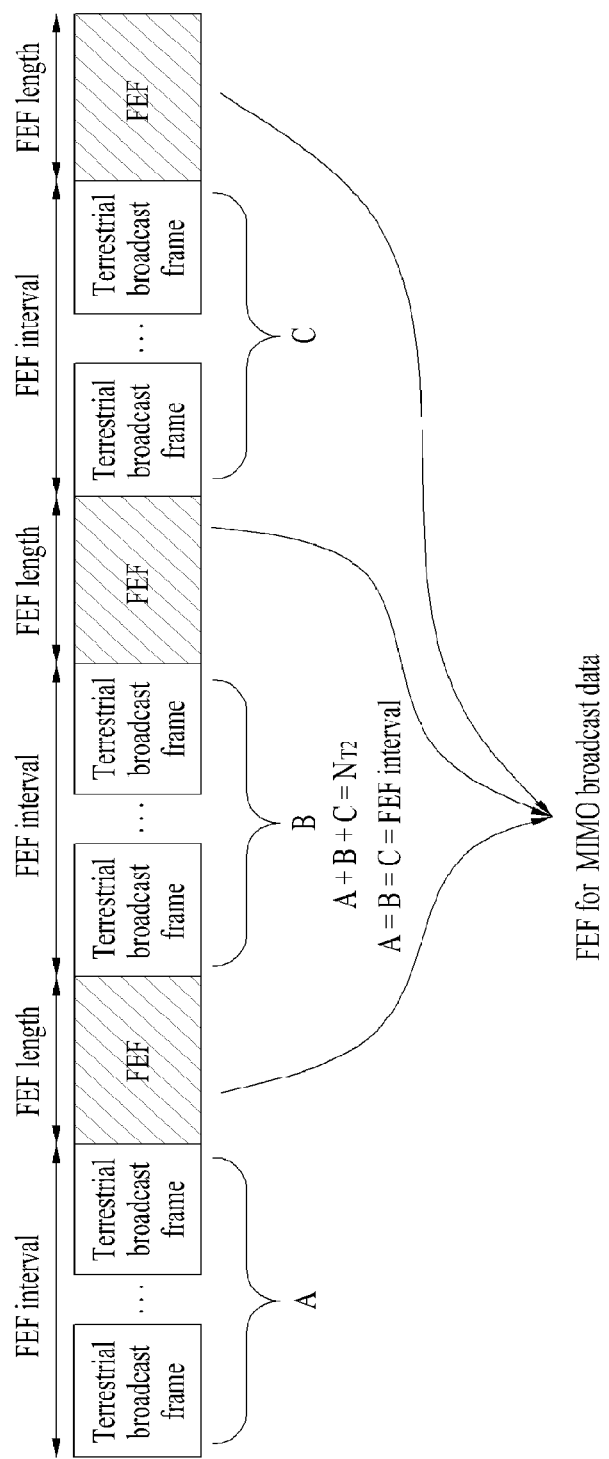
FIG. 6 shows a conceptual diagram of a broadcast signal transmitting method according to an embodiment of the present invention.

FIG. 6 is a conceptual diagram of a method of transmitting a broadcast signal according to an embodiment of the present invention.

As illustrated in FIG. 6, terrestrial broadcast data and MIMO broadcast data may be distinctively transmitted in frame units. MIMO broadcast frames (FET) having a predetermined length (an FEF length) may be arranged between terrestrial broadcast frames at a predetermined interval (an FEF interval). In this case, MIMO system data may coexist in a frequency band used by a terrestrial broadcast system, and a terrestrial broadcast receiver may identify a frame through L1 signaling and ignore MIMO broadcast frames to prevent malfunction. In this case, a MIMO system according to an embodiment of the present invention may use some of throughput of a corresponding band through FEF related parameters such as FEF_TYPE, FEF_LENGTH, and FEF_INTERVAL defined in L1 post signaling information of the terrestrial broadcast system.

Figure 7:
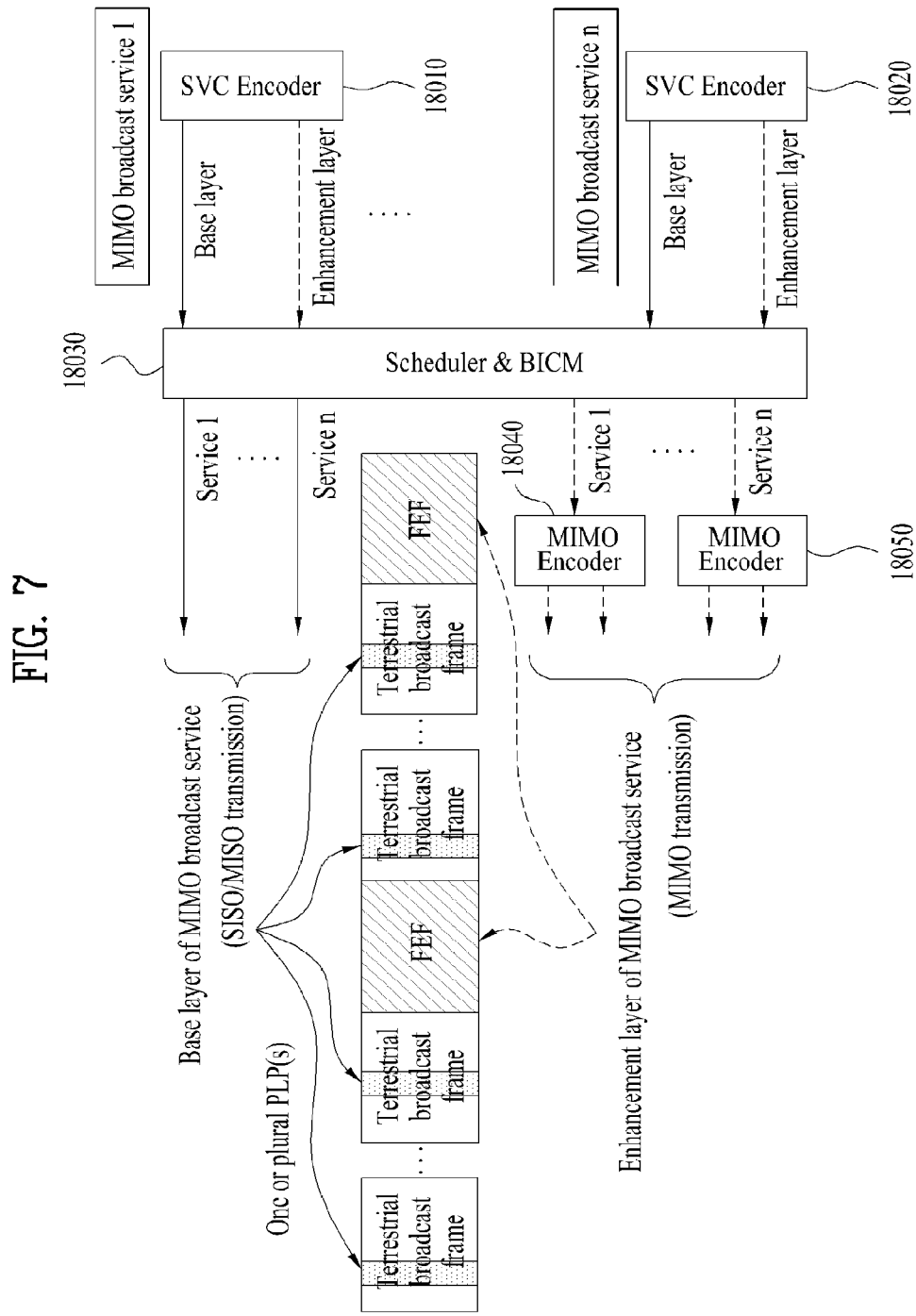
FIG. 7 shows a conceptual diagram of a broadcast signal transmitting method according to another embodiment of the present invention.

FIG. 7 is a conceptual diagram of a method of transmitting a broadcast signal according to another embodiment of the present invention.

FIG. 7 illustrates an embodiment of transmitting the broadcast signal of the MIMO broadcast system in the terrestrial broadcast system, as described with regard to the aforementioned method (3). MIMO broadcast services (MIMO broadcast services 1 to n) are encoded in base layers and enhancement layers through SVC encoders 18010 and 18020. A scheduler & Bit Interleaved Coding and Modulation (BICM) module 18030 may allocate the MIMO broadcast services to n so as to transmit the base layers of the MIMO broadcast services 1 to n together with terrestrial broadcast frames and to transmit the enhancement layers added to the MIMO broadcast frame. The enhancement layers may be MIMO encoded through MIMO encoders 18040 and 18050 and may be transmitted to the MIMO broadcast frames of the MIMO broadcast system. The base layers may be contained in the terrestrial broadcast frames and may be transmitted together. In this case, the base layers may be transmitted using the SISO or MISO scheme supported by the terrestrial broadcast system.

Likewise, when the broadcast signal including the terrestrial broadcast frames and the MIMO broadcast frames are transmitted, since signaling information is constructed as described with regard to the aforementioned methods (1) to (3), the terrestrial broadcast receiver may identify only a terrestrial broadcast PLP from the terrestrial broadcast frames, and thus, may acquire and provide a terrestrial broadcast service without malfunction. In addition, the MIMO broadcast receiver may acquire and provide a MIMO broadcast service corresponding to the base layers using only a MIMO broadcast PLP of the terrestrial broadcast frame, and acquire a MIMO broadcast PLP of the terrestrial broadcast frames and a MIMO broadcast PLP of the MIMO broadcast frames to acquire and provide a MIMO broadcast service corresponding to the base and enhancement layers.

The MIMO broadcast PLP included in the terrestrial broadcast frame may be transmitted using only MISO/SISO schemes. In this case, the MIMO broadcast PLP may include a code rate (e.g., 1/4, 1/3, 2/5, etc.) of a new error correction code, a new time interleaving mode, etc. and may transmit only the base layers according to system request.

The MIMO broadcast PLP included in the MIMO broadcast frames may include PLP corresponding to the SISO, MISO, or MIMO scheme. In this case, a carrier or PLP corresponding to the SISO/MISO schemes may transmit the base layer and a carrier or PLP corresponding to the MIMO scheme may transmit the enhancement layer. A rate of the carrier or PLP of the SISO/MISO schemes or the carrier or PLP of the MIMO scheme may vary from 0 to 100% and may be differently determined in frame units.

Figure 8:
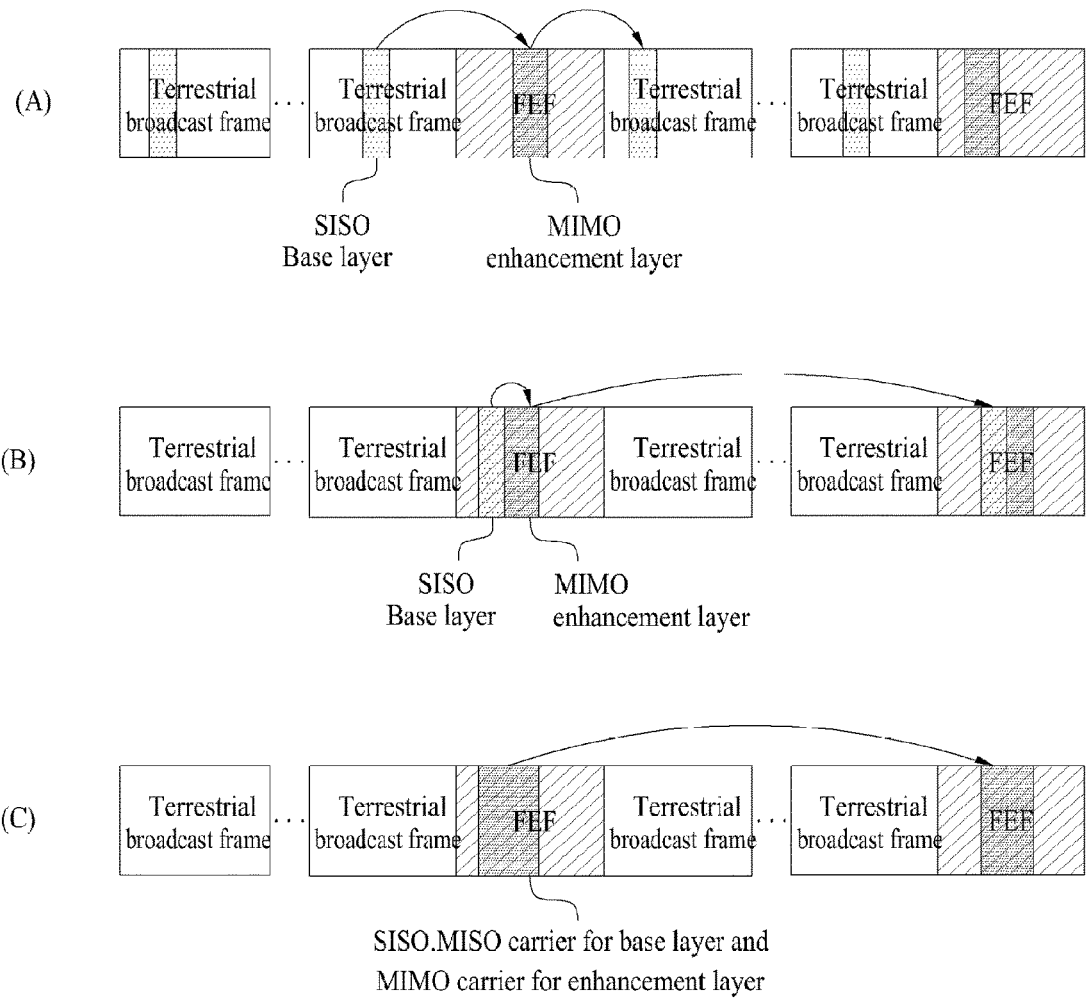
FIG. 8 shows a broadcast signal transmitted by a terrestrial broadcast system that a MIMO system is applied using SVC according to an embodiment of the present invention.

FIG. 8 shows broadcast signals transmitted by a broadcast system being applied by a MIMO system using a SVC.

FIG. 8 shows a broadcast signal that allocates terrestrial data and MIMO broadcast data to a frame or PLP by using the SVC and generating a base and enhancement layer.

FIG. 8(A) shows a broadcast signal transmitted by a broadcast system being applied by a MIMO transmitting system by using the SVC.

The broadcast system in FIG. 8(A) transmits broadcast signals including a terrestrial broadcast frame and MIMO broadcast frame. The MIMO broadcast PLP in FIG. 8(A) can exist in a terrestrial broadcast frame or a MIMO broadcast frame. The MIMO broadcast PLP in the terrestrial broadcast frame as a base layer can be transmitted by the SISO or MISO method and the MIMO broadcast cast PLP in the MIMO broadcast frame as an enhancement layer can be transmitted by the SISO, MISO, or MIMO method.

FIG. 8(B) shows a broadcast signal being applied by a MIMO transmitting system using a SVC.

In FIG. 8(B), the broadcast system transmits broadcast signals including the terrestrial broadcast frame and the MIMO broadcast frame. The MIMO broadcast PLP in FIG. 8(B) only exists in the MIMO broadcast frame. In that case, the MIMO broadcast PLP includes PLP with a base layer and PLP with an enhancement layer. The PLP with the base layer can be transmitted by the SISO or MISO method, and the PLP with the enhancement layer can be transmitted by the SISO, MISO, or MIMO method. The rate of the PLP with base layer and the PLP with enhancement layer can be varied from 0 to 100%.

FIG. 8(C) shows a broadcast signal transmitted by a broadcast system being applied by a MIMO transmitting system using a SVC.

The broadcast system of FIG. 8(C) transmits broadcast signals including terrestrial broadcast frames and MIMO broadcast frames. The MIMO broadcast data exists only in the MIMO broadcast frame. But, as opposed to FIG. 8(B), a base layer and an enhancement layer are not transmitted by PLP but carriers.

Various technologies are introduced to improve transmission efficiency and perform robust communication in a digital broadcast system. One of the technologies is a method of using a plurality of antennas at a transmitting side or a receiving side. This method may be divided into SISO(Single-Input Single-Output), SIMO(Single-Input Multi-Output), MISO (Multi-Input Single-Output) and MIMO (Multi-Input Multi-Output). While multiple antennas are described as two antennas in the following, the present invention is applicable to systems using two or more antennas.

In an embodiment, MIMO can use spatial multiplexing (SM) and Golden code (GC) schemes, which will be described in detail.

A modulation scheme in broadcast signal transmission may be represented as M-QAM (Quadrature Amplitude Modulation) in the following description. That is, BPSK (Binary Phase Shift Keying) can be represented by 2-QAM when M is 2 and QPSK (Quadrature Phase Shift Keying) can be represented by 4-QAM when M is 4. M can indicate the number of symbols used for modulation.

A description will be given of a case in which a MIMO system transmits two broadcast signals using two transmission antennas and receives two broadcast signals using two reception antennas as an example.

FIG. 9 illustrates MIMO transmission and reception systems according to an embodiment of the present invention.

As shown in FIG. 9, the MIMO transmission system includes an input signal generator 201010, a MIMO encoder 201020, a first transmission antenna 201030, and a second transmission antenna 201040. In the following, the input signal generator 201010 may be referred to as a divider and the MIMO encoder 201020 may be referred to as a MIMO processor.

The MIMO reception system may include a first reception antenna 201050, a second reception antenna 201060, a MIMO decoder 201070, and an output signal generator 201080. In the following, the output signal generator 201080 may be referred to as a merger and the MIMO decoder 101070 may be referred to as an ML detector.

In the MIMO transmission system, the input signal generator 201010 generates a plurality of input signals for transmission through a plurality of antennas. In the following, the input signal generator 201010 may be referred to as a divider. Specifically, the input signal generator 201010 may divide an input signal for transmission into 2 input signals and output the first input signal S1 and the second input signal S2 for MIMO transmission.

The MIMO encoder 201020 may perform MIMO encoding on the plurality of input signals S1 and S2 and output a first transmission signal St1 and a second transmission signal St2 for MIMO transmission and the output transmission signals may be transmitted through a first transmission antenna 201030 and a second transmission antenna 201040 via required signal processing and modulation procedures. The MIMO encoder 201020 may perform encoding on a per symbol basis. The SM scheme or the GC scheme may be used as the MIMO encoding method. In the following, the MIMO encoder may be referred to as a MIMO processor. Specifically, the MIMO encoder may process a plurality of input signals according to a MIMO matrix and a parameter value of the MIMO matrix which are described below.

The input signal generator 201010 is an element that outputs a plurality of input signals for MIMO encoding and may also be an element such as a demultiplexer or a frame builder depending on the transmission system. The input signal generator 201010 may also be included in the MIMO encoder 201020 such that the MIMO encoder 201020 generates a plurality of input signals and performs encoding on the plurality of input signals. The MIMO encoder 201020 may be a device that performs MIMO encoding or MIMO processing on a plurality of signals and outputs the encoded or processed signals so as to acquire diversity gain and multiplexing gain of the transmission system.

Since signal processing should be performed on a plurality of input signals after the input signal generator 201010, a plurality of devices may be provided next to the input signal generator 201010 to process signals in parallel or one device including one memory may be provided to sequentially process signals or to simultaneously process signals in parallel.

The MIMO reception system receives a first reception signal Sr1 and a second reception signal Sr2 using a first reception antenna 201050 and a second reception antenna 201060. The MIMO decoder 201070 then processes the first reception signal and the second reception signal and outputs a first output signal and a second output signal. The MIMO decoder 201070 processes the first reception signal and the second reception signal according to an inverse process of the MIMO encoding method used by the MIMO encoder 201020. As an ML detector, the MIMO decoder 201070 outputs a first output signal and a second output signal using information regarding the channel environment, reception signals, and the MIMO matrix used by the MIMO encoder in the transmission system. In an embodiment, when ML detection is performed, the first output signal and the second output signal may include probability information of bits rather than bit values and may also be converted into bit values through FEC decoding.

The MIMO decoder of the MIMO reception system processes the first reception signal and the second reception signal according to the QAM type of the first input signal and the second input signal processed in the MIMO transmission system. Since the first reception signal and the second reception signal received by the MIMO reception system are signals that have been transmitted after being generated by performing MIMO encoding on the first input signal and the second input signal of the same QAM type or different QAM types, the MIMO reception system may determine a combination of QAM types of the reception signals to perform MIMO decoding on the reception signals. Accordingly, the MIMO transmission system may transmit information identifying the QAM type of each transmission signal in the transmission signal and the QAM type identification information may be included in a preamble portion of the transmission signal. The MIMO reception system may determine the combination of the QAM types of the reception signals from the QAM type identification information of the transmission signals and perform MIMO decoding on the reception signals based on the determination.

The following is a description of a MIMO encoder and a MIMO encoding method that have low system complexity, high data transmission efficiency, and high signal reconstruction (or restoration) performance in various channel environments according to an embodiment of the present invention.

The SM scheme is a method in which data is simultaneously transmitted through a plurality of antennas without MIMO encoding. In this case, the receiver can acquire information from data that is simultaneously received through a plurality of reception antennas. The SM scheme has an advantage in that the complexity of a Maximum Likelihood (ML) decoder that the receiver uses to perform signal reconstruction (or restoration) is relatively low since the decoder only needs to check a combination of received signals. However, the SM scheme has a disadvantage in that transmit diversity cannot be achieved at the transmitting side. In the case of the SM scheme, the MIMO encoder bypasses a plurality of input signals. In the following, such a bypass process may be referred to as MIMO encoding.

The GC scheme is a method in which data is transmitted through a plurality of antennas after the data is encoded according to a predetermined rule (for example, according to an encoding method using golden code). When the number of the antennas is 2, transmit diversity is acquired at the transmitting side since encoding is performed using a 2×2 matrix. However, there is a disadvantage in that the complexity of the ML decoder of the receiver is high since the ML decoder needs to check 4 signal combinations.

The GC scheme has an advantage in that it is possible to perform more robust communication than using the SM scheme since transmit diversity is achieved. However, such a comparison has been made when only the GC scheme and the SM scheme are used for data processing for data transmission and, if data is transmitted using additional data coding (which may also be referred to as outer coding), transmit diversity of the GC scheme may fail to yield additional gain. This failure easily occurs especially when such outer coding has a large minimum Hamming distance. For example, the transmit diversity of the GC scheme may fail to yield additional gain compared to the SM scheme when data is transmitted after being encoded by adding redundancy for error correction using a Low Density Parity Check (LDPC) code having a large minimum Hamming distance. In this case, it may be advantageous for the broadcast system to use the SM scheme having low complexity.

Figure 10:
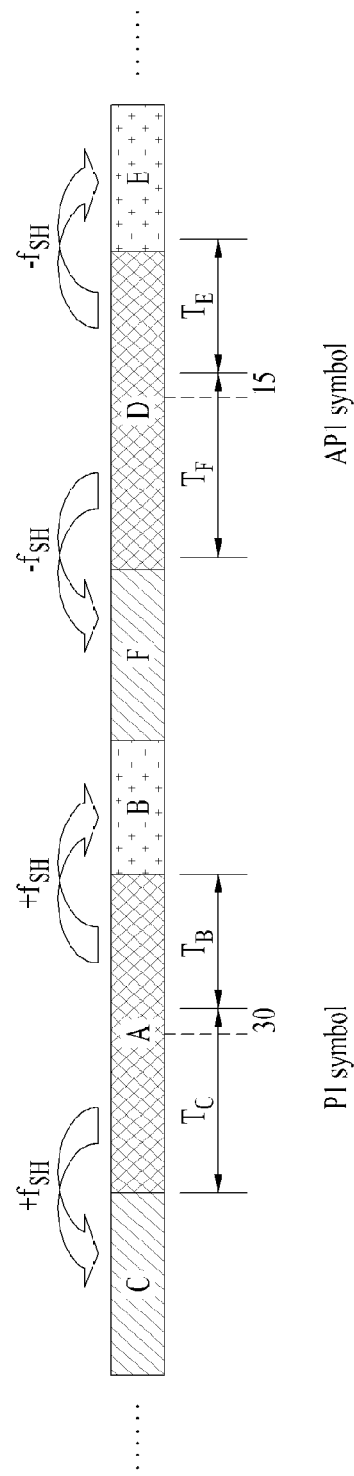
FIG. 10 shows structures of a P1 symbol and an AP1 symbol according to an embodiment of the present invention.

FIG. 10 illustrates an exemplary structure of a P1 symbol and an exemplary structure of an AP1 symbol according to an embodiment of the present invention.

P1 symbol is generated by having each of a front portion and an end portion of an effective (or valid) symbol copied, by having a frequency shift performed as much as $+f_{sh}$, and by having the frequency-shifted copies respectively positioned at a front portion (C) and an end portion (B) of the effective symbol (A). In the present invention, the C portion will be referred to as a prefix, and the B portion will be referred to as a postfix. More specifically, P1 symbol is configured of a prefix portion, an effective symbol portion, and a postfix portion.

In the same manner, AP1 symbol is generated by having each of a front portion and an end portion of an effective (or valid) symbol copied, by having a frequency shift performed as much as $-f_{sh}$, and by having the frequency-shifted copies respectively positioned at a front portion (F) and an end portion (E) of the effective symbol (D). In the present invention, the F portion will be referred to as a prefix, and the E portion will be referred to as a postfix. More specifically, AP1 symbol is configured of a prefix portion, an effective symbol portion, and a postfix portion.

Herein, the two frequency-shift values $+f_{sh}$, $-f_{sh}$, which are used in the P1 symbol and the AP1 symbol, may have the same absolute value yet be given opposite signs. More specifically, the frequency-shift is performed in opposite directions. And, the lengths C and F, which are copied to the front portion of the effective symbol, may be set to have different values. And, the lengths B and E, which are copied to the end portion of the effective symbol, may be set to have different values. Alternatively, the lengths C and F may be set to have different values, and the lengths B and E may be set to have the same value, or vice versa. According to another embodiment of the present invention, an effective symbol length of the P1 symbol and an effective symbol length of the AP1 symbol may be differently determined. And, according to yet another embodiment of the present invention, a CSS (Complementary Set Sequence) may be used for tone selection and data scrambling within the AP1 may be scrambled by AP1.

According to the embodiment of the present invention, the lengths of C and F, which are copied to the front portion of the effective (or valid) symbol, may be set to have different values, and the lengths of B and E, which are copied to the end portion of the effective (or valid) symbol, may also be set to have different values.

The C,B,F,E lengths according to the present invention may be obtained by using Equation 1 shown below.

Length of $C(T_C)=\{$Length of $A(T_A)/2+30\}$

Length of $B(T_B)=\{$Length of $A(T_A)/2-30\}$

Length of $E(T_F)=\{$Length of $D(T_D)/2+15\}$

Length of $E(T_E)=\{$Length of $D(T_D)/2-15\}$ [Equation 1]

As shown in Equation 1, P1 symbol and AP1 symbol have the same frequency shift value. However, each of the P1 symbol and the AP1 symbol are given opposite signs. Additionally, in order to determine the lengths of C and B, the present invention determines an offset value being added to or subtracted from a value corresponding to the length of A $(T_A)/2$. And, in order to determine the lengths of F and E, the present invention determines an offset value being added to or subtracted from a value corresponding to the length of D $(T_D)/2$. Herein, each of the offset values is set up differently. According to the embodiment of the present invention, the offset value of P1 symbol is set to 30, and the offset value of AP1 symbol is set to 15. However, the values given in the above-described examples are merely exemplary. And, therefore, it will be apparent that the corresponding values may easily be varied or changed by anyone skilled in the art. Thus, the present invention will not be limited only to the values presented herein.

According to the present invention, by generating AP1 symbol and an AP1 symbol to configure the structure shown in FIG. 10, and by inserting the generated symbols to each signal frame, the P1 symbol does not degrade the detection performance of the AP1 symbol, and, conversely, the AP1 symbol does not degrade the detection performance of the P1 symbol. Additionally, the detection performance of the P1 symbol is almost identical to the detection performance of the AP1 symbol. Furthermore, by configuring the symbols so that the P1 symbol and the AP1 symbol have similar symbol structures, the complexity level of the receiver may be reduced.

At this point, the P1 symbol and the AP1 symbol may be transmitted consecutively, or each of the symbols may be allocated to different positions within the signal frame and may then be transmitted. And, in case the P1 symbol and AP1 symbol are each allocated to a different position within the signal frame, so as to be transmitted, a high time diversity effect may be gained with respect to the preamble symbol. According to the embodiment of the present invention, the P1 symbol and the AP1 symbol are consecutively transmitted. In that case, the AP1 symbol, according to FIG. 3, transmits information necessary for decoding signaling information spread in a pilot pattern or a frame of a data area. It can be generated in FIG. 5.

Figure 11:
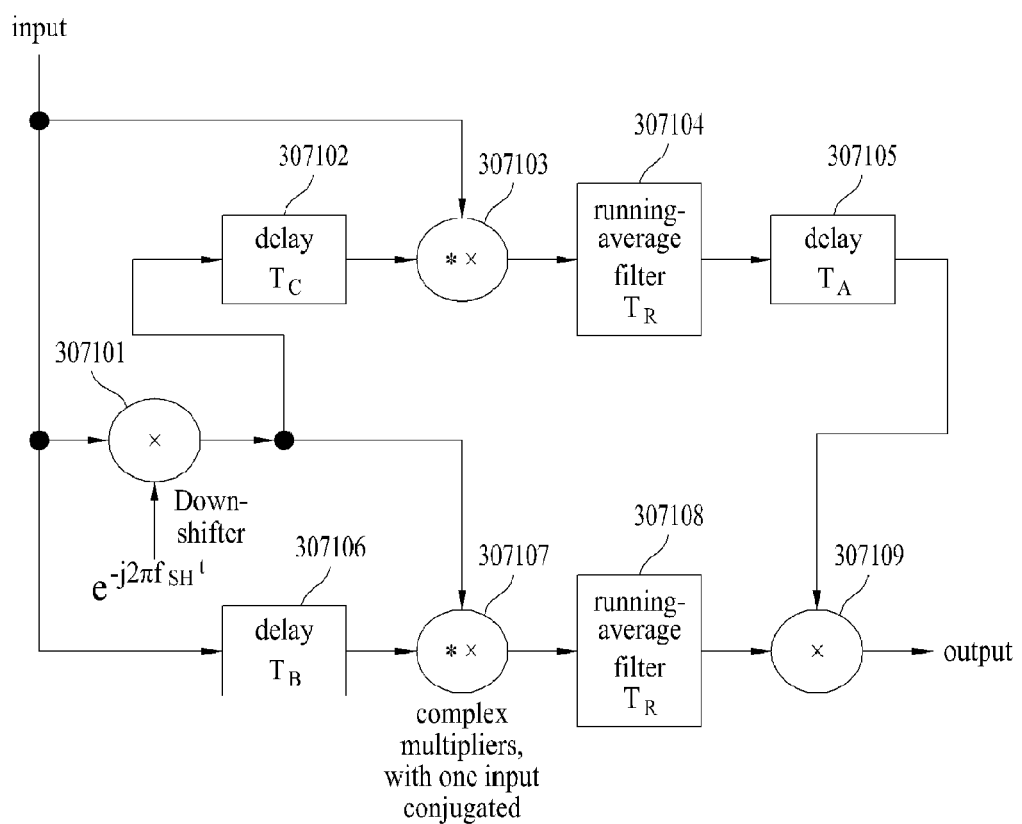
FIG. 11 illustrates a block diagram showing a P1 symbol detection module according to an embodiment of the present invention.

FIG. 11 illustrates an exemplary structure of a P1 symbol detector according to an embodiment of the present invention.

The P1 symbol detector may be included in the OFDM modulator 107100 as shown in FIG. 2.

Herein, the P1 symbol detector may also be referred to as a C-A-B preamble detector. The P1 symbol detector may include a down shifter 307101, a first conjugator 307103, and a second delayer 307106.

The down shifter 307101 performs inverse modulation by multiplying $e^{-j2\pi f_{SH}2}$ by the input signal. When inverse modulation is performed by the down shifter 307101, the signal being frequency-shifted and inputted is recovered to the original signal. The inverse modulated signal may be outputted to a $1^{st}$ delayer 307102 and a $2^{nd}$ conjugator 307107.

The $1^{st}$ delayer 307102 delays the inverse-modulated signal by a length of part C $(T_C)$ and then outputs the delayed signal to the $1^{st}$ conjugator 307103. The $1^{st}$ conjugator 307103 performs complex-conjugation on the signal, which is delayed by a length of part C $(T_C)$. Then, the $1^{st}$ conjugator 307103 multiplies the input signal by the complex-conjugated signal, thereby outputting the processed signal to a 1$^{st}$ filter 307104. The 1$^{st}$ filter 307104 uses a running average filter having the length of $T_R=T_A$, so as to remove (or eliminate) any excessively and unnecessarily remaining modulation elements, thereby outputting the processed signal to a 3$^{rd}$ delayer 307105. The 3$^{rd}$ delayer 307105 delays the filtered signal by a length of part A (i.e., effective (or valid) symbol) ($T_A$), so as to output the delayed signal to a multiplier 307109.

The 2$^{nd}$ delayer 307106 delays the input signal by a length of part B ($T_B$) and then outputs the delayed signal to the 2$^{nd}$ conjugator 307107. The 2$^{nd}$ conjugator 307107 performs complex-conjugation on the signal, which is delayed by a length of part B ($T_B$). Then, the 2$^{nd}$ conjugator 307107 multiplies the complex-conjugated signal by an inverse-modulated signal, thereby outputting the processed signal to a 2$^{nd}$ filter 307108. The 2$^{nd}$ filter 307108 uses a running average filter having the length of $T_R=T_A$, so as to remove (or eliminate) any excessively and unnecessarily remaining modulation elements, thereby outputting the processed signal to the multiplier 307109.

The multiplier 307109 multiplies the output of the 2$^{nd}$ filter 307109 by a signal, which is delayed by a length of part A ($T_A$). Thus, a P1 symbol may be detected from each signal frame of the received broadcast signal.

Herein, the length of part C ($T_C$) and the length of part B ($T_B$) may be obtained by applying Equation 1 shown above.

Figure 12:
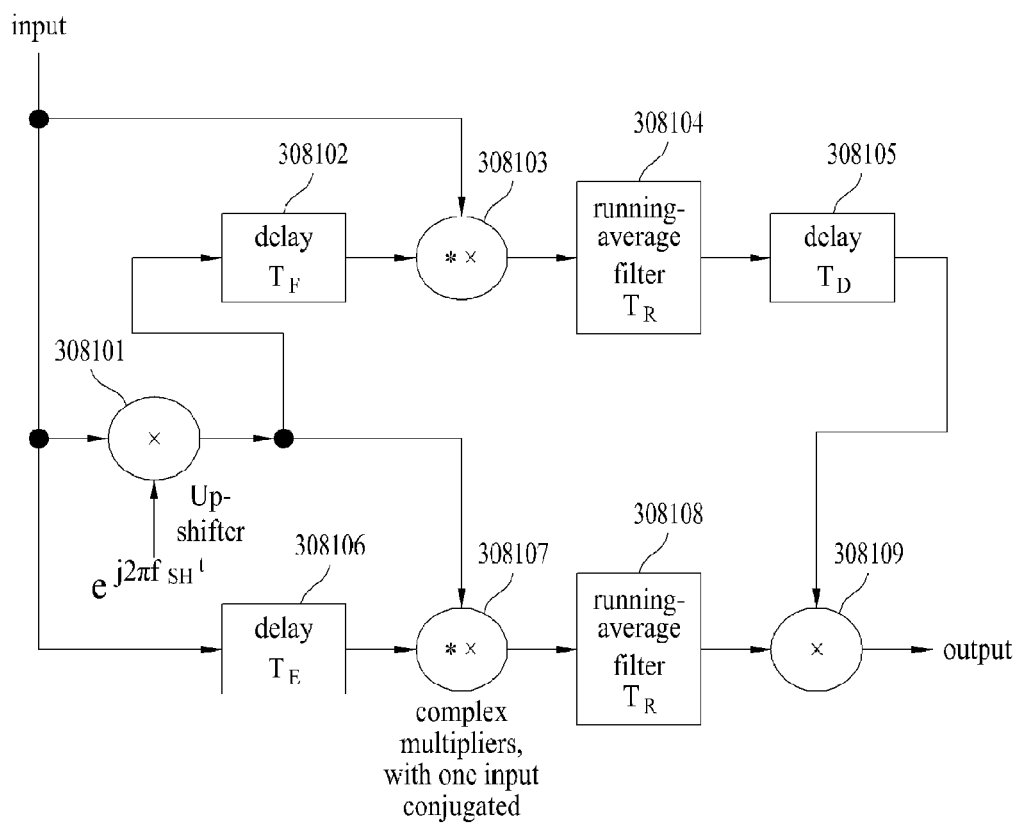
FIG. 12 illustrates a block diagram showing an AP1 symbol detection module according to an embodiment of the present invention.

FIG. 12 illustrates an exemplary structure of an AP1 symbol detector according to an embodiment of the present invention.

The AP1 symbol detector may be included in the OFDM demodulator 107100.

Herein, the AP1 symbol detector may also be referred to as an F-D-E preamble detector. The AP1 symbol detector may include an up-shifter 308101, a first conjugator 308103, and a second delayer 308106. More specifically, the AP1 symbol detector may be inputted a signal that is received to the broadcast receiver or a signal that is outputted from the P1 symbol detector.

The up-shifter 308101 performs inverse modulation by multiplying $e^{-j2\pi f_{SH}2}$ by the input signal. When inverse modulation is performed by the up-shifter 308101, the signal being frequency-shifted and inputted is recovered to the original signal. More specifically, the up-shifter 308101 of FIG. 12 has the same structure as the down-shifter 307101 of the P1 symbol detector as shown in FIG. 11. However, the frequency direction of each inverse modulation process is completely opposite to one another. The signal that is inverse modulated by the up-shifter 308101 may be outputted to a 1$^{st}$ delayer 308102 and a 2$^{nd}$ conjugator 308107.

The 1$^{st}$ delayer 308102 delays the inverse-modulated signal by a length of part F ($T_F$) and then outputs the delayed signal to the 1$^{st}$ conjugator 308103. The 1$^{st}$ conjugator 308103 performs complex-conjugation on the signal, which is delayed by a length of part F ($T_F$). Then, the 1$^{st}$ conjugator 308103 multiplies the input signal by the complex-conjugated signal, thereby outputting the processed signal to a 1$^{st}$ filter 308104. The 1$^{st}$ filter 308104 uses a running average filter having the length of $T_R=T_D$, so as to remove (or eliminate) any excessively and unnecessarily remaining modulation elements, thereby outputting the processed signal to a 3$^{rd}$ delayer 308105. The 3$^{rd}$ delayer 308105 delays the filtered signal by a length of part D (i.e., effective (or valid) symbol) ($T_D$), so as to output the delayed signal to a multiplier 308109.

The 2$^{nd}$ delayer 308106 delays the input signal by a length of part E ($T_E$) and then outputs the delayed signal to the 2$^{nd}$ conjugator 308107. The 2$^{nd}$ conjugator 308107 performs complex-conjugation on the signal, which is delayed by a length of part E ($T_E$). Then, the 2$^{nd}$ conjugator 308107 multiplies the complex-conjugated signal by an inverse-modulated signal, thereby outputting the processed signal to a 2$^{nd}$ filter 308108. The 2$^{nd}$ filter 308108 uses a running average filter having the length of $T_R=T_D$, so as to remove (or eliminate) any excessively and unnecessarily remaining modulation elements, thereby outputting the processed signal to the multiplier 308109.

The multiplier 308109 multiplies the output of the 2$^{nd}$ filter 308109 by a signal, which is delayed by a length of part D ($T_D$). Thus, an AP1 symbol may be detected from each signal frame of the received broadcast signal. Herein, the length of part F ($T_F$) and the length of part E ($T_E$) may be obtained by applying Equation 1 shown above.

As shown in FIG. 3, a frame according to an embodiment of the present invention may include a preamble area and a data area. The preamble area may include a P1 symbol and a P2 symbol and the data area may include a plurality of data symbols. The preamble area may further include an AP1 symbol.

At this point, P1 signaling information may be transmitted through the P1 symbol, AP1 signaling information may be transmitted through the AP1 symbol, and L1-Pre signaling information and L1-Post signaling information may be transmitted through the P2 symbol.

An embodiment of a broadcast signal transmitter or receiver for MIMO processing is as follows.

The broadcast signal transmitter comprises as shown in FIG. 1 an input processor 101200, a BICM encoder 101300, a frame builder 101400, and an OFDM generator 101500. Also, the broadcast signal receiver, as shown in FIG. 2, comprises an OFDM demodulator 107100, a frame demapper 107200, a BICM decoder 107300, and an output processor 1073400.

The input processor 101200 of the broadcast signal transmitter process FEC encoding for transmitting data in a form of block. The BICM encoder 101300 performs encoding for correcting errors. The frame builder 101400 performs data mapping into a frame, and the OFDM generator 101500 performs OFDM modulating in the frame-mapped data into symbol units and transmit the data. Devices in the broadcast signal receiver can perform reverse-functioning corresponding to the counterpart devices in the transmitter.

The present invention suggests a broadcast signal transmitter or receiver that independently applies MISO or MIMO processing for each PLP from a plurality of PLP inputs. According to the present invention, the present invention can effectively adjust the quality of service (QOS) or services from PLP in a physical layer.

Hereinafter, a broadcast signal transmitter and receiver for performing MISO processing and MIMO processing on a plurality of signals that are transmitted and received through a plurality of antennas will be described with regard to four embodiments of the present invention. The four embodiments are different in terms of whether to perform the MISO/MIMO processing for each PLP and a position of the MISO/MIMO processing. The four embodiments will now be described briefly.

In a first embodiment of the present invention, provided are a broadcast signal transmitter and a broadcast signal receiver corresponding thereto, which independently perform MISO processing and MIMO processing for each PLP data during a BICM encoding process.

In a second embodiment of the present invention, provided are another broadcast signal transmitter and a broadcast signal receiver corresponding thereto, which independently perform MISO processing and MIMO processing for each PLP data during a BICM encoding process.

In a third embodiment of the present invention, provided is a broadcast signal transmitter and a broadcast signal receiver corresponding thereto, which perform MISO processing and MIMO processing on mapped PLP data in a frame during an OFDM generating process.

In a fourth embodiment of the present invention, provided is a broadcast signal transmitter and a broadcast signal receiver corresponding thereto, which independently perform MIMO processing on MIMO PLP data, on which MIMO processing is to be performed, among input PLP data during a BICM encoding process, and perform MISO processing on L1-signaling information and MISO PLP data, on which MISO processing is to be performed, by an OFDM generator.

In detail, according to the first embodiment, a BICM encoder of the broadcast signal transmitter may perform MISO encoding or MIMO encoding on input PLP data after constellation mapping, cell interleaving, and time interleaving. In addition, a BICM decoder of the broadcast signal receiver according to the first embodiment of the present invention may perform a reverse process to the BICM encoding of the broadcast signal transmitter.

According to the second embodiment, a BICM encoder of the broadcast signal transmitter may perform MISO encoding or MIMO encoding on input PLP data after constellation mapping, and perform cell interleaving, and time interleaving. In addition, a BICM decoder of the broadcast signal receiver according to the second embodiment of the present invention may perform a reverse process to the BICM encoding of the broadcast signal transmitter.

According to the third embodiment, an OFDM generator of the broadcast signal transmitter may perform MISO encoding or MIMO encoding on PLP data output from a frame builder. In addition, an OFDM demodulator of the broadcast signal receiver according to the third embodiment may perform a reverse process to that of the OFDM generator of the broadcast signal transmitter.

According to the fourth embodiment, a BICM encoder of the broadcast signal transmitter may perform MIMO encoding on MIMO PLP on which MIMO processing is to be performed, after time interleaving, or perform MIMO encoding on MIMO PLP data after constellation mapping. In addition, the OFDM generator of the broadcast signal transmitter according to the fourth embodiment may perform MISO encoding on Li-signaling information and MISO PLP data on which MISO processing is to be performed and which is mapped in a frame and may also perform MISO encoding on MIMO PLP data. In addition, a BICM decoder and OFDM demodulator of the broadcast signal receiver according to the fourth embodiment may perform a reverse process to that of the BICM decoder and OFDM generator of the broadcast signal receiver.

Hereinafter, a broadcast signal transmitter and receiver will be described with regard to each embodiment of the present invention. The broadcast signal transmitter and receiver according to the present invention may perform MISO processing and MIMO processing on a plurality of signals transmitted through a plurality of antennas. A broadcast signal transmitter and receiver that perform signal processing on two signals transmitted and received through two antennas will be described below.

Figure 13:
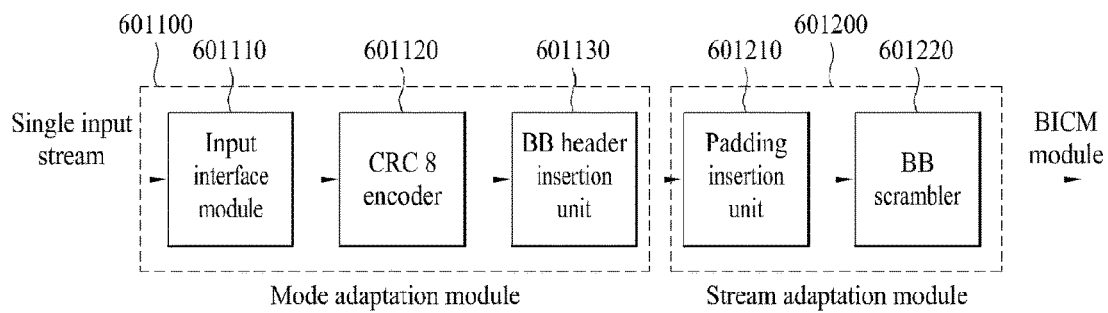
FIG. 13 illustrates a block diagram showing an input processor of a broadcast signal transmitter according to an embodiment of the present invention.
Figure 14:
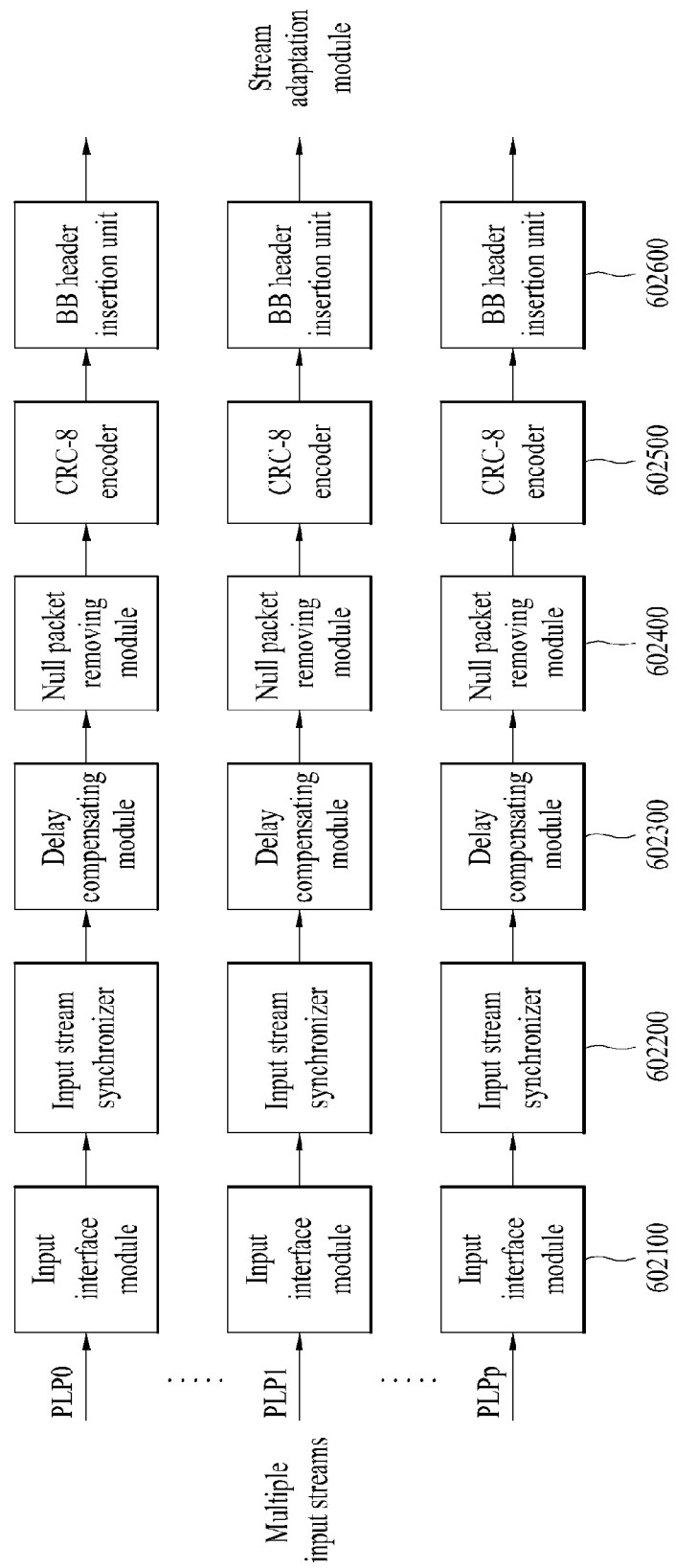
FIG. 14 illustrates a block diagram showing a mode adaptation module of an input processor according to another embodiment of the present invention.

FIG. 13 and FIG. 14 show an input process that the broadcast signal transmitter comprises in common. Further description is as follows.

FIG. 13 shows an input processor of the broadcast signal transmitter according to an embodiment.

The input process 101200 in FIG. 1 is shown as an embodiment in FIG. 13 performing only one PLP. The input processor in FIG. 13 comprises a mode adaptation module 601100 and a stream adaptation module 601200. The mode adaptation module 601100 comprises an input interface module 601110, a CRC-8 encoder 601120 and a BB header insertion module 601130, wherein a stream adaptation module 601200 comprises a padding insertion module 601210 and a BB scrambler 601220.

The input interface module 601110 in the input processor performing a single PLP performs mapping by distinguishing the input bit stream in a logical unit to perform FEC (BCH/LDPC) encoding at the end of the BICM encoder. The CRC-8 encoder 601120 performs CRC encoding in the mapped bit stream and a BB header insertion module 601130 inserts a BB header in the data field. In that case, the BB header includes all adaptation type (TS/GS/IP) information, user packet length information, and data field length.

Also, if the input data does not have a BB frame for FEC encoding, the stream adaptation module 601200 generates a padding insertion unit and a Pseudo Random Binary Sequence (PRBS) and includes a BB scrambler 601220 randomizing data computed by the PRBS and XOR. Such a move by the BB scrambler 601220 can ultimately lower the Peak-to-Average Power Ratio of the OFDM-modulated signal.

FIG. 14 shows a mode adaptation module as an input processor of the broadcast signal transmitter performing a plurality of PLPs. The mode adaptation module in FIG. 14 comprises a plurality of input interface modules 602100 performing mode adaptation for each PLP in parallel, an input stream synchronizer 602200, a compensating delay module 602300, null packet deletion module 602400, a CRC-8 encoder 602500, and a BB header insertion unit 602600. The description of the input interface module 6021000, the CRC-8 encoder 602500 and the BB header insertion unit 602600 illustrated in FIG. 13 is omitted.

The input stream synchronizer 602200 inserts input stream clock reference information (ISCR) that is timing information necessary for restoring at least one of transport stream (TS), IP stream, and generic stream (GS). The compensating delay module 602300 synchronizes a group of PLP based on the timing information.

The null packet deletion module 602400 deletes null packet that is unnecessarily transmitted and inserts the number of the deleted null packets based on the deleted position.

Figure 15:
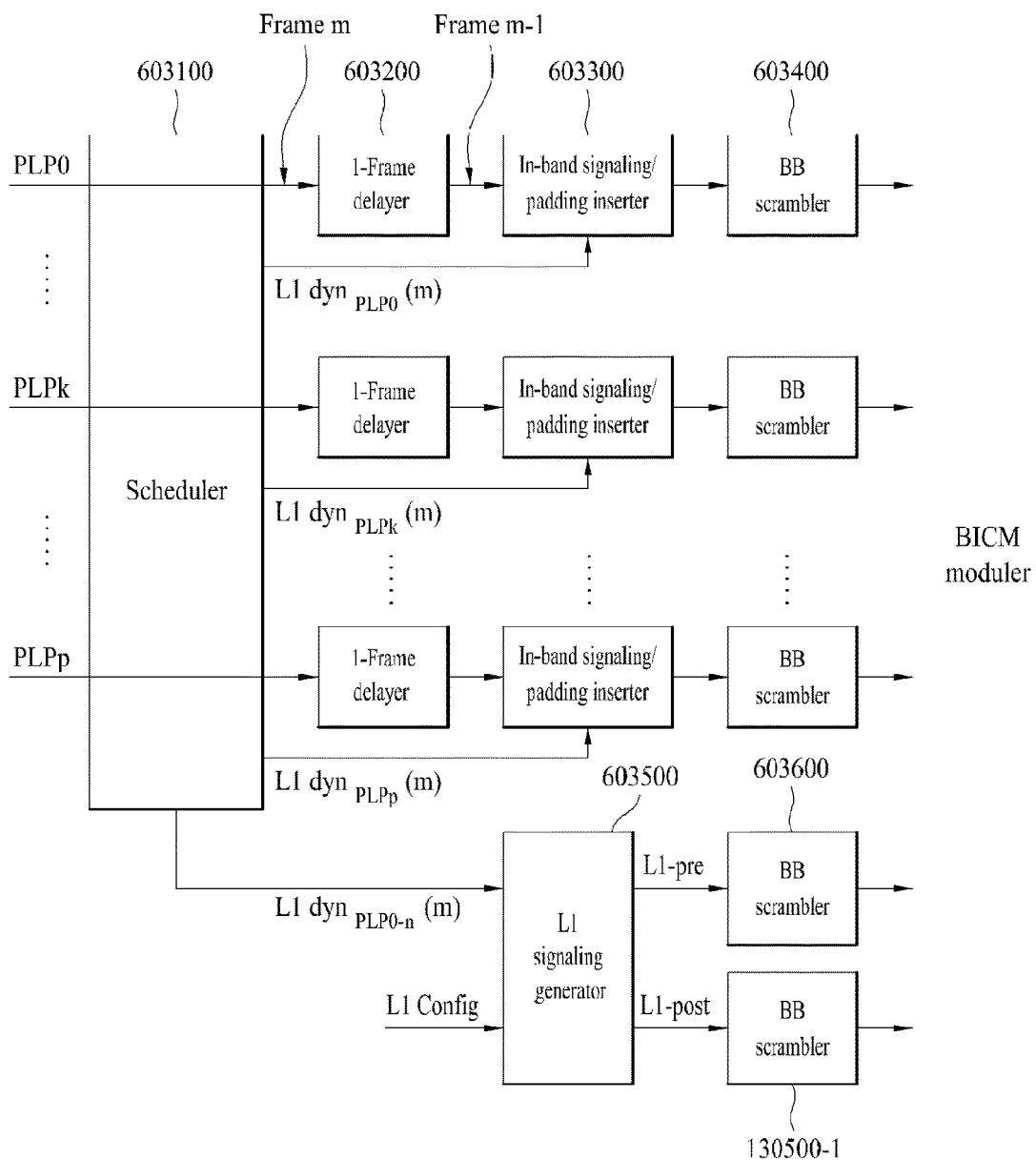
FIG. 15 illustrates a block diagram showing a stream adaptation module of an input processor according to another embodiment of the present invention.

FIG. 15 shows a stream adaptation module as an input processor of the broadcast signal transmitter performing a plurality of PLPs.

The stream adaptation module in FIG. 15 receives the data in PLP units from the mode adaptation in FIG. 14.

The scheduler 603100 performs scheduling for the MIMO transmitting system using a plurality of antennas including dual polarity and generates parameters for a demultiplexer, a cell interleaver, a time interleaver of the BICM encoder. Furthermore, the scheduler 603100 may signal in-band signaling information to a corresponding PLP by controlling at least one of the plurality of in-band signaling/padding insertion module 603300 for processing each of a plurality of PLPs. In other words, the in-band signaling information is included in a BB frame of the corresponding PLP. The in-band signaled information will hereinafter be described in detail. Also, the scheduler 603100 transmits L1-dynamic signaling information for the current frame besides in-band signaling, and performs cell mapping based on the scheduling.

A plurality of 1-frame delay module 603200 processing a plurality of PLPs delays one frame so that scheduling information of the next frame for in-band signaling can be included in the current frame. A plurality of in-band signaling/padding insertion module 603300 insert L1-dynamic signaling information to the delayed data. Also, if there is any room for padding, the in-band signaling/padding insertion module 603300 inserts padding bits and in-band signaling information into the padding area. And, the BB scrambler 603400 generates a pseudo random binary sequence (PRBS) as shown in FIG. 13 and randomizes the data by computing the PRBS with XOR.

The stream adaptation module in FIG. 15 generates L1-signaling information transmitted by the preamble symbol of the frame or the spread data symbol. Such L1-signaling information includes L1-pre signaling information and L1-post signaling information. The L1-pre signaling information includes parameters necessary for performing the L1-post signaling information and static L1-signaling information, and the L1-post signaling information includes the configurable (or static) L1-signaling information and dynamic L1-signaling information. The L1-signaling generator 603500 can transmit the generated L1-pre signaling information and L1-post signaling information. The transmitted L1-pre signaling information and L1-post signaling information is scrambled by each BB scrambler 603600, 603700. Also, according to another embodiment, the L1 signaling generator 603500 transmits L1-signaling information having L1-pre signaling and L1-post signaling information and scrambles L1-signaling information transmitted by one BB scrambler.

FIGS. 16 to 19 show a structure block of a broadcast signal transmitter according to an embodiment. Further description is as follows.

Figure 16:
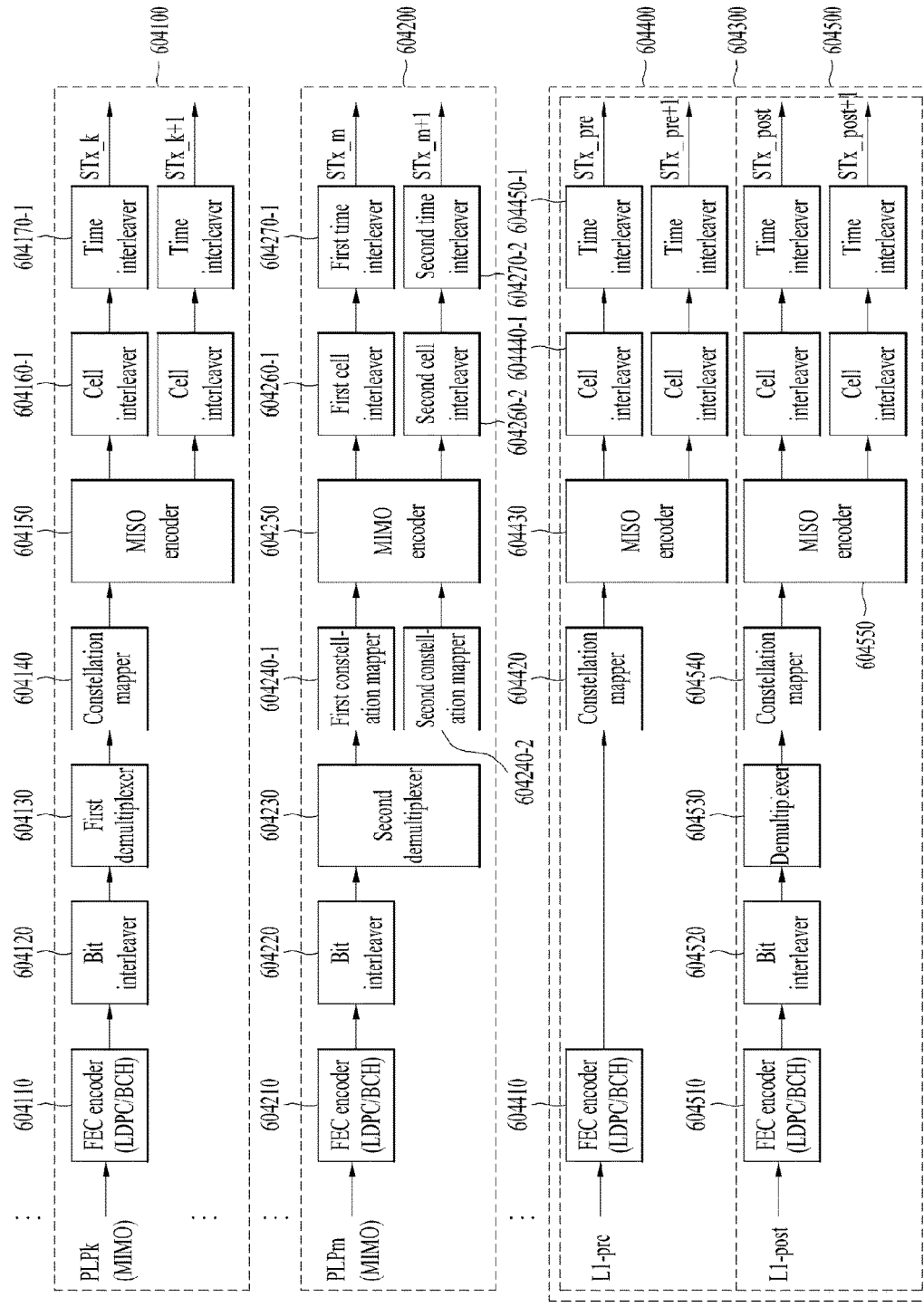
FIG. 16 illustrates a block diagram showing a BICM encoder according to an embodiment of the present invention.

FIG. 16 shows a BICM encoder according to an embodiment of the present invention.

The BICM encoder shown in FIG. 16 is an embodiment of the BICM encoder in FIG. 1.

The BICM encoder according to the first embodiment performs bit-interleaving in a plurality of PLP data after performing input-processing, L1-pre signaling information, and L1-post signaling information, and encoding for correcting errors.

Also, the BICM encoder independently performs MISO and MIMO encoding in PLP data. Furthermore, the BICM encoder according to the first embodiment may perform MISO encoding and MIMO encoding after constellation mapping.

That is, the BICM encoder in FIG. 16 includes a first BICM encoding block 604100 performing MISO encoding in PLP data, a second BICM encoding block 604200 performing MIMO encoding in PLP data, and a third BICM encoding block 604300 performing MIMO encoding in signaling information. However, as the signaling information includes information necessary for restoring PLP data in a frame from the receiver, more robustness is required between the transmitter and receiver compared to PLP data. Thus, an embodiment of the present invention is the MISO process performing the signaling information. The description of data performing process for each block is as follows.

First, the first BICM encoding block 604100 includes an FEC (Forward Error Correction) encoder 604110, a bit-interleaver 604120, a first demultiplexer 604130, a constellation mapper 604140, a MISO encoder 604150, cell interleavers 604160-1, 604160-1, and time interleavers 6041170-1, 604170-2.

The FEC encoder 604110 performs BCH encoding and LDPC encoding in PLP data after performing input processing with redundancy to correct channel errors from the receiver. The bit-interleaver 604120 prepares to have robustness for bust errors by performing bit-interleaving in the FEC-encoded PLP data by each FEC block unit. In that case, the bit interleaver can perform bit interleaving by using two FEC block units. When using two FEC blocks, a pair of cell units may be generated from two different FEC blocks in the frame-builder. Thus, the broadcast signal receiver may improve the reception by ensuring the diversity of FEC blocks.

A first demultiplexer 604130 can perform demultiplexing in the bit-interleaved PLP data into one FEC block unit. According to another embodiment of the present invention, the first demultiplexer 604130 uses two FEC blocks and performs demultiplexing. When using the two blocks, pairs of cells in the frame builder may be generated from different FEC blocks. Thus, the receiver can improve reception by ensuring the diversity of FEC blocks.

The constellation mapper 604140 performs mapping in the bit-demultiplexed PLP data into symbol units. In that case, the constellation mapper 604140 can rotate a certain angle depending on the modulation type. The rotated constellation mappers can be expressed in I-phase (In-phase) and Q-phase (Quadrature-phase), and the constellation mappers can delay only the Q-phase for a certain value. Then, the constellation mapper 604140 performs re-mapping in the In-phase element with the delayed Q-phase element.

The MSIO encoder 604150 performs MISO encoding by using MISO encoding matrix on the constellation-mapped PLP data and transmits MISO encoded PLP data through two paths (STx_k, STx_k+1), thereby obtaining transmission diversity. The present invention may include an OSTBC (Orthogonal Space-Time Block Code)/OSFBC (Orthogonal Space Frequency Block Code/Alamouti code) as an embodiment of a MISO encoding method.

The cell interleavers 604160-1, 604160-2 perform interleaving on PLP data being output through two paths into cell units, and the time interleavers 604170-1, 604170-2 perform interleaving on the cell-interleaved PLP data being output through each path into time units. In that case, the time interleavers 604170-1, 604170-2 may perform time interleaving using two FEC blocks. Through this process, as pairs of cells in the frame builder are generated from two different FEC blocks, the receiver can improve reception by ensuring the diversity of the FEC blocks.

The second BICM encoding block 604200 includes a FEC encoder 604210, a bit-interleaver 604220, a second demultiplexer 604230, a first constellation mapper 604240-1, a second constellation mapper 604240-2, a MIMO encoder 604250, a first cell interleaver 6042650-1, a second cell interleaver 604260-2, and a first time interleaver 604270-1 and a second time interleaver 604270-2.

The FEC encoder 604210 and the bit-interleaver 604220 can perform the same function as the FEC encoder 604110 and the bit-interleaver 604120 of the MISO method.

The second demultiplexer 604230 can transmit the PLP data by demultiplexing to two paths necessary for MIMO transmission in addition to performing the same function as the first demultiplexer 604130 of the MISO method. In that case, the character of the data transmission for each path may be different. Thus, the second demultiplexer 604230 can randomly allocate the bit-interleaved PLP data into each path.

The first constellation mapper 604240-1 and the second constellation mapper 604240-2 can operate the same function as the constellation mapper 604140 of the MISO method.

The MIMO encoder 604250 performs MIMO encoding on the input PLP data of tow paths by using MIMO encoding matrix and transmit MIMO encoded PLP data to two paths (STx_m, STx_m+1). The MIMO encoding matrix of the present invention includes a spatial multiplexing, a Golden code (GC), a full-rate full diversity code, and a linear dispersion code.

The first cell interleaver 604260-1 and the second cell interleaver 604260-2 can perform cell-interleaving on only a half of PLP data of cell included in one FEC block among PLP data from each path. Thus, the cell interleaving by the first cell interleaver 604260-1 and second cell interleaver 604260-2 can obtain the same effect as that of the cell interleaving by a single cell interleaver. Also, in order to process data from a plurality of paths, as the first cell interleaver 604260-1 and the second cell interleaver 604260-2 are not allocated additional memory, there is an advantage of performing cell interleaving by using the memory of single cell interleaver.

The first time interleaver 604270-1 and the second time interleaver 604270-2 can operate the same as the time interleavers 604170-1, 604170-2 of the MISO method. In that case, the first time interleaver 604270-1 and the second time interleaver 604270-2 can perform the same time interleaving or a different time interleaving.

L1-signaling information includes L1-pre signaling information and L1-post signaling information. It can independently perform MISO encoding in the L1-pre signaling information and L1-post signaling information.

Thus, the third BICM encoding block 604300 includes a first encoding block 604400 processing the L1-pre signaling information and the second encoding block 604500 processing the L1-post signaling information.

The first encoding block 604400 includes a FEC encoder 604410, a constellation mapper 604420, a MISO encoder 604430, cell interleavers 604440-1, 604440-2, and time interleavers 604450-1, 604450-2. The second encoding block 604500 includes a FEC encoder 604510, a bit interleaver 604520, a demux 604530, a constellation mapper 604540, a MISO encoder 604550, cell interleavers 604560-1, 604560-2, and time interleavers 604570-1, 604570-2.

The L1-pre signaling information includes information necessary for decoding L1-post signaling information and the L1-post signaling information includes information necessary for restoring data transmitted from the receiver.

That is, the receiver needs to decode the L1-pre signaling information quickly and correctly for decoding the L1-signaling information and the data. Thus, the receiver of the present invention does not perform bit-interleaving and de-multiplexing for the L1-pre signaling information in order to perform the fast decoding.

The description of first encoding block 604400 and the second encoding block 604500 is omitted because they perform the same function as the first BICM encoding block 604100.

As a result, to process the L1-pre signaling information, the first encoding block 604400 performs MISO encoding on the L1-pre signaling information and transmits the L1-pre signaling data to two paths (STx_pre, STx_pre+1). Also, to process L1-post signaling information the second encoding block 604500 performs MISO encoding on the L1-post signaling information and transmits the L1-post signaling data to two paths (STx_post, STx_post+1).

Figure 17:
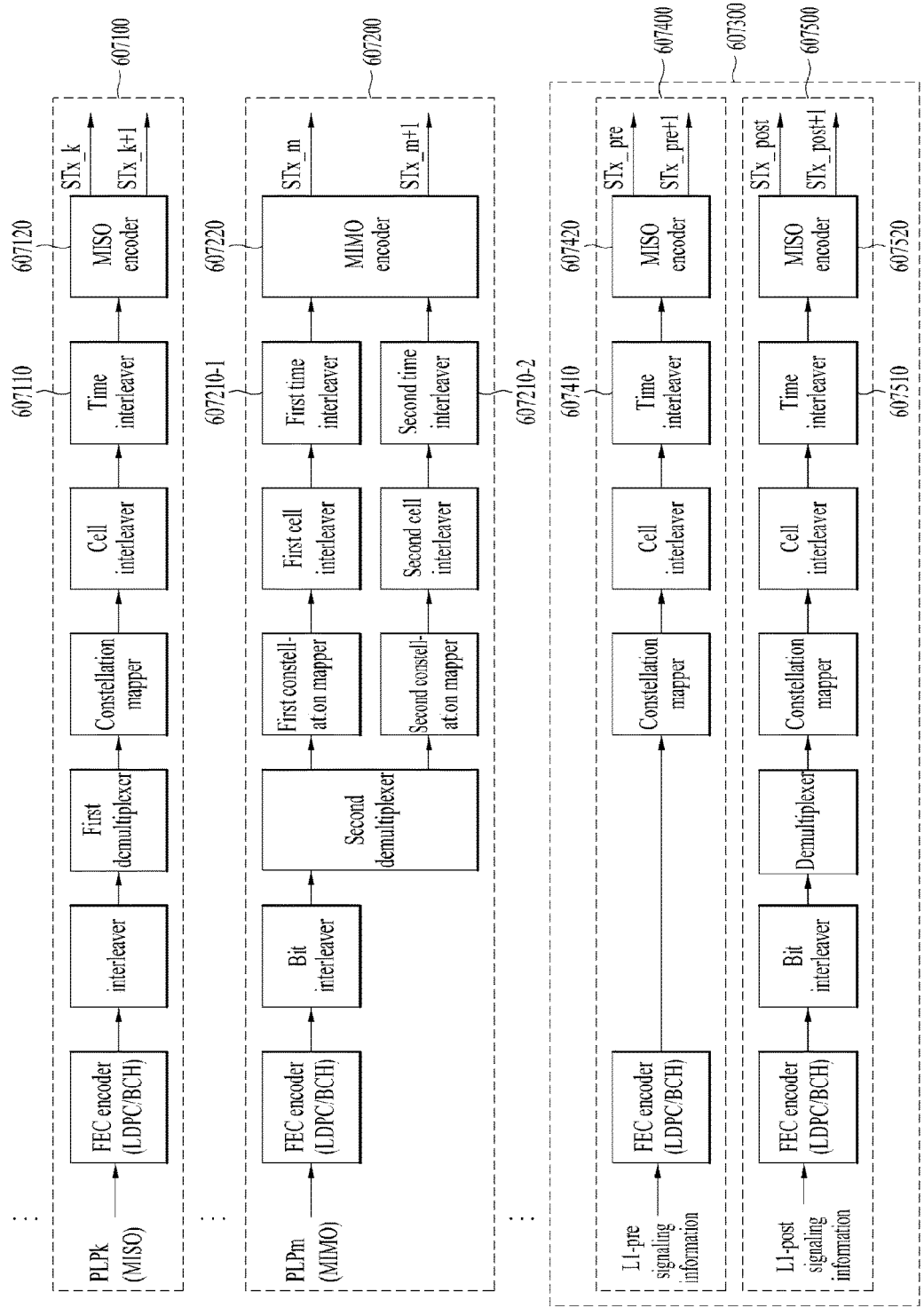
FIG. 17 illustrates a block diagram showing a BICM encoder according to another embodiment of the present invention.

FIG. 17 illustrates a BICM encoder according to another embodiment of the present invention.

The BICM encoder illustrated in FIG. 17 is another embodiment of the BICM encoder 101300 described with reference to FIG. 1 and corresponds to the BICM encoder according to the second embodiment of the present invention.

The BICM encoder according to the second embodiment of the present invention may perform bit interleaving and encoding for error correction on L1-pre signaling information, L1-post signaling information, and a plurality of PLP data on which input-processing is performed.

In addition, the BICM encoder according to the second embodiment may independently apply the MISO scheme and the MIMO scheme on the plural PLP data.

As illustrated in FIG. 17, the BICM encoder may include a first BICM encoding block 607100 for processing of PLP data using the MISO scheme, a second BICM encoding block 607200 for processing of PLP data using the MIMO scheme, and a third BICM encoding block 607300 for processing of signaling information using the MISO scheme.

The BICM encoding blocks 607100, 607200, and 607300 according to the second embodiment illustrated in FIG. 17 operate in the same way as the BICM encoding blocks 604100, 604200, and 604300 according to the first embodiment illustrated in FIG. 16, and thus, a detailed description thereof is omitted. However, the BICM encoding blocks 607100, 607200, and 607300 according to the second embodiment are different from the BICM encoding blocks 604100, 604200, and 604300 according to the first embodiment in that MISO encoders 607120, 607420, and 607520 and a MIMO encoder 607220 are positioned behind time interleavers 607110, 607210-1, 607210-2, 607410, and 607510.

Although not illustrated in FIG. 17, the BICM encoder according to the third embodiment of the present invention may include a first BICM encoding block for processing of MISO PLP data to be MISO encoded, a second BICM encoding block for processing of MIMO PLP data to be MIMO encoded, and a third BICM encoding block for processing of signaling information to be MISO encoded. The BICM encoding blocks according to the third embodiment operate in the same way as the BICM encoding blocks 604100, 604200, and 604300 according to the first embodiment illustrated in FIG. 16, and thus, a detailed description thereof is omitted. However, the BICM encoding blocks according to the third embodiment is different from the BICM encoding blocks 604100, 604200, and 604300 according to the first embodiment in that the BICM encoding blocks according to the third embodiment do not include a MISO encoder and a MIMO encoder.

In addition, the BICM encoder according to the fourth embodiment of the present invention is almost the same as the BICM encoder according to the third embodiment, except that the BICM encoder performs MIMO encoding on MIMO PLP data to be processed using the MIMO scheme. That is, the BICM encoder according to the fourth embodiment of the present invention may include a first BICM encoding block for processing MISO PLP data to be MISO encoded, a second BICM encoding block for processing of MIMO PLP data to be MIMO encoded, and a third BICM encoding block for processing of signaling information to be MISO encoded. Here, the third BICM encoding block may include a first encoding block for processing of L1-pre signaling information and a second encoding block for processing of L1-post signaling information. In particular, the first BICM encoding block according to the fourth embodiment may not include a MISO encoder and the second 2 BICM encoding block may include a MIMO encoder. In this case, the MIMO encoder may be positioned behind a time interleaver as in the first embodiment, or may be positioned behind a constellation mapper according to the second embodiment as in the second embodiment. The position of the MIMO encoder may be changed according to a designer's intention.

Figure 18:
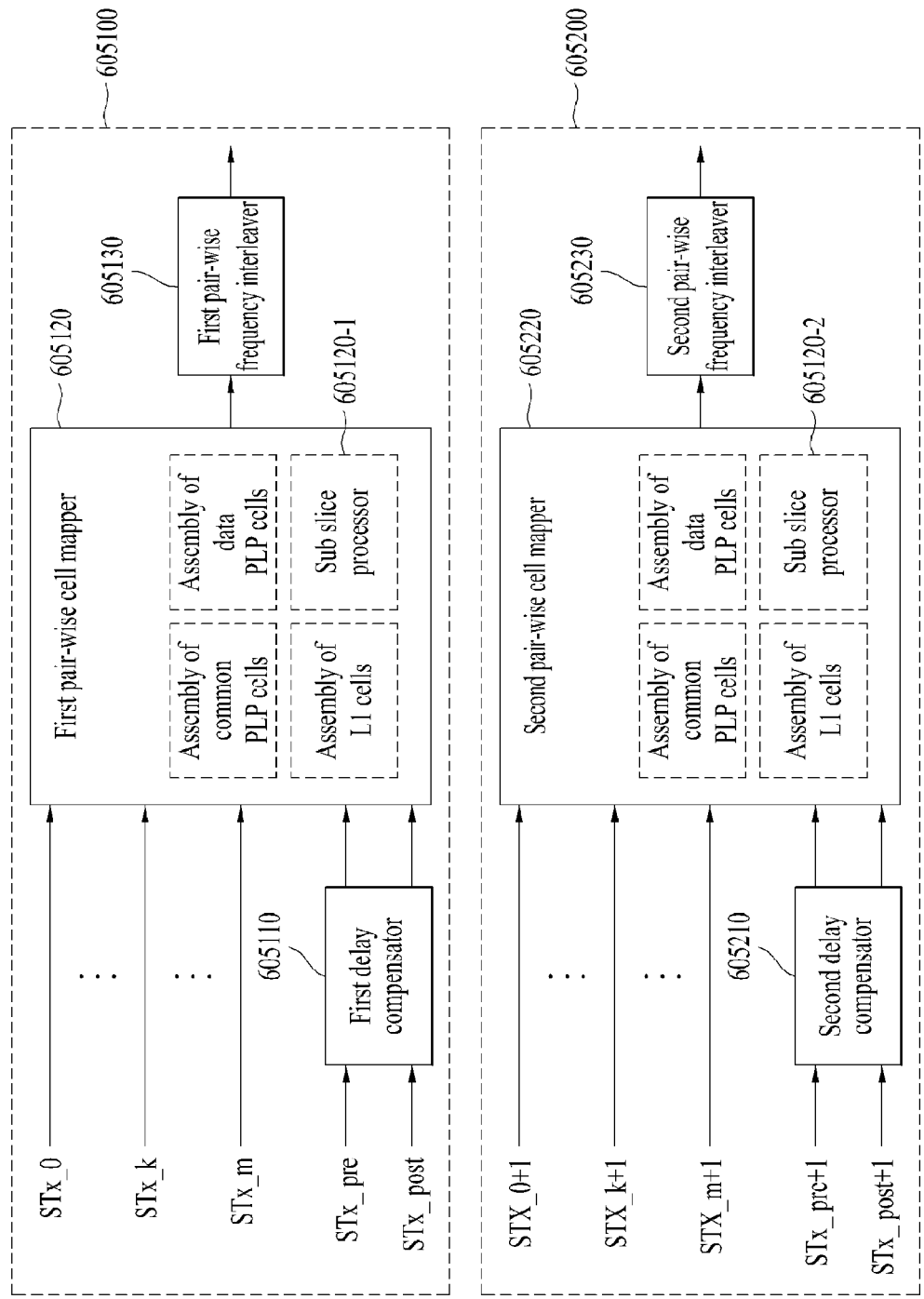
FIG. 18 illustrates a block diagram showing a frame builder according to an embodiment of the present invention.

FIG. 18 shows a frame builder according to an embodiment of the present invention.

The frame builder shown in FIG. 18 is an embodiment of the frame builder 101400 shown in FIG. 1.

The first BICM encoding block 604100 transmits MISO encoded PLP data to two paths (STx_k, STx_K+1) and the second BICM encoding block 604200 transmits MIMO encoded PLP data to two paths (STx_m, STx_m+1). Also, the third BICM encoding block 604300 transmits the L1-pre signaling information and the L1-post signaling information to two paths (STx_pre, Stx_pre_1 and STx_post, STx_post+1).

Then, each data is inputted into the frame builder. In that case, as shown in FIG. 18, the frame builder includes a first path receiving the BICM encoded data from STx_0 to STx_post, and a second path receiving the BICM encoded data from STx_0+1 to Stx_post+1. The data received in the first path is transmitted through a first antenna (Tx_1) and the data in the second path is transmitted through a second antenna (Tx_2).

As shown in FIG. 18, the frame builder includes a first frame building block 605100 processing the data from the first path and a second frame building block 605200 processing the data from the second path. The first frame building block 605100 includes a first delay compensator 605110, a first pair-wise cell mapper 605120, and a first pair-wise frequency interleaver 605130, and a second frame building block 605200 includes a second delay compensator 605210 processing the data from the second path, a second pair-wise cell mapper 605220, and a second pair-wise frequency interleaver 605230.

The first pair-wise cell mapper 605120 and the first pair-wise frequency interleaver 605130, or the second pair-wise cell mapper 605220 and the second pair-wise frequency interleaver 605230 operate independently but the same functions in the first and the second paths respectively.

A method of processing data in the first frame building block 605100 and the second frame building block 605200.

The first delay compensator 605110 and the second delay compensator 605210 can compensate the L1-pre signaling data or the L1-post signaling data for the delay in the first frame and by the BICM encoder. The L1-signaling information can include information not only in the current frame but also in the next frame. Thus, during the input processing, the L1-signaling information can be delayed one frame as opposed to PLP data inputted in the current frame. Through this process, one frame of the L1-signaling information having information about the current and the next frames.

The first pair-wise cell mapper 605120 and the second pair-wise cell mapper 605220 can perform mapping in the PLP data and the L1-signaling data in symbol units into cell units in a frame in the sub-carrier of the OFDM symbols.

In that case, the PLP data includes a common PLP DATA, a MISO/MIMO encoded PLP data and a sub-slice processor module 605120-1-2 performs frame-mapping in the PLP data in cell units for the diversity effect.

Also, the first pair-wise cell mapper 605120 and the second pair wise cell mapper 605220 can perform frame-mapping in two consecutive inputted cells in pairs.

For the better restoration performance of MISO signals, coherence between MSI transmitting channels should be secured when performing MISO encoding. Thus, in order to secure coherence, the first pair-wise cell mapper 605120 and the second pair-wise cell mapper 605220 pair up cells generated from the same PLP and perform OFDM modulating in the paired-up cells. Then coherence between the channels will be maximized. In other words, according to an embodiment of the present invention, as the MISO encoder is positioned in the front of the BICM encoder, the structure of the frames is in pairs considering such MISO encoding process.

As mentioned above, when performing bit-interleaving or time interleaving by the bit-interleaver and the time interleaver using two FEC blocks, two paired up cells can be generated from two different FEC blocks. As the receiver ensures diversity, higher reception can be obtained. The first pair-wise frequency interleaver 605130 and the second pair-wise frequency interleaver 605230 perform frequency interleaving in the data in cell units from each path and transmits the frequency-interleaved data to the OFDM generator through each path.

In that case, the first pair-wise frequency interleaver 605130 and the second pair-wise frequency interleaver 605230 pair up two consecutive cells in interleaving units and then perform frequency interleaving. This is to maximize coherence between channels.

The frame builder illustrated in FIG. 18 may be applied to the first and second embodiments of the present invention. According to the third and fourth embodiments of the present invention, the frame builder may include a first cell mapper and a second cell mapper instead of the first pair-wise cell mapper 605120 and the second pair-wise cell mapper 605220, and include a first frequency interleaver and a second frequency interleaver instead of the first pair-wise frequency interleaver 605130 and the second pair-wise frequency interleaver 605230.

In detail, according to the third embodiment of the present invention, MISO/MIMO encoding may be performed after frequency interleaving, that is, during an OFDM generating process. In this case, the MISO/MIMO encoding may be performed in OFDM symbol units. When a MISO PLP data cell and a MIMO PLP data cell are mapped to the same OFDM symbol, the OFDM generator may not independently perform MISO encoding/MIMO encoding in OFDM symbol units. Thus, the first cell mapper and the second cell mapper may process MISO PLP data and MIMO PLP data such that the MISO PLP data and the MIMO PLP data are not mapped to the same OFDM symbol.

In the broadcast signal transmitter according to the third embodiment of the present invention, the first cell mapper operates in the same way as the second cell mapper in order to simplify a transmission system, as an embodiment of the present invention.

However, MISO PLP data and L1-pre and post signaling data are input through only a first path, but MIMO PLP data is input through the first path and the second path, and thus, operations of the first and second cell mappers may be changed according to data to be input thereto.

Hereinafter, the operations of the first and cell mappers will be described in detail.

First, the first cell mapper and the second cell mapper may receive the same MISO PLP data input through the first path, and receive the same L1-pre and post signaling data output from a delay compensator. In this case, the first cell mapper and the second cell mapper may map the respective input data to be allocated to subcarriers of an OFDM symbol in a frame.

Second, only the first cell mapper from the first cell mapper and the second cell mapper may receive MISO PLP data and delay-compensated L1-pre and post signaling data. In this case, the second cell mapper may perform mapping on only MIMO PLP.

The first frequency interleaver and the second frequency interleaver may perform frequency interleaving on the data input through each path, and output frequency-interleaved data to the OFDM generator through each path.

In this case, the first frequency interleaver and the second frequency interleaver may perform the frequency interleaving using one OFDM symbol as an interleaving unit. In addition, when the second cell mapper receives only MIMO PLP data, the second frequency interleaver may also perform interleaving on only the MIMO PLP data.

Figure 19:
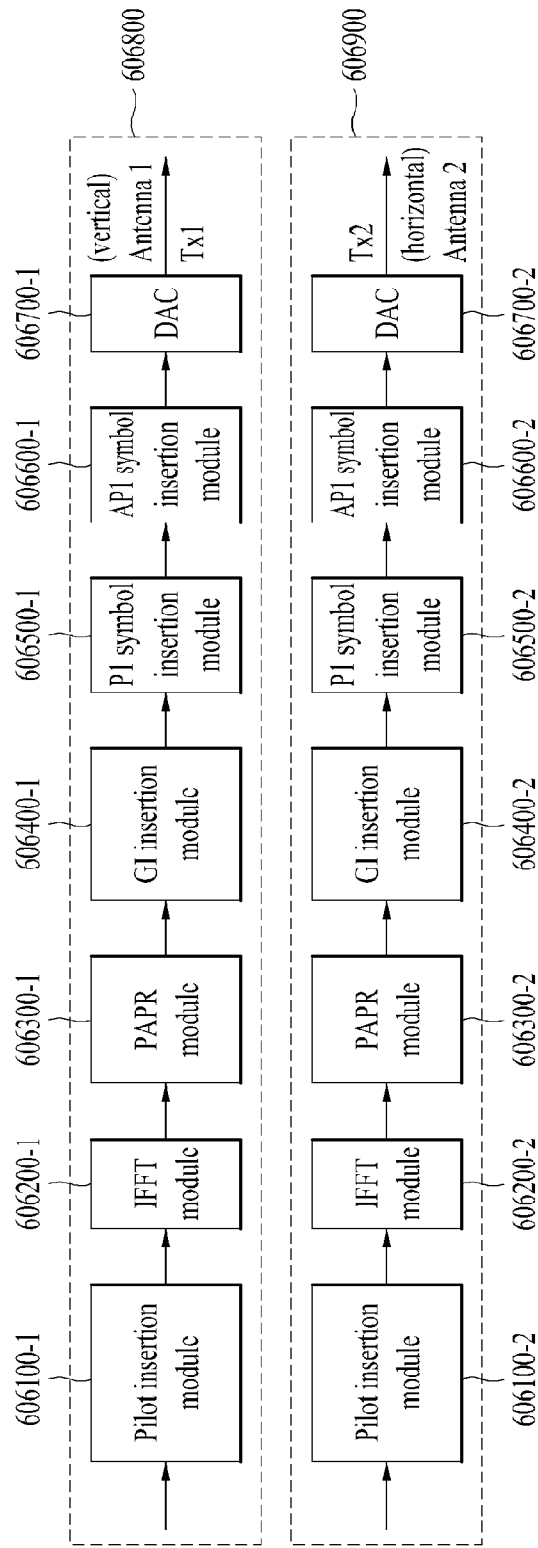
FIG. 19 illustrates a block diagram showing an OFDM generator according to an embodiment of the present invention.

FIG. 19 shows an OFDM generator according to an embodiment of the present invention.

The OFDM generator in FIG. 19 is an embodiment of the OFDM shown in FIG. 1.

The present invention transmits broadcast signals by the MISO/MIMO method through two antennas. The OFDM generator in FIG. 19 receives and modulates the broadcast signals through a first and a second path. It then transmits the signals to two antennas (Tx1, Tx2).

A first OFDM generating block 606800 modulates the broadcast signals through the first antenna (Tx1) and a second OFDM generating block 606900 modulates the broadcast signals through the second antenna (TX2).

If channel correlation between the first and second antennas is large, transmitted signals can apply polarity depending on the channel correlation. In the present invention, such a method is called polarity multiplexing MIMO. The first antenna is called "vertical antenna" and the second antenna is called "horizontal antenna". The first OFDM generating block 606800 performs OFDM modulating on a broadcast signal being inputted from the first path and transmits the OFDM modulated broadcast signal through the first antenna (Tx1) and the second OFDM generating block 606900 performs OFDM modulating on a broadcast signal being inputted from the second path and transmits the OFDM modulated broadcast signal through the second antenna (Tx2).

Modules including the first OFDM generating block 606800 and the second OFDM generating block 606900 are as follows.

The first OFDM generating block 606800 includes a pilot insertion module 606100-1, an IFFT module 606200-1, a PAPR module 606300-1, a GI insertion module 606400-1, a P1 symbol insertion module 606500-1, an AP1 symbol insertion module 606600-1 and a DAC 606700-1.

The second OFDM generating block 606900 includes a pilot insertion module 606100-2, an IFFT module 606200-2, a PAPR module 606300-2, a GI insertion module 606400-2, a P1 symbol insertion module 606500-2, an AP1 symbol insertion module 606600-2 and a DAC 606700-2, wherein modules in the first OFDM generating block 606800 operate the same functions.

Thus, modules in the first OFDM generating block 606800 will be illustrated in more detail. The pilot insertion module 606100-1 inserts a pilot of the predetermined pilot pattern into a frame and transmits it to the IFFT module 606200-1. The pilot pattern information is transmitted with AP1 signaling information or L1-signaling information.

The IFFT module 606200-1 performs IFFT algorithm in the signals and transmits them to the PAPR module 606300-1.

The PAPR module 606300-1 reduces PAPR of the signals in a time domain and transmits them to the GI insertion module 606400-1. Also, feedback on necessary information based on the PAPR reduction algorithm is given to the pilot insertion module 606100-1.

The GI insertion module 606400-1 copies the end of the effective OFDM symbol, inserts guard intervals in cyclic prefix to each OFDM symbol, and transmits them to the P1 symbol insertion module 606500-1. The GI information can be transmitted through the P1 signaling information or L1-pre signaling information.

The P1 and AP1 symbol are inserted in every frame of the P1 insertion module in the OFDM generator. That is, the P1 insertion module can insert more than two preamble symbols in every frame. When using more than two preamble symbols, burst fading that can happen in the mobile fading conditions will be more strengthened and signal detection performance will be improved.

The P1 symbol insertion module 606500-1 inserts a P1 symbol in the beginning of each frame and transmits it to the AP1 symbol insertion module 606600-1.

The AP1 symbol insertion module 606600-1 inserts an AP1 symbol at the end of the P1 symbol and transmits it to the DAC 606700-1.

The DAC 606700-1 converts the signal frame having the P1 symbol to an analog signal and transmits it to the first transmission antenna (Tx1).

The OFDM generator illustrated in FIG. 19 may be applied to the first and second embodiments.

Although not illustrated in FIG. 19, according to the third embodiment of the present invention, the OFDM generator may include a MISO/MIMO encoder, a first OFDM generating block, and a second OFDM generating block. According to the third embodiment of the present invention, the first OFDM generating block and the second OFDM generating block may perform the same operations of the first OFDM generating block 606800 and the second OFDM generating block 606900, respectively.

In detail, when data input through the first path and the second path is MISO PLP data or L1-pre and post signaling data, the MIMO/MISO encoder may perform MISO encoding on the data in OFDM symbol units using a MISO encoding matrix, and then, output the data to the first OFDM generating block and the second OFDM generating block. In this case, the input data may be input through only one path of the first path and the second path. According to an embodiment of the present invention, an example of the MISO encoding matrix may include Orthogonal Space-Time Block Code (OSTBC)/Orthogonal Space Frequency Block Code (OSFBC) or Alamouti Code.

When the data input through the first path and the second path is MIMO PLP data, the MIMO/MISO encoder may perform MIMO encoding on the data in OFDM symbol units using a MIMO encoding matrix, and then, output the data to the first OFDM generating block and the second OFDM generating block through the first path and the second path. According to an embodiment of the present invention, an example of the MIMO encoding matrix may include spatial multiplexing, Golden code (GC), Full-rate full diversity code, Linear dispersion code, or the like.

According to the fourth embodiment of the present invention, the OFDM generator may include a MISO encoder, a first OFDM generating block, and a second OFDM generating block. The first OFDM generating block and second generating block according to the fourth embodiment of the present invention may perform the same operations as those of the first OFDM generating block 606800 and the second OFDM generating block 606900.

The MISO encoder may perform MISO encoding on only frequency-interleaved MISO PLP data, L1-pre signaling data, and L1-post signaling data. An operation of the MISO encoder is the same as the operation of the MIMO/MISO encoder according to the third embodiment. In addition, when MIMO-encoded MIMO PLP data is input to the MISO encoder, the MISO encoder may bypass the MIMO-encoded MIMO PLP data or may also perform MISO encoding on the MIMO-encoded MIMO PLP data.

FIGS. 20 to 24 show a structure block of a broadcast signal receiver according to an embodiment of the present invention.

Figure 20:
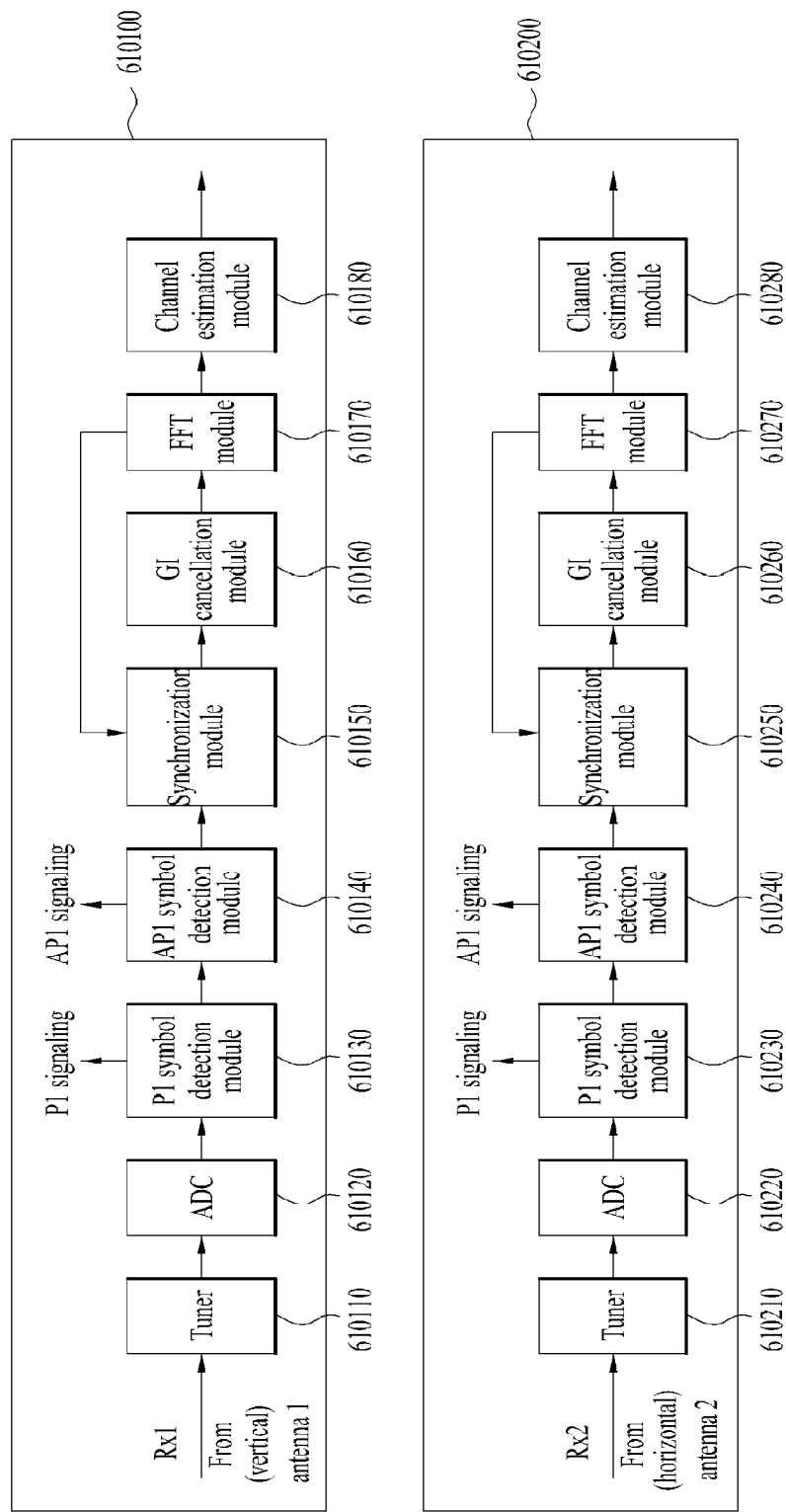
FIG. 20 illustrates a block diagram showing an OFDM demodulator according to an embodiment of the present invention.

FIG. 20 shows an OFDM demodulator according to the first embodiment of the present invention.

The OFDM modulator shown in FIG. 20 is an embodiment of the OFDM demodulator 107100 illustrated in FIG. 2.

According to an embodiment of the present invention, the present invention requires two antennas, Rx1 and Rx2, to receive transmitted signals by MIMO/MISO. The OFDM demodulator shown in FIG. 20 can perform OFDM demodulation through the Rx1 and Rx2 antennas.

A block demodulating a broadcast signal being received through a first antenna (Rx1) is called a first OFDM demodulating block 610100 and a block demodulating broadcast signal being received through a second antenna (Rx2) is called a second OFDM demodulating block 610200.

In addition, the present invention can utilize polarity multiplexing MIMO according to an embodiment of the present invention. The first OFDM demodulating block 610100 performs OFDM demodulation on the broadcast signal received through the first antenna (Rx1) and outputs the broadcast signal to a frame demapper through a first path, and the second OFDM demodulating block 610200 performs OFDM demodulating on the broadcast signal received through the second antenna (Rx2) and outputs the broadcast signal to a frame demapper through a second path.

Also, the OFDM demodulator shown in FIG. 20 can perform the reverse process of the OFDM generator shown in FIG. 19.

The first OFDM demodulating block 610100 and the second OFDM demodulating block 610200 included in OFDM demodulator according to an embodiment of the present invention are as follows.

The first OFDM demodulating block 610100 includes a tuner 610110, an ADC 610120, a P1 symbol detection module 610130, an AP1 symbol detection module 610140, a synchronizing module 610150, a GI cancellation module 610160, a FFT module 610170 and a channel estimation module 610180.

The second OFDM demodulating block 610200 comprises a tuner 610210, an ADC 610220, a P1 symbol detection module 610230, an AP1 symbol detection module 610240, a synchronizing module 610250, a GI cancellation module 610260, a FFT module 610270 and a channel detection module 610280, and operates the same as the first OFDM demodulating block 610100.

Thus, modules in the first OFDM demodulating block 610100 will be further illustrated.

The tuner 610110 receives a broadcast signal of a desired band by selecting a frequency range and transmits it to the ADC 610120 by compensating the size of the received signal.

The ADC 610120 coverts an analog broadcast signal into a digital broadcast signal and transmits it to the P1 symbol detection module 610130.

The P1 symbol detection module 610130 detects a P1 symbol transmitting the P1 signaling information from the digital broadcast signal and decodes the P1 signaling information from the detected P1 symbol. Also, the P1 symbol detection module 610130 transmits the decoded P1 signaling information to the synchronizing module 610150 and a system controller (not shown in the drawing). The system controller determines which frame the received signal has by using the decoded P1 signaling information and controls other devices.

The AP1 symbol detection module 610140 detects an AP1 symbol transmitting the AP1 signaling information from the digital broadcast signal and decodes the AP1 signaling information from the detected AP1 symbol. Also, the AP1 symbol detection module 610140 transmits the decoded AP1 signaling information to the synchronizing module 610150 and a system controller (not shown in the drawing). The system controller determines the pilot pattern information in the current frame and L1-pre spread interval information by using the decoded AP1 signaling information.

The synchronizing module 610150 performs time and frequency synchronizing on the received broadcast signal by using the decoded P1 signaling information and the decoded AP1 signaling information.

The GI cancellation module 610160 deletes a guard interval included in the synchronized signal and transmits to the FFT module 610170.

The FFT module 610170 converts the signal from the time domain to the frequency domain by performing FFT algorithm.

The channel estimation module 610180 estimates a transmitting channel from the transmission antenna to the reception antenna by using pilot signals inserted in the converted signal. Then, the channel estimation module 610180 can additionally perform channel equalizing for each of the received data by using the estimated channel. Signals that are converted into the frequency domain will be inputted in the frame demapper.

The OFDM demodulator illustrated in FIG. 20 may be applied to the first and second embodiments of the present invention.

Although not illustrated in FIG. 20, according to the third embodiment of the present invention, the OFDM demodulator may include a first OFDM demodulating block, a second OFDM demodulating block, and a MISO/MIMO decoder. The first OFDM demodulating block and the second OFDM demodulating block according to the third embodiment of the present invention may perform the same operations as those of the first OFDM demodulating block 610100 and the second OFDM demodulating block 610200. However, the OFDM demodulator according to the third embodiment may include a MIMO/MISO decoder 626300, a detailed operation of which will be described below.

The OFDM demodulator according to the fourth embodiment of the present invention may include a first OFDM demodulating block, a second OFDM demodulating block, and a MISO decoder. The first OFDM demodulating block and second OFDM demodulating block according to the fourth embodiment of the present invention may perform the same operations as those of the first OFDM demodulating block 610100 and the second OFDM demodulating block 610200.

Figure 21:
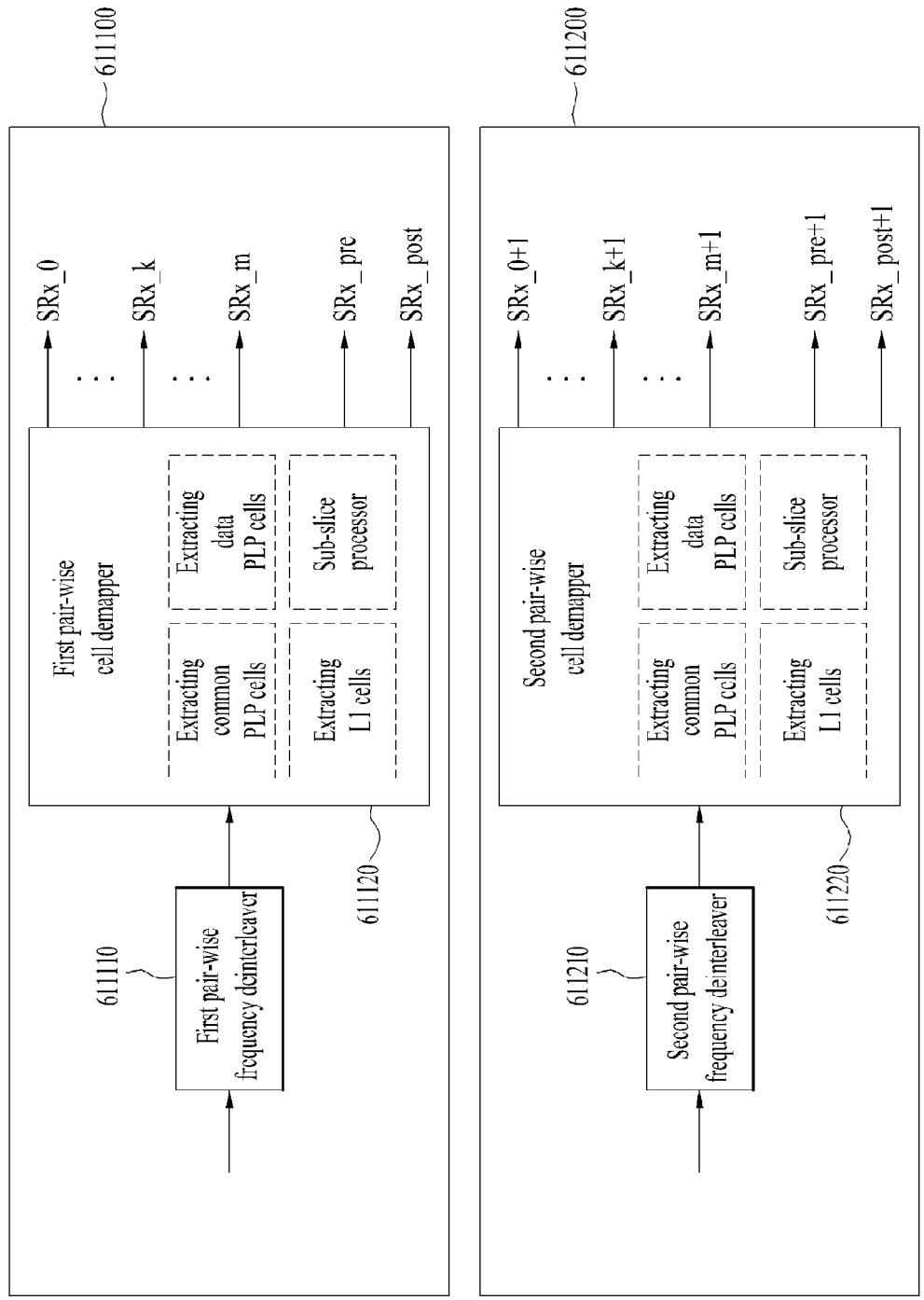
FIG. 21 illustrates a block diagram showing a frame demapper according to an embodiment of the present invention.

FIG. 21 illustrates a frame demapper according to an embodiment of the present invention.

The frame demapper illustrated in FIG. 21 is an embodiment of the frame demapper 107200 described with reference to FIG. 2.

The frame demapper shown in FIG. 21 includes a first frame demapping block 611100 processing data being inputted from a first path and a second frame demapping block 611200 processing data being inputted from a second path. The first frame demapping block 611100 includes a first pair-wise frequency deinterleaver 611110 and a first pair-wise cell demapper 611120, and the second demapping block 611200 includes a second pair-wise frequency deinterleaver 611210 and a second pair-wise cell demapper 611220.

Also, the first pair-wise frequency deinterleaver 61110 and the first pair-wise cell demapper 611120 or the second pair-wise frequency deinterleaver 611210 and the second pair-wise cell demapper 611220 can operate independently or equally on a first path and a second path respectively.

Also, the frame demapper shown in FIG. 21 can perform the reverse process of the frame builder shown in FIG. 18.

A method of performing data by blocks included in the first frame demapping block 611100 and the second frame demapping block 611200 is as follows.

The first pair-wise frequency deinterleaver 611110 and the second pair-wise frequency deinterleaver 611210 perform deinterleaving in the frequency domain on data being inputted through the first and second paths into cell units. In this case, the first pair-wise frequency deinterleaver 611110 and the second pair-wise frequency deinterleaver 611210 pair up two consecutive cells in deinterleaving units and perform frequency deinterleaving. The deinterleaving process can be performed in a reverse direction of the interleaving process performed in the transmitting unit. The frequency-deinterleaved data will be restored and transmitted in the original order.

The first pair-wise cell demapper 611120 and the second pair-wise cell demapper 611220 can extract common PLP data, PLP data and L1-signaling information in cell units from the de-interleaved data. The extracted PLP data includes MISO PLP data for the MISO method and MIMO PLP data for the MIMO method, and the extracted L1-signaling data includes information necessary for the current and next frames. Also, if the transmitter performs sub-slicing in the PLP data, the first and the second pair-wise cell demappers 611120, 611220 can merge the sliced PLP data and generate it in one stream.

Also, the first pair-wise cell demapper 611120 and the second pair-wise cell demapper 611220 can pair up two consecutive cells.

Data transmitted through the first path is inputted to the BICM decoder by the path from SRx_0 to SRx_post and data transmitted through the second path is inputted to the BICM decoder by the path from SRx_0+1 to SRx_post+1.

The frame demapper illustrated in FIG. 21 may be applied to the first and second embodiments of the present invention. According to the third and fourth embodiments of the present invention, the frame demapper may include a first frame demapping block for processing data input through the first path, and a second frame demapping block for processing of data input through the second path.

The first frame demapping block may include a first frequency deinterleaver, a first cell demapper, a first coupler, a second coupler, and a third coupler, and the second frame demapping block may include a second frequency deinterleaver and a second cell demapper.

In addition, the first frequency deinterleaver and the first cell demapper, and the second frequency deinterleaver and the second cell demapper may operate in the same way or may independently operate with respect to the first path and the second path.

The first frequency deinterleaver and the second frequency deinterleaver may perform deinterleaving on data input through the first and second paths in a frequency domain in cell units.

The first cell demapper and the second cell demapper may extract common PLP data, PLP data, and L1-signaling data from the deinterleaved data in cell units. The extracted PLP data may include MISO-decoded MISO PLP data and MIMO-decoded MIMO PLP data, and the extracted L1-signaling data may include information regarding a current frame and next frame. In addition, when the transmitter performs subslicing on the PLP data, a sub-slice processor of the first and second cell demappers may merge the sliced PLP data to generate one stream.

When signal coupling is not performed on the MISO PLP data that is MISO-decoded by the MIMO/MISO decoder, the first coupler may perform signal coupling on the MISO-decoded MISO PLP data.

The second coupler and the third coupler may perform the same function as the first coupler, but are different from the first coupler in that the second coupler and the third coupler perform operations on L1-pre signaling data and L1-post signaling data, respectively.

Figure 22:
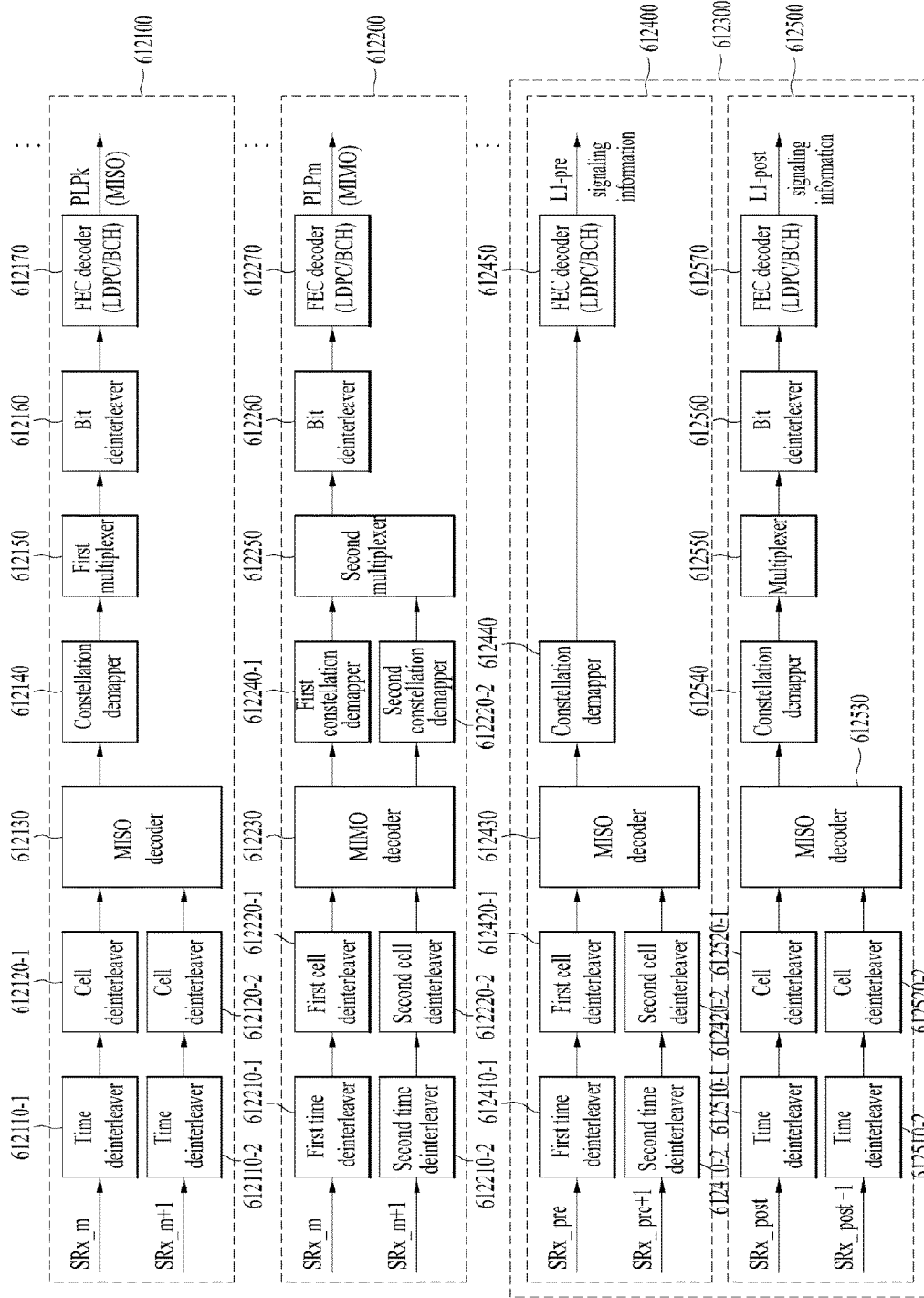
FIG. 22 illustrates a block diagram showing a BICM decoder according to an embodiment of the present invention.

FIG. 22 shows a BICM decoder according to an embodiment of the present invention.

The BICM decoder in FIG. 22 is an embodiment of the BICM decoder 107300 shown in FIG. 2.

The BICM decoder according to the first embodiment receives data from the first path via SRx_0 to SRx_post by a frame demapper and data from the second path via SRx_0+1 to SRx_post+1 and performs BICM decoding.

Also, the BICM decoder according to the first embodiment independently performs MISO encoding and MIMO encoding on data being inputted from each path.

That is, the BICM decoder in FIG. 22 may include a first BICM decoding block 612100 processing by being inputted MISO PLP data, which the MISO method is applied, through two paths (SRx_k and SRx_k+1), a second BICM decoding block 612200 processing by being inputted MIMO PLP data, which the MIMO method is applied, through two paths (SRx_m and SRx_m+1), and a third BICM decoding block 612300 processing by being inputted L1-signaling data, which the MISO method is applied, through four paths (SRx_pre, SRx_pre+1, SRx_post, and SRx_post+1).

Also, the BICM decoder according to the first embodiment of the present invention can perform the reverse process of the BICM encoder shown in FIG. 16.

The following description is a method of processing data of each block.

First, the first BICM decoding block 612100 includes a time deinterleavers 612110-1, 612110-2, cell deinterleavers 612120-1, 612120-2, a MISO decoder 612130, a constellation demapper 612140, a first multiplexer 612150, a bit deinterleaver 612160, and a FEC decoder 612170.

The time deinterleavers 612110-1, 612110-2 perform deinterleaving on inputted data in the time domain and restore the inputted data to original positions. The cell deinterleavers 612120-1, 612120-2 perform deinterleaving on the time-deinterleaved data in cell units.

The MISO decoder 612130 can perform MISO decoding on MISO PLP data. The MISO decoder 612130 can perform following four functions.

First, if the channel estimation modules 610180, 610280 included in the OFDM demodulator shown in FIG. 20 do not perform channel equalizing, the MISO decoder 612130 applies the effect of the channel detection regarding every transmissible reference point and computes an LLR value. Therefore, it can obtain the same effect as the channel equalization.

Second, the MISO decoder 612130 performs the following functions based on the operation of the constellation mapper 604140 included in the BICM encoder of the broadcast signal transmitter shown in FIG. 16. If the constellation mapper 604140 included in the BICM encoder of the broadcast signal transmitter rotates the constellation with a certain angle and delays only the Q-phase element of the constellation for a certain value, the MISO decoder 612130 delays only the I-phase element of the constellation for a certain value and computes a 2D-LLR value based on the constellation rotation angle.

If the constellation mapper 604140 does not rotate the constellation and does not delay the Q-phase of the constellation for a certain value, the MSIO decoder 612130 can compute the 2-D LLR value based on a normal QAM.

Third, the MISO decoder 612130 selects a decoding matrix to perform the reverse process based on the encoding matrix used by the MISO encoder 604150 included in the BICM encoder of the broadcast signal transmitter.

Fourth, the MISO decoder 612130 can combine signals inputted from two reception antennas. The signal combining method includes maximum ratio combining, equal gain combining, and selective combining and obtains the diversity effect by maximizing the SNR of the combined signals.

The MISO decoder 612130 can perform MISO decoding on the combined signal or can combine the MISO-decoded signals after performing MISO decoding on data inputted from the two antennas.

The constellation demapper 612140 can perform the following functions based on the operation of the MISO decoder 612130.

First, if the MISO decoder 612130 does not transmit the LLR value directly and only performs MISO decoding, the constellation demapper 612140 can compute the LLR value. In more detail, if the constellation demapper 604140 included in the BICM encoder of the broadcast signal transmitter shown in FIG. 16 performs constellation rotation or Q-phase element delay, the constellation demapper 612140 delay the I-phase element and then computes the LLR value. If the constellation demapper 604140 does not perform the constellation rotation and Q-phase element delay, the constellation demapper 612140 can compute the LLR value based on the normal QAM.

The computing the LLR value includes computing 2-D LLR and computing 1-D LLR. When computing the 1-D LLR, the complexity of the LLR computation can be reduced by processing either one of a first or a second path.

The first multiplexer 612150 restores demapped data in bit stream.

The bit-deinterleaver 612160 performs deinterleaving in the bit-stream, FEC decoding in the deinterleaved data, and outputs MISO PLP data by correcting errors in the transmitting channels.

The second BICM decoding block 612200 includes a first time deinterleaver 612210-0 and a second time deinterleaver 612210-1, a first cell deinterleaver 612220-0 and a second cell deinterleaver 612220-1, a MIMO decoder 612230, a first constellation demapper 612240-0 and a second constellation demapper 612240-1, a second multiplexer 612250, a bit deinterleaver 612260 and a FEC decoder 612270.

The first time deinterleaver 612210-0 and the second time deinterleaver 612210-1 perform time-deinterleaving on the inputted data into cell units and restore the inputted data in the original order. In that case, the first cell deinterleaver 612230-0 and the second cell deinterleaver 612230-1 performs cell deinterleaving on only a half of data of cells in one FEC block among data inputted from each path. As a result, the cell deinterleaving by the first and second cell deinterleavers 612230-0, 612230-1 has the same effect as deinterleaving by a cell deinterleaver using one FEC block.

The MIMO decoder 612230 performs MIMO decoding on the cell-deinterleaved data inputted from two paths (SRx_m and SRx_m+1). The MIMO decoder 612230 can perform the four functions of the MISO decoder 612110 except for the fourth function in which the signals are to be combined. Then, the MIMO decoder 612230 can perform decoding by using the MIMO encoding matrix.

The first constellation demapper 612240-0, the second constellation demapper 612240-1, the second multiplexer 612250, the bit deinterleaver 612260 and the FEC decoder 612270 can perform the same functions as those of the MISO method.

The third BICM decoding block 612300 includes a first decoding block 612400 for processing L1-pre signaling data and a second decoding block 612500 for processing L1-post signaling data. The first decoding block 612400 includes time deinterleavers 612410-1 and 612410-2, cell deinterleavers 612420-1 and 612420-2, a MISO decoder 612430, a constellation demapper 612440, and an FEC decoder 612450. The second decoding block 612500 includes time deinterleavers 612510-1 and 612510-2, cell deinterleaver 612520-1 and 612520-2, an MISO decoder 612530, a constellation demapper 612540, a multiplexer 612550, a bit deinterleaver 612560, and a FEC decoder 612570.

As functions of each of the blocks included in the first decoding block 612400 and the second decoding block 612500 have the same functions as those of each of the blocks included in the first BICM decoding block 612100, the description of the first decoding block 612400 and the second decoding block 612500 is omitted.

As a result, the first BICM decoding block 612400 outputs the BICM decoded MISO PLP data to an output processor and the second BICM decoding block 612200 transmits the BICM decoded MIMO PLP data to the output processor.

The first decoding block 612400 in the third BICM decoding block 612300 performs MSIO decoding on L1-pre signaling data and outputs L1-pre signaling information. Also, the second decoding block 612500 in the third BCIM decoding block 612300 performs MISO decoding on L1-post signaling data and outputs L1-post signaling information.

Figure 23:
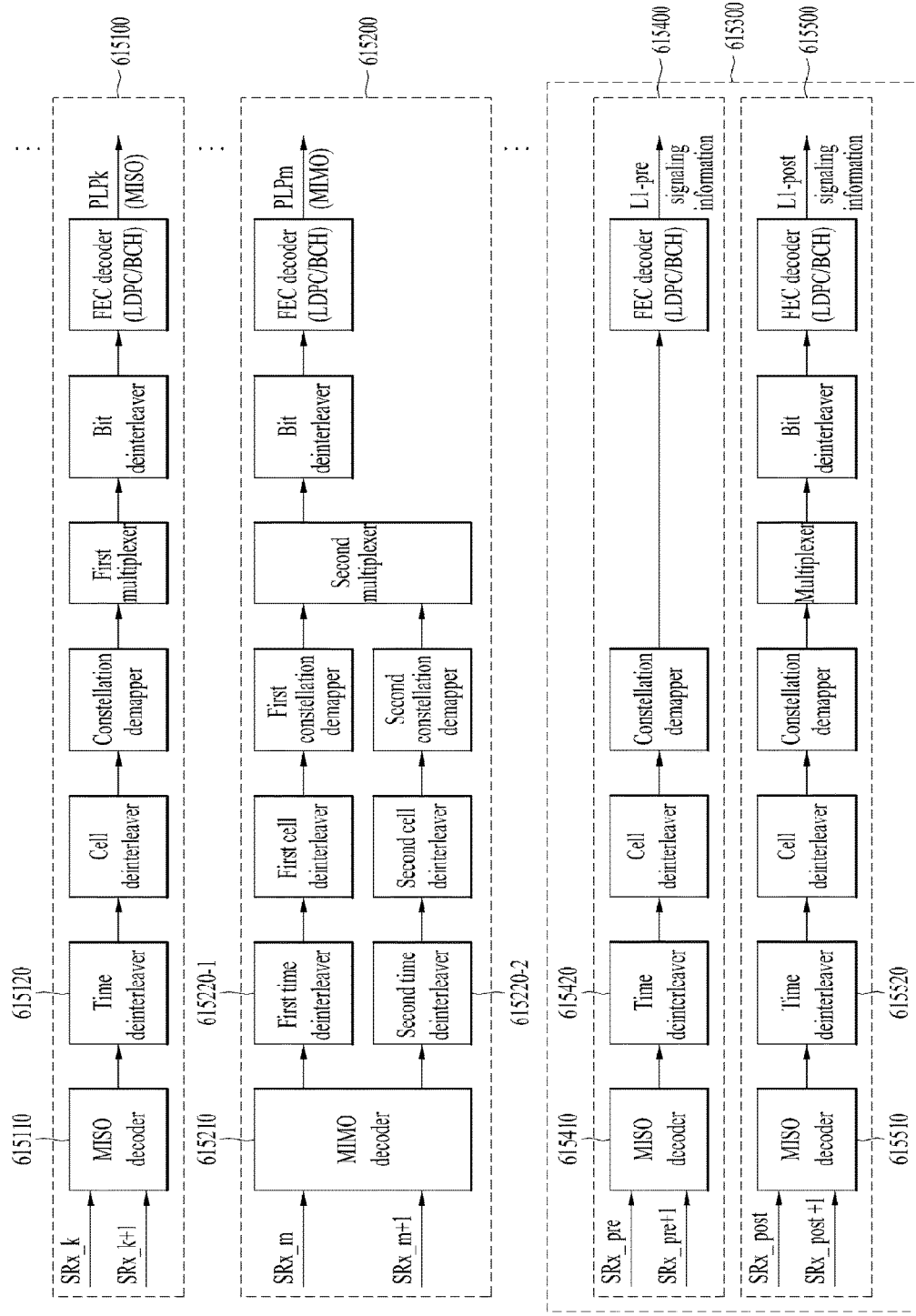
FIG. 23 illustrates a block diagram showing a BICM decoder according to another embodiment of the present invention.

FIG. 23 illustrates a BICM decoder according to another embodiment of the present invention.

The BICM decoder illustrated in FIG. 23 is another embodiment of the BICM decoder 107300 described with reference to FIG. 2 and corresponds to the BICM decoder according to the second embodiment of the present invention.

According to the second embodiment of the present invention, the BICM decoder may receive data, output from a frame demapper through the first path, through a path from SRx_0 to SRx_post, receive data, output through the second path, through a path from SRx_0+1 to SRx_post+1, and perform BICM decoding. In addition, the BICM decoder according to the second embodiment of the present invention may independently perform MISO scheme or MIMO scheme on the data input through each path.

That is, the BICM decoder illustrated in FIG. may include a first BICM decoding block 615100 that receives and processes MISO PLP data using MISO scheme through two paths SRx_k and SRx_k+1, a second BICM decoding block 615200 that receives and processes MIMO PLP data using MIMO scheme through two paths SRx_m and SRx_m+1, and a third BICM decoding block 615300 that processes L1-signaling data using MISO scheme through four paths SRx_pre, SRx_pre+1, SRx_post, and SRx_post+1.

The third BICM decoding block 615300 may include a first decoding block 615400 for processing of L1-pre signaling data and a second decoding block 615500 for processing of L1-post signaling data.

In addition, the BICM decoder according to the second embodiment of the present invention may perform a reverse process to that of the BICM encoder according to the second embodiment illustrated in FIG. 17.

The BICM decoding blocks according to the second embodiment illustrated in FIG. 23 operate in the same way as the BICM decoding blocks according to the first embodiment illustrated in FIG. 22, and thus, a detailed description thereof is omitted. However, the BICM decoder according to the second embodiment is different from the BICM decoder according to the first embodiment is different from the BICM decoder according to the first embodiment in that MISO decoders 615110, 615410, and 615510 and a MIMO decoder 615210 are positioned in front of time deinterleavers 615120, 615220-1, 615220-2, 615420, and 615520.

As described above, the broadcast signal transmitter may process PLP data or signaling data in symbol units after constellation mapping. In addition, the broadcast signal receiver may perform BICM decoding on data received in reverse processes to those of the BICM encoding blocks according to the first embodiment or the second embodiment. In this case, a MISO decoder, a MIMO decoder, a time deinterleaver, and a cell deinterleaver of the broadcast signal receiver may perform the received data in symbol units. However, the BICM decoder of the broadcast signal receiver may first perform MISO decoding or MIMO decoding for each data, and thus, each data is output in bit units. Then, the BICM decoder of the broadcast signal receiver may perform time deinterleaving and cell deinterleaving processes, but requires information regarding a symbol unit of data output in bit units. Thus, the broadcast signal receiver may store information regarding symbol mapping of input bits required for the deinterleaving processes.

Although not illustrated in FIG. 23, the BICM decoder according to the third embodiment of the present invention may include a first BICM decoding block for receiving and processing MISO PLP data that is MISO decoded through one path, a second BICM decoding block for receiving and processing MIMO PLP data that is MIMO decoded through two paths, and a third BICM decoding block for receiving and processing L1-signaling data that is MISO-decoded through two paths. In addition, the third BICM decoding block may include a first decoding block for processing of L1-pre signaling data and a second decoding block for processing of L1-post signaling data.

The BICM decoding blocks according to the third embodiment operate in the same way as the BICM decoding blocks illustrated in FIG. 22. However, the BICM decoding blocks according to the third embodiment is different from the BICM decoding blocks according to the first embodiment in that the BICM decoding blocks according to the third embodiment do not include a MISO decoder and a MIMO decoder.

In addition, the BICM decoder according to the fourth embodiment of the present invention may include a first BICM decoding block for processing MISO PLP data through one path, a second BICM decoding block for receiving and processing MIMO PLP data through two paths, and a third BICM decoding block for receiving and processing L1-signaling data that is MISO decoded through two paths.

In addition, the third BICM decoding block may include a first decoding block for processing of L1-pre signaling data and a second decoding block for processing L1-post signaling data.

The first BICM decoding block and third decoding block according to the fourth embodiment operate in the same way as the BICM decoding blocks illustrated in FIG. 22.

However, the second BICM decoding block according to the fourth embodiment is different from that of the third embodiment in that the second BICM decoding block according to the fourth embodiment includes a MIMO decoder. In this case, MIMO PLP data input to a MIMO decoder through two paths may have the same transmission characteristics or different transmission characteristics. When modulation orders of the MIMO PLP data input through the two paths are the same, the second time deinterleaver, the second cell deinterleaver, and the second constellation demapper may not be used. Thus, two MIMO PLP data may be merged into one input, may be input to the first time deinterleaver, and then, may be input to the second mux through the first cell deinterleaver and the first constellation demapper. In addition, the MIMO decoder may be positioned in front of the time deinterleavers as in the first embodiment or may be positioned in front of the constellation demappers as in the second embodiment.

Figure 24:
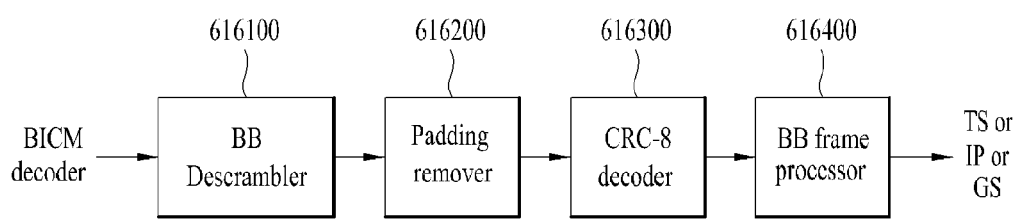
FIG. 24 illustrates a block diagram showing an output processor according to an embodiment of the present invention.
Figure 25:
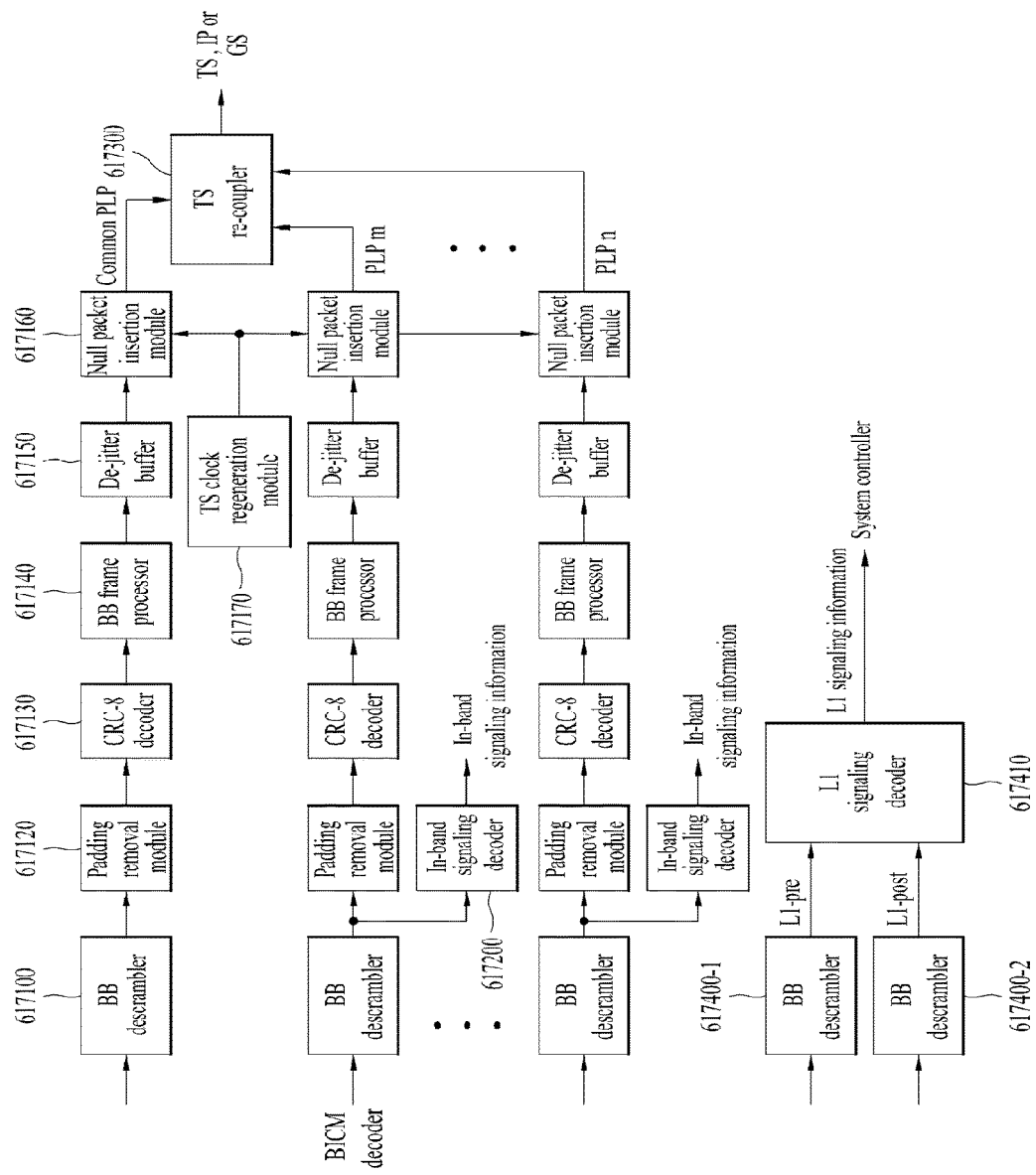
FIG. 25 illustrates a block diagram showing an output processor according to another embodiment of the present invention.

FIG. 24 and FIG. 25 show embodiments of an output processor included broadcast signal receiver according to each embodiment. The following is a specific description of the output processor according to an embodiment of the present invention.

FIG. 24 shows an output processor of the broadcast signal receiver according to an embodiment of the present invention.

The output processor in FIG. 24 is an embodiment of the output processor 107400 in FIG. 2.

The output processor in FIG. 24 as opposed to an input processor performing single PLP in FIG. 13 performs the reverse process of it and includes a BB descrambler 616100, a padding remove module 616200, a CRC-8 decoder 616300 and a BB frame processor 616400. The output processor performs the reverse process of the input processor by receiving bit streams from the BICM decoder (or decoding module) performing the inverse process of the BICM encoder of the broadcast signal transmitter.

The BB descrambler 616100 receives bit stream, performs XOR algorithm with the same bit-string as PRBS processed by the BB scrambler and outputs it. The padding removal module 616200 removes, if necessary, padding bits inserted in the padding insertion module. The CRC-8 decoder 616300 performs CRC decoding in the bit-stream and the BB frame processor 616400 decodes information in the BB frame header and restores at least one of TS, IP and GS streams by using the decoded information.

FIG. 25 shows another embodiment of an output processor of the present invention.

The output processor in FIG. 25 as opposed to the input processor in FIG. 14 and FIG. 15 performing a plurality of PLP performs the reverse process of it. The output processor includes a plurality of blocks for a plurality of PLP. The blocks are as follows. The output processor includes a BB descrambler 617100, 617400-1, 617400-2) and a padding removal module 617120, a CRC-8 decoder 617130, a BB frame processor 617140, a De-jitter buffer 617150, a null packet insertion module 617160, a TS clock regeneration module 617170, an in-band signaling decoder 617200, a TS recombination module 617300 and a L1 signaling decoder 617410. The description of the same blocks as blocks described in FIG. 24 is omitted.

Processing for a plurality of PLP can be shown as decoding PLP data regarding common PLP or decoding service components like scalable video service or a plurality of services at once. The BB descrambler 617110, the padding removal module 617120, the CRC-8 decoder 617130 and the BB frame processor 617140 operate the same as those in FIG. 24.

The De-jitter buffer 617150 compensates a temporarily inserted delay for the synchronization of a plurality of PLP based on Time To Output (TTO) parameters. The null packet insertion module 617160 restores the deleted null packet based on the Deleted Null Packet (DNP) information. The TS clock regeneration module 617170 restores the detailed time synchronization of the outputted packet based on Input Stream Time Reference information. The TS recombination module 617300 receives the restored common PLP and related PLP data and transmit the original TS, IP or GS. The TTO parameters, DNP information, and ICSR information are obtained by the BB frame processor and it can transmit the data to each block or a system controller.

The in-band signaling decoder 617200 restores in-band signaling information via the padding bit filed of PLP data and transmits it.

As for L1 signaling information, the BB descramblers 617400-1, 617400-2 performs descrambling in the corresponding L1-pre signaling information data and L1-post signaling information, and the L1 signaling decoder 617410 decodes the descrambled data and restores the L1 signaling information. The restored L1-signaling information includes L1-pre signaling information and L1-post signaling information. It will also be transmitted to the system controller and provides parameters for BICM decoding, frame demapping, and OFDM demodulating. The L1 signaling information can be inputted and descrambled to one BB descrambler.

Meanwhile, as described above, according to the present invention, a PLP including SI required to decode a data PLP is referred to as an SI PLP (which is also referred to as a base PLP, an anchor PLP, or a signaling PLP). In this case, the receiver may decode the SI PLP including the SI, and then, decode the data PLP containing service components. Basically, the SI PLP may contain NIT, SDT, EIT information, etc. of various services as well as PAT/PMT, SDT information, etc. of one service. In a conventional broadcast system, the NIT, SDT, and EIT information is transmitted through a common PLP. According to the present invention, the SI PLP may be configured using only SI or one PLP may be configured by coupling the SI to another service component. According to the present invention, the SI PLP may be configured as a common PLP or a data PLP. Each PLP may be classified into a type 1 PLP or a type 2 PLP according to whether subslicing is present.

In addition, as described above, according to the present invention, at least one of the plural in-band signaling/padding insertion modules 603300 that respectively process a plurality of PLPs may signal in-band signaling information to a corresponding PLP according to control of the scheduler 603100 of FIG. 15. In this case, the PLP to which in-band signaling information is signaled may be each service component PLP, an SI PLP, or a common PLP.

Each of these cases will now be described.

As a first method, the in-band signaling information is signaled to each service component and transmitted. In this method, service component PLPs have respective in-band signaling information. In this case, the service component PLP is transmitted like data, and thus, the service component PLP has robustness like data. That is, the in-band signaling information is signaled in each service component PLP.

As a second method, the in-band signaling information is signaled to the SI PLP and transmitted. According to an embodiment, the in-band signaling information of service components included in each service is signaled to the SI PLP and transmitted. In this case, in order to decode the service component PLP, basically, the PAT/PMT and SDT information needs to be known in advance by decoding the SI PLP. In order to access all data PLPs through the SI PLP, the in-band signaling information may be signaled to the SI PLP based on these characteristics. Unlike in the first method, the second method is advantageous in that in-band signaling robustness that is different from that of data PLP may be achieved. Unlike in a conventional method of signaling in-band signaling information to all PLPs, the in-band signaling information may be intensively transmitted. Thus, it is advantageous in that frame configuration and common information does not have to be transmitted to all PLPs, thereby reducing signaling overhead.

As a third method, the in-band signaling information is signaled to the common PLP and transmitted. This method is advantageous in that robustness unlike in the data PLP and low overhead may be achieved by transmitting the in-band signaling information using the common PLP for transmitting of SI shared by various services like in a case in which the SI PLP is used. In this case, some or all PLPs of a PLP group (PLP_GROUP) constituting the common PLP may include the in-band signaling information, some or all PLPs belonging to a current frame may include the in-band signaling information, or some PLP belonging to the PLP_GROUP or the current frame may include the in-band signaling information. It may be possible to use both type 1 and type 2 PLPs as the common PLP according to whether subslicing is used.

The in-band signaling information signaled to at least one of the data PLP, the SI PLP, and the common PLP may include information regarding a next interleaving frame, information for identifying of a T2 frame length, information for identifying of a next NGH frame, or the like. For example, the in-band signaling information may include all information required to decode a corresponding PLP from a next signal frame. For example, the information required to decode the corresponding PLP from the next signal frame may dynamic L1-post signaling information. When the in-band signaling information includes the dynamic L1-post signaling information, the receiver may not have to decode a preamble at every signal frame, thereby minimizing power consumption of the receiver.

According to the present invention, an interleaving frame is a unit in which time interleaving is performed. For example, with regard to a T2 frame, when a medium or low bit-rate is used, time interleaving may be used across one or more T2 frames. That is, one interleaving frame may include a plurality of T2 frames. On the other hand, when a high bit-rate is used, a plurality of interleaving frames may be transmitted to one T2 frame. That is, the T2 frame may include a plurality of interleaving frames. Here, the T2 frame are exemplified, but is a just an example for aiding in understanding. Alternatively, an NGH frame or FEF instead of the T2 frame may also be applied in the same way as the T2 frame.

For example, it is assumed that in-band signaling information of associated PLP with an SI PLP is signaled and transmitted. Here, the associated PLP is one of PLPs of service components included in the corresponding SI PLP. When the receiver intends to decode a service, the receiver may assess only the SI PLP, and then, may also access the associated PLP according to a channel situation. In this case, when the SI PLP is not used, the receiver reacquires dynamic L1-post signaling information regarding the associated PLP through a preamble.

The receiver may decode at least one of a PLP, that is, the service component PLP (corresponding to the first method), the SI PLP (corresponding to the second method), and the common PLP (corresponding to the third method), which include the in-band signaling information, according to each method (or each case), and then, access desired service component PLP using the decoded in-band signaling information.

According to the present invention, the in-band signaling information may be signaled using a method obtained by combining at least two of the aforementioned methods.

For example, mixed types of the aforementioned first, second, and third methods may be used between different service components in a frame. For example, the in-band signaling information of some PLPs in one frame may be signaled using the SI PLP and the in-band signaling information of other PLPs may be signaled using the common PLP.

As another example, the following three methods may be used to signal the in-band signaling information for a service component PLP that does not have the PLP_GROUP. As a first method, the in-band signaling information of the service component PLP that does not have the PLP_GROUP is signaled to the common PLP for other service components and transmitted. As a second method, the in-band signaling information of the service component PLP that does not have the PLP_GROUP is signaled using the SI PLP of corresponding service components and transmitted. As a last method, the in-band signaling information of the service component PLP is signaled to the service component PLP that does not have the PLP_GROUP and transmitted.

As another example, the in-band signaling information may be hierarchically signaled. This example relates to a method including two steps, in which the in-band signaling information of an SI PLP of each service is signaled to the common PLP and transmitted, and the in-band signaling information of service components included in the SI PLP is signaled to the SI PLP and transmitted. In this case, the receiver decodes the common PLP to acquire the in-band signaling information regarding the SI PLP, and then, decodes the SI PLP to acquire the in-band signaling information regarding corresponding service components. This method is disadvantageous in that an in-band signaling process having two steps is required to acquire the in-band signaling information of the service components, thereby increasing latency.

According to an embodiment of the present invention, the signaling of the in-band signaling information, which has been described thus far, is performed by at least one of the plural in-band signaling/padding insertion modules 603300 according to control of the scheduler 603100 illustrated in FIG. 15. In addition, according to an embodiment of the present invention, the decoding of the in-band signaling information by the receiver is performed by at least one of the plural in-band signaling decoder illustrated in FIG. 25.

Hereinafter, a method of signaling in-band signaling information for a base layer and an enhancement layer when data is encoded and transmitted using an SVC method will be described with regard to embodiments of the present invention.

Due to SVC characteristics, the enhancement layer is serviced together with the base layer. When the base layer is not present, the enhancement layer is not valid. Thus, it is more effective to signal the in-band signaling information of enhancement layer service components to base layer service component PLP than to signal the in-band signaling information of corresponding PLP to independent enhancement layer service component PLP. Thus, according to an embodiment of the present invention, the in-band signaling information of the enhancement layer service component is signaled to the base layer service component PLP.

In this case, the base layer service component PLP includes the in-band signaling information of the enhancement layer service component (or an enhancement layer service component PLP) as well as the in-band signaling information of the corresponding PLP. In other words, the base layer component PLP may include both information required to decode the base layer service component PLP from a next signal frame and information required to decode the enhancement layer service component PLP. On the other hand, the enhancement layer service component PLP does not signal the in-band signaling information thereof to corresponding PLP, and thus, the enhancement layer service component PLP does not have in-band signaling information.

With regard to continual reception of the receiver, in-band signaling information is used. In this case, when SVC is used, the in-band signaling information, for example, dynamic L1-post signaling information of the base and enhancement layer service components may be acquired using the in-band signaling information signaled to the base layer service component PLP.

According to another embodiment of the present invention, the in-band signaling information of the enhancement layer service component PLP may be signaled as an associated PLP with an SI PLP. For example, the in-band signaling information may include dynamic L1-post signaling information. In this case, the receiver intends to decode a service, the receiver may access only the SI PLP, and then, may also access the associated PLP, that is, an enhancement layer service component PLP according to a channel situation. When the SI PLP is not used, the receiver reacquires the dynamic L1-post signaling information regarding the associated PLP through a preamble.

In this case, the in-band signaling information of the base layer service component PLP may be signaled to a corresponding base layer service component PLP or an SI PLP.

Figure 26:
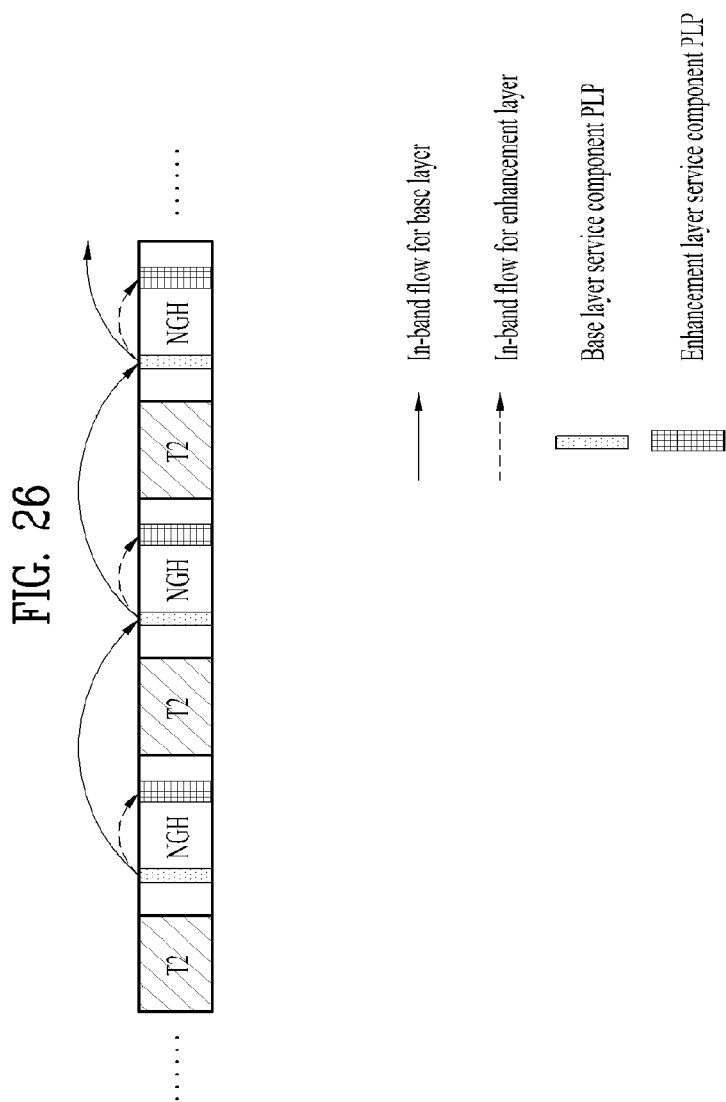
FIG. 26 illustrates in-band signaling flow of base layer service components and enhancement layer service components according to an embodiment of the present invention.

FIG. 26 illustrates in-band signaling flow of base layer service components and enhancement layer service components according to an embodiment of the present invention. FIG. 26 illustrates an example in which both a base layer service component PLP and an enhancement layer service component PLP are transmitted through respective NGH frames. In FIG. 26, a full line arrow indicates in-band signaling flow for the base layer, and a dotted line arrow indicates in-band signaling flow for the enhancement layer. That is, FIG. 26 illustrates a method of signaling in-band signaling information of the base layer service component and enhancement layer service component through the base layer service component PLP.

In a time division multiplexer (TDM) frame structure illustrated in FIG. 26, when both the base layer service component PLP and the enhancement layer service component PLP are mapped to one frame, a region for the base layer in the frame is referred to as a subframe 1, and a region for the enhancement layer is referred to as a subframe 2. In this case, according to an embodiment of the present invention, in-band signaling information of a base layer of a next frame (i.e., an interleaving frame) and in-band signaling information of an enhancement layer present in the subframe 2 in a current frame are signaled to the base layer of the current frame. In other words, the base layer service component PLP includes information regarding a next interleaving frame and the in-band signaling information regarding the enhancement layer present in the subframe 2 in the current frame (that is, the interleaving frame). On the other hand, the enhancement layer service component PLP does not signal in-band signaling information thereof, and thus, the enhancement layer service component PLP does not have in-band signaling information. Thus, it is possible to access enhancement layer service components through base layer service components. During initial acquisition via initial out-of-band (OOB) signaling, the base layer service components may be accessed via OOB signaling, and then, the enhancement layer service components may be accessed using the in-band signaling information included in the based layer service components. Thus, OOB signaling for the enhancement layer is not required. In this case, overhead of an L1 field may be reduced.

Hereinafter, an in-band signaling method in consideration of interleaving frame (IF) and SVC will be described with regard to first through fourth embodiments of the present invention.

According to a first embodiment, different interleaving frame structures are used to base layer service components and enhancement layer service components, respectively. According to the first embodiment, as an embodiment of the present invention, an interleaving frame window is provided, and the base layer and the enhancement layer have the different interleaving frame structures in respective regions of the window. In this case, the first embodiment is disadvantageous in that all flexible interleaving frame structures need to be signaled to in-band signaling information, causing high in-band signaling overhead and complexity. The receiver decodes the base and enhancement layer service components in interleaving frame window units using information of the interleaving frame signaled to the in-band signaling information.

Figure 27:
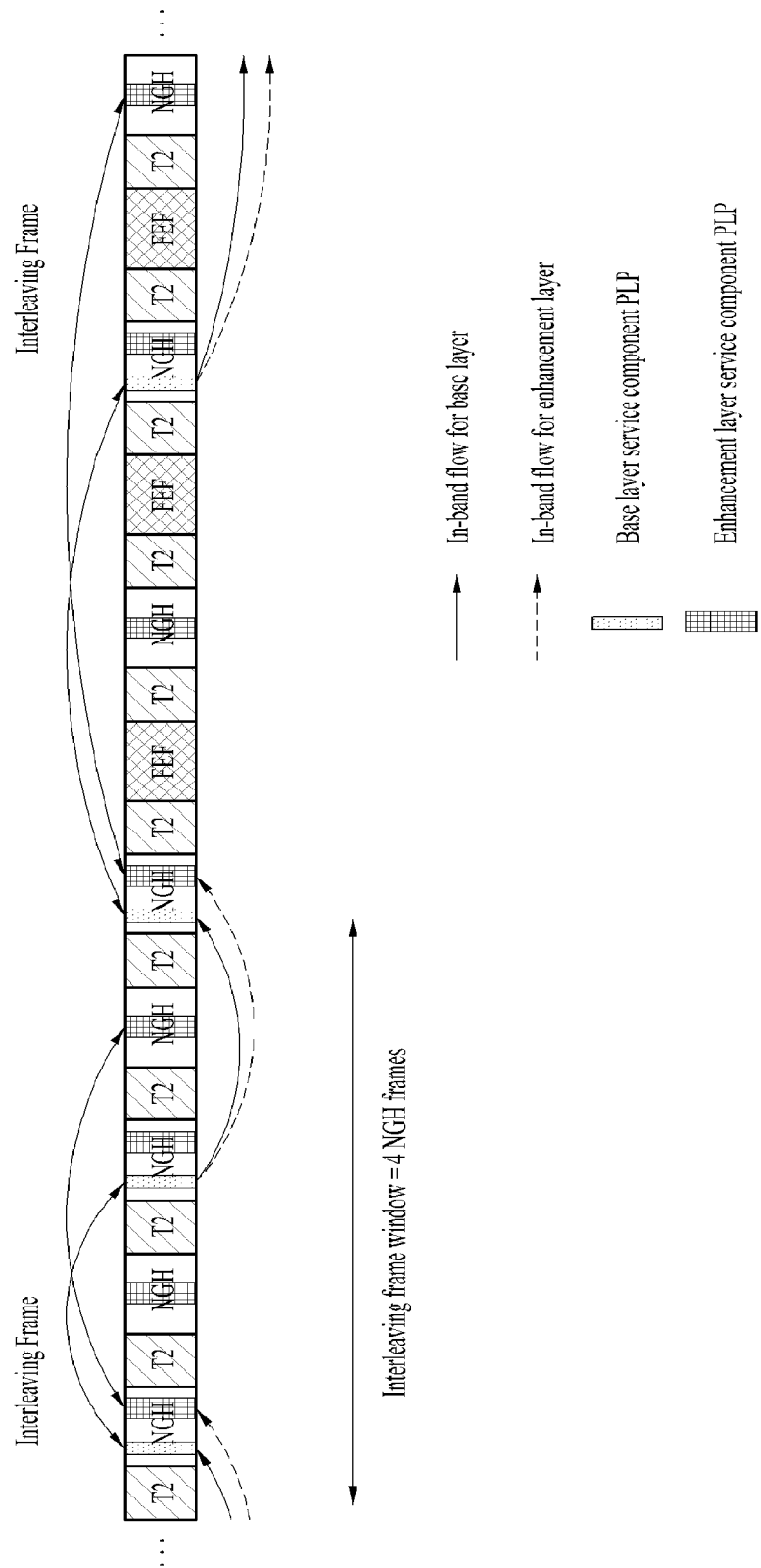
FIG. 27 illustrates in-band signaling flow of base layer service components and enhancement layer service components according to another embodiment of the present invention.

FIG. 27 illustrates in-band signaling flow of base layer service components and enhancement layer service components according to the first embodiment of the present invention. In particular, FIG. 27 illustrates an example in which both a base layer service component PLP and an enhancement layer service component PLP are transmitted or only the enhancement layer service component PLP is transmitted through each NGH frame. In FIG. 27, a full line arrow indicates in-band signaling flow for the base layer, and a dotted line arrow indicates in-band signaling flow for the enhancement layer. According to an embodiment of the present invention, FIG. 27 illustrates an interleaving frame structure, a time interleaving length for base layer service components of which is 2 (P_I=2 or a TIME_IL_LENGTH field=2) and a T2 frame interval of which is 2 (I_JUMP=2 or FRAME_INTERVAL field=2), and an interleaving frame structure, a time interleaving length for enhancement layer service components of which is 4 (P_I=4 or TIME_IL_LENGTH field=2) and a T2 frame interval of which is 1 (I_JUMP=1 or FRAME_INTERVAL field=1). According to the first embodiment, an interleaving frame window is obtained from a least common multiple (1 cm) of multiplications of I_JUMP and P_I of two interleaving frames, and thus, is a 4 NGH frame. That is, the interleaving frame window=1 cm ($P_{B\_I} \times I_{B\_JUMP}$, $P_{E\_I} \times I_{E\_JUMP}$)=1 cm (4,4)=4 NGH frame. In this case, according to an embodiment of the present invention, in-band signaling information regarding base layer service components and enhancement layer service components is signaled through the base layer service components and transmitted.

According to the second embodiment, the same interleaving frame structure is used with respect to base and enhancement layer service components, and a constant gap or interval is used between interleaving frames. Thus, in a superframe, both two layers may have the same interleaving frame structure and the same number of interleaving frames. In addition, the base layer and the enhancement layer have a constant frame gap (or interval) therebetween. In other words, a base layer service component PLP and an enhancement layer service component PLP have a constant gap therebetween and are mapped to different NGH frames. According to the second embodiment, complexity and in-band signaling overhead is significantly reduced, but flexibility is also reduced, compared with the first embodiment. The receiver decodes the base and enhancement layer service components using the interleaving frame structure of each layer signaled to the in-band signaling information and gap information.

Figure 28:
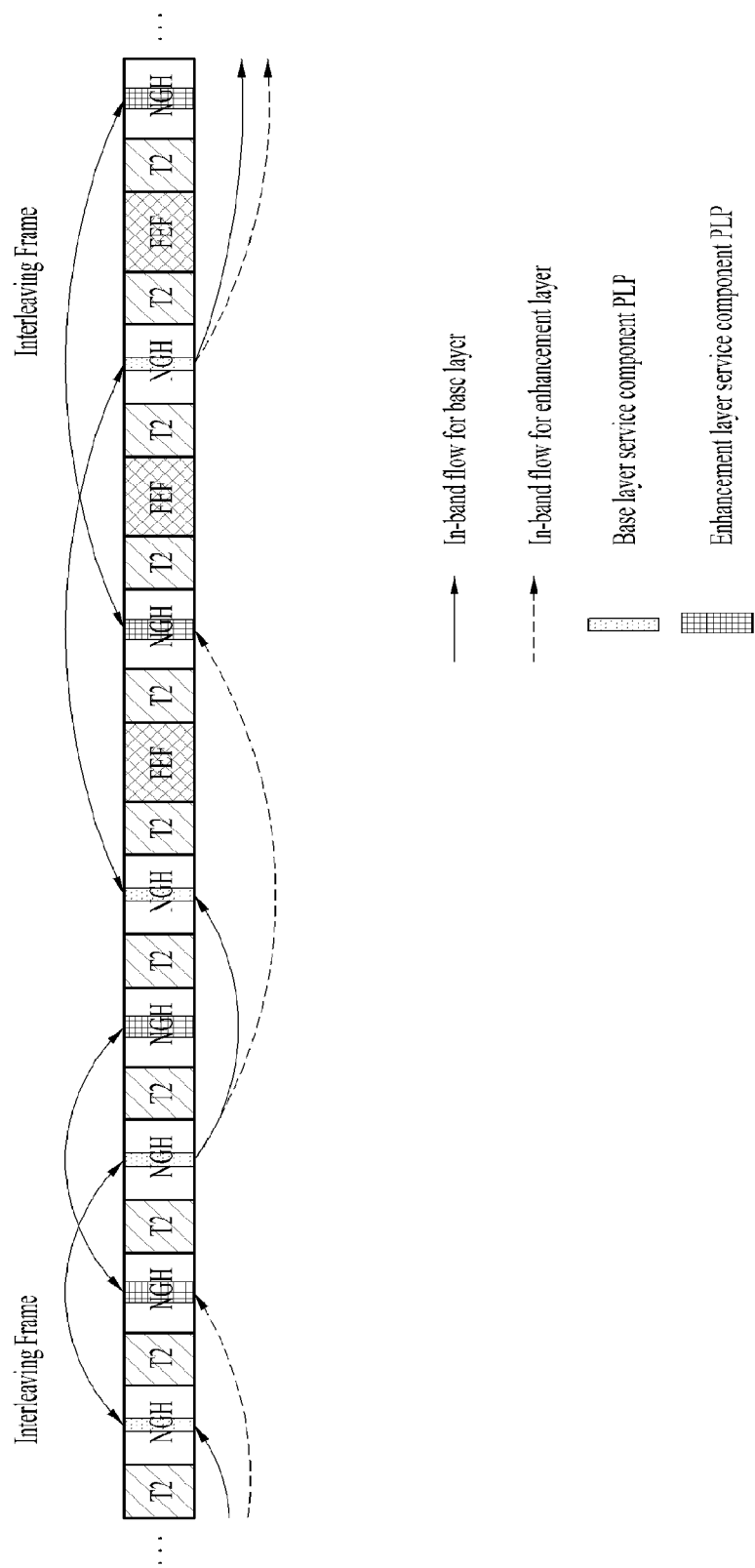
FIG. 28 illustrates in-band signaling flow of base layer service components and enhancement layer service components according to another embodiment of the present invention.

FIG. 28 illustrates in-band signaling flow of base layer service components and enhancement layer service components according to the second embodiment of the present invention. In particular, FIG. 28 illustrates an example in which any one of a base layer service component PLP and an enhancement layer service component PLP is transmitted through each NGH frame. That is, the base layer service component PLP and the enhancement layer service component PLP are mapped to different NGH frames. In FIG. 28, a full line arrow indicates in-band signaling flow for the base layer, and a dotted line arrow indicates in-band signaling flow for the enhancement layer. According to an embodiment of the present invention, FIG. 28 illustrates an interleaving frame structure, a time interleaving length for base and enhancement layer service components of which is 2 (P_I=2 or TIME_IL_LENGTH field=2) and a T2 frame interval of which is 2 (I_JUMP=2 or FRAME_INTERVAL field=2), and an interleaving frame structure, a gap between interleaving frames of which is 1 NGH frame. In this case, according to an embodiment of the present invention, in-band signaling information regarding base layer service components and enhancement layer service components is signaled through the base layer service components and transmitted.

According to the third embodiment, the base and enhancement layer service components use the same interleaving frame structure and are mapped to the same NGH frame. Thus, in a superframe, both two layers may have the same interleaving frame structure and the same number of interleaving frames. In addition, base and enhancement layer PLP are mapped to the same NGH frame. According to the third embodiment, complexity and in-band signaling overhead are significantly reduced, but flexibility is also reduced, compared with the first and second embodiments. The receiver decodes the base and enhancement layer service components using the interleaving frame structure of each layer signaled to the in-band signaling information.

Figure 29:
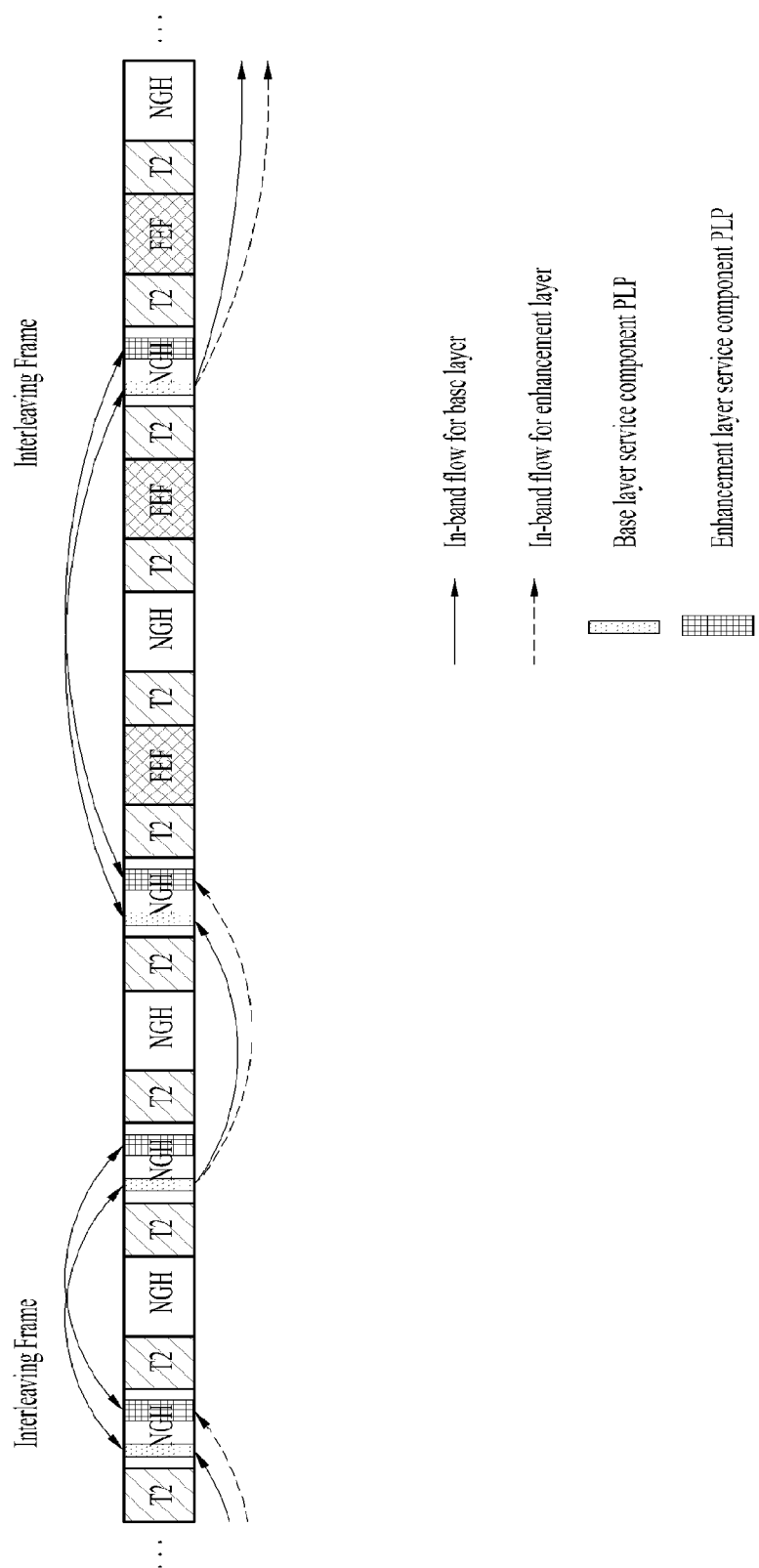
FIG. 29 illustrates in-band signaling flow of base layer service components and enhancement layer service components according to another embodiment of the present invention.

FIG. 29 illustrates in-band signaling flow of base layer service components and enhancement layer service components according to the third embodiment of the present invention. In particular, FIG. 29 illustrates an example in which both a base layer service component PLP and an enhancement layer service component PLP are transmitted through a specific NGH frame. That is, the base layer service component PLP and the enhancement layer service component PLP are mapped to the same NGH frame. In FIG. 29, a full line arrow indicates in-band signaling flow for the base layer, and a dotted line arrow indicates in-band signaling flow for the enhancement layer. According to an embodiment of the present invention, FIG. 29 illustrates an interleaving frame structure, a time interleaving length for base and enhancement layer service components of which is 2 (P_I=2 or TIME_IL_LENGTH field=2) and a T2 frame interval of which is 2 (I_JUMP=2 or FRAME_INTERVAL field=2), and illustrates that interleaving frames of two layers are mapped to the same NGH frame. In this case, according to an embodiment of the present invention, in-band signaling information regarding base layer service components and enhancement layer service components is signaled through the base layer service components and transmitted.

According to the fourth embodiment, the base and enhancement layer service components use the same interleaving frame structure and are co-scheduled in the same NGH frame. Thus, in a superframe, both two layers may have the same interleaving frame structure and the same number of interleaving frames. In addition, the base and enhancement layer service components are co-scheduled in a specific NGH frame. Thus, some information such as the start address, PLP type, and the like of the enhancement layer does not have to be signaled to the in-band signaling information, thereby reducing in-band signaling overhead. The method according to the fourth embodiment is very simple from an overall point of view. In addition, according to the fourth embodiment, complexity and in-band signaling overhead is significantly reduced, but flexibility is also reduced, compared with the first to third embodiments. The receiver decodes the co-scheduled base and enhancement layer service components using the interleaving frame structure of each layer signaled to the in-band signaling information.

Figure 30:
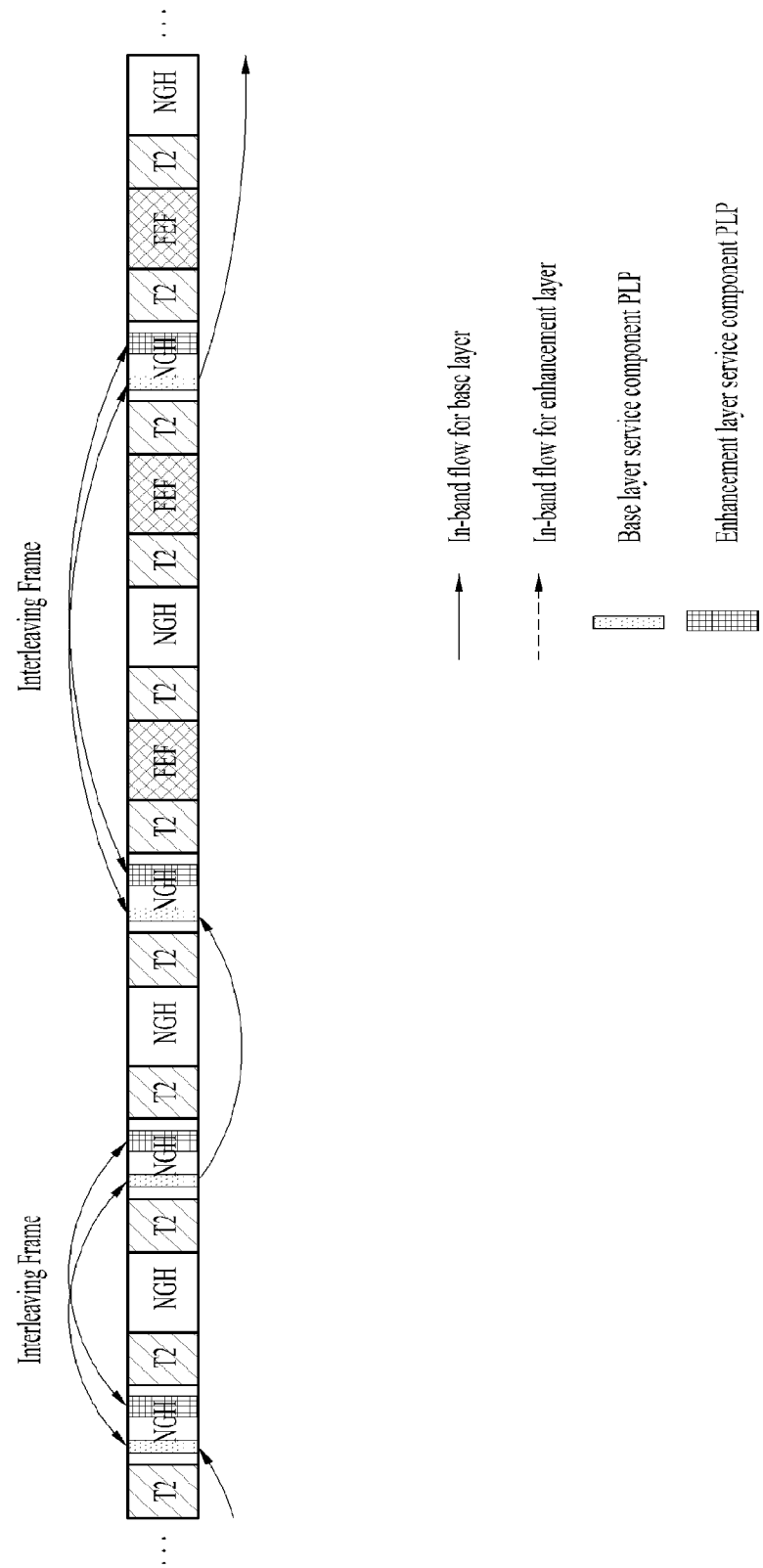
FIG. 30 illustrates in-band signaling flow of base layer service components and enhancement layer service components according to another embodiment of the present invention.

FIG. 30 illustrates in-band signaling flow of base layer service components and enhancement layer service components according to the fourth embodiment of the present invention. In particular, FIG. 30 illustrates an example in which both base layer service component PLP and enhancement layer service component PLP are transmitted through a specific NGH frame. That is, the base layer service component PLP and the enhancement layer service component PLP are mapped to the same NGH frame. In FIG. 30, a full line arrow indicates in-band signaling flow for the base layer, and a dotted line arrow indicates in-band signaling flow for the enhancement layer. According to an embodiment of the present invention, FIG. 30 illustrates an interleaving frame structure, a time interleaving length for base and enhancement layer service components of which is 2 (P_I=2 or TIME_IL_LENGTH field=2) and a T2 frame interval of which is 2 (I_JUMP=2 or FRAME_INTERVAL field=2), and illustrates that interleaving frames of two layers are co-scheduled to the same NGH frame. In this case, according to an embodiment of the present invention, in-band signaling information regarding base layer service components and enhancement layer service components is signaled through the base layer service components and transmitted.

Figure 31:
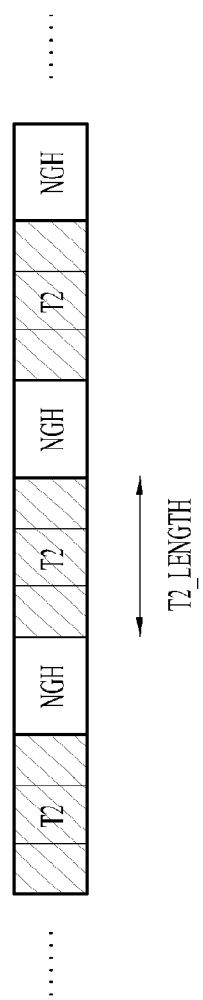
FIG. 31 illustrates a method for signaling length information of a T2 frame according to an embodiment of the present invention.

Hereinafter, a method of signaling a gap between NGH frames (FETs), that is, a T2 frame length when an NGH frame is transmitted to the FET like in FIG. 31 will be described.

A T2_LENGTH parameter indicates a distance from a symbol P1 of a T2 frame (an elementary frame, or a terrestrial broadcast frame) to a symbol P1 of a next NGH frame (FEF). The T2_LENGTH parameter indicates how many element periods (Ts) are included in the T2 frame.

The FEFs are equally configured in one superframe, and thus, the T2_LENGTH parameter may be signaled to a field having constant characteristics in configurable L1-post signaling information of L1-pre signaling information or L1-post signaling information. In addition, the T2_LENGTH parameter may be signaled to the in-band signaling information for information of a next interleaving frame. At least one of the aforementioned methods may be applied as the in-band signaling method. That is, the T2_LENGTH parameter may be signaled to at least one of a data PLP, an SI PLP, and a common PLP by the in-band signaling/padding insertion module 603300.

According to an embodiment of the present invention, a field length of the T2_LENGTH parameter signaled to at least one of the L1-pre signaling information, L1-post signaling information, and in-band signaling information is 30 bits. Throughout this specification, this field will be referred to as a T2_LENGTH field.

The receiver may recognize a T2 frame and an FET structure through a value of the T2_LENGTH field signaled to at least one of the L1-pre signaling information, L1-post signaling information, and the in-band signaling information. That is, the receiver may recognize when a next FEF, that is, a NGH frame is shown based on the T2_LENGTH field value. For example, the in-band signaling information signaled and transmitted to at least one of the data PLP, the SI PLP, and the common PLP is decoded by the in-band signaling decoder of FIG. 25, and output to blocks that require the in-band signaling information.

According to an embodiment of the present invention, when a field S2 of a symbol P1 is 1, that is, when S2='xxx1', a T2_LENGTH field is signaled in a performed loop. According to an embodiment of the present invention, an FEF_TYPE field and a T2_LENGTH field are contained in the loop. In addition, this loop is referred to as a T2 LENGTH loop, and, according to an embodiment of the present invention, the T2 LENGTH loop is included in at least one of L1-pre signaling information, L1-post signaling information, and the in-band signaling information. Here, the L1-post signaling information may be configurable L1-post signaling information or dynamic L1-post signaling information.

Here, that a S2 field value of the symbol P1 is 'xxx1' means that a mixed type is used.

FIG. 32 illustrates a syntax structure of a T2 LENGTH loop according to an embodiment of the present invention. In FIG. 32, 4 bits are allocated to an FEF_TYPE field which indicates an FEF type.

30 bits are allocated to a T2_LENGTH field which indicates the number of elementary periods of an associated T2 frame.

According to the present invention, the T2_LENGTH field may not be used and a T2 frame length may be signaled through another replacement parameter. According to an embodiment of the present invention, the T2 frame length is signaled using at least one of FEF_INTERVAL, T2_NUM_DATA_SYMBOLS, T2_FEF_SIZE, and T2_GUARD_INTERVAL fields, instead of the T2_LENGTH field. According to an embodiment of the present invention, when an S1 field of the P1 symbol is 1, when S2='xxx1', FEF_TYPE, FEF_INTERVAL, T2_NUM_DATA_SYMBOLS, T2 FEF_SIZE, and T2_GUARD_INTERVAL fields are signaled to a performed T2_LENGTH loop. In addition, according to an embodiment of the present invention, the T2_LENGTH loop is included in at least one of L1-pre signaling information, L1-post signaling information, and in-band signaling information. At least one of the aforementioned methods may be applied as a method of signaling the in-band signaling information. That is, information included in the T2 LENGTH loop may be signaled to at least one of a data PLP, an SI PLP, and a common PLP by the in-band signaling/padding insertion module 603300.

FIG. 33 illustrates a syntax structure of a T2 LENGTH loop according to another embodiment of the present invention. When S2='xxx1', 4 bits are allocated to a FEF_TYPE field in the performed T2_LENGTH loop of FIG. 33, which indicates an FEF type. 8 bits are allocated to an FEF_INTERVAL field which indicates the number of T2 frames between two FEF parts. 12 bits are allocated to a T2_NUM_DATA_SYMBOLS field which indicates the number of data symbols except for symbols P1 and P2 from a T2 frame. When symbols AP1 are present in the corresponding T2 frame, the number of the symbol AP1 symbols is excluded. 3 bits are allocated to a T2_FFT_SIZE field which indicates an FET size of a T2 system. 3 bits are allocated to a T2_GUARD_INTERVAL field which indicates a guard interval size of a current T2 system. According to an embodiment of the present invention, 1 k, 2 k, 4 k, 8 k, 16 k, or 32 k is used as the FFT size, and 1/128, 1/32, 1/16, 19/256, 1/8, 19/128, or 1/4 is used as the GI size. The FFT size indicates the number of subcarriers constituting one OFDM symbol.

In FIG. 33, total 26 bits are used for fields. When fields are signaled like in FIG. 33, the same effect may be obtained using overhead that is 4 bits smaller than in FIG. 32 in which 30 bits of a T2_LENGTH field is directly signaled.

The receiver may extract FEF_INTERVAL, T2_NUM_DATA_SYMBOLS, T2_FFE_SIZE, and T2_GUARD_INTERVAL field values from a T2_LENGTH loop signaled to at least one of L1-pre signaling information, L1-post signaling information, and in-band signaling information, and recognize a T2 frame and an FEF structure through calculation using at least one of these values. That is, the receiver may recognize when a next FEF, that is, an NGH frame is shown based on the calculation result. For example, the number of T2 frames and the number of OFDM symbols in a T2 frame may be known during a T2 period (that is, between two FEFs) using a T2_NUM_DATA_SYMBOL field value and an FEF_INTERVAL field value. The number of OFDM symbols in the entire T2 period may be known based on the numbers. Then, a length of the T2 period in a correct time domain may be known using the T2_FEF_SIZE field value and the T2_GUARD_INTERVAL field value.

A method of signaling next NGH frame information when an NGH frame is transmitted to the FEF will now be described. In this case, all FEFs may be used as the NGH frame, but only some of the FEF may be used as the NGH frame. This is because other services other than services transmitted to the NGH frame may be transmitted through the FEF. Thus, according to an embodiment of the present invention, next NGH frame information is signaled. In particular, according to an embodiment of the present invention, information for identifying of a location of the NGH frame is signaled. When location information of a next NGH frame is not signaled, the receiver needs to know whether the NGH frame is present by continuously detecting the symbols P1 in all periods, which causes power consumption, low efficiency, and the like of the receiver.

A method of signaling next NGH frame information may be broadly classified into a dynamic method and a configurable method.

An embodiment of the present invention proposes two parameters for dynamically signaling next NGH frame information. The two parameters are NEXT_NGH_SUPERFRAME and NEXT_NGH_FRAME information. According to an embodiment of the present invention, among these, the NEXT_NGH_SUPERFRAME information is included in the form of field in at least one of the L1-pre signaling information, configurable L1-post signaling information, and in-band signaling information. Hereinafter, the NEXT_NGH_SUPERFRAME information will be referred to as a NEXT_NGH_SUPERFRAME field. In addition, according to an embodiment of the present invention, the NEXT_NGH_FRAME information is included in the form of field in at least one of L1-pre signaling information, dynamic L1-post signaling information, and in-band signaling information. Hereinafter, the NEXT_NGH_FRAME information will be referred to as a NEXT_NGH_FRAME field.

The NEXT_NGH_SUPERFRAME field indicates the number of superframe boundaries between a superframe to which a current NGH frame belongs and a superframe to which a next NGH frame belongs. When the NEXT_NGH_SUPERFRAME field is used, next NGH frame information may be signaled during a long period if possible.

The NEXT_NGH_FRAME field indicates the number of FEFs (or T2 frames) between a start part of a superframe to which a next NGH frame belongs and a next frame. In other words, the NEXT_NGH_FRAME field indicates the number of T2 frames or FEFs between a first T2 frame and a next NGH frame in a superframe to which a next NGH frame belongs.

When both the NEXT_NGH_SUPERFRAME field and the NEXT_NGH_FRAME field have a value of 0, a method of signaling the NGH frame may not be used. That is, according to the present invention, when the method of signaling the next NGH frame information is used, long latency may occur. In this regard, when both the NEXT_NGH_SUPERFRAME field and the NEXT_NGH_FRAME field have a value of 0, such long latency does not occur and a method of detecting a symbol P1 is used.

Figure 34:
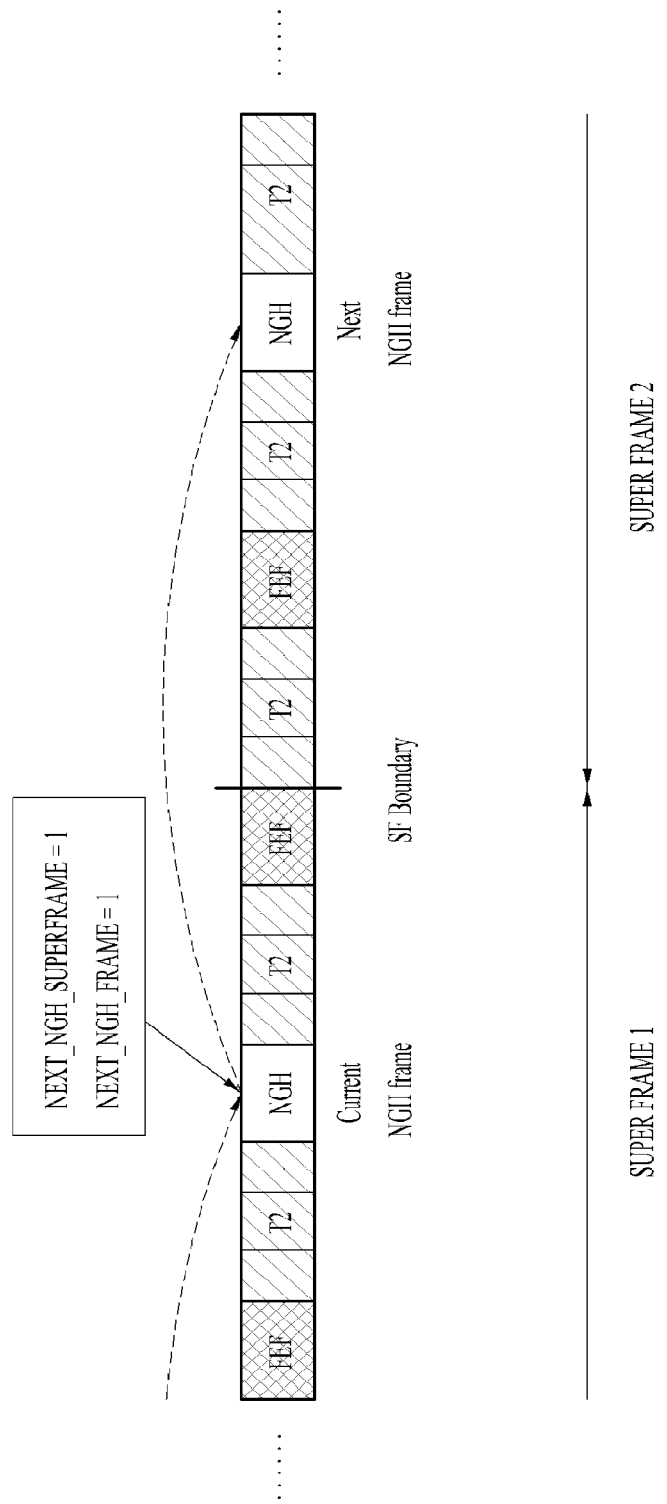
FIG. 34 illustrates a method for dynamically signaling next NGH frame information according to an embodiment of the present invention.

FIG. 34 illustrates a frame structure of a method of dynamically signaling next NGH frame information according to an embodiment of the present invention and illustrates that an NGH frame is included in each of a superframe 1 and a superframe 2. In this case, a current NGH frame and a next NGH frame include one superframe boundary therebetween, and thus, the NEXT_NGH_SUPERFRAME field may have a value 1. In addition, one FEF is present between a start part of the superframe 2 including the next NGH frame and the next NGH frame, and thus, the NEXT_NGH_FRAME may also have a value of 1.

As described above, when the next NGH frame information is signaled using the NEXT_NGH_SUPERFRAME field, configuration information regarding a superframe including the next NGH frame other than the next NEXT_NGH_SUPERFRAME information needs to be transmitted. The frame configuration information may be signaled to at least one of L1-pre signaling information, configurable L1-post signaling information, dynamic L1-post signaling information, and in-band signaling information. For example, when the frame configuration information is signaled to at least one of the L1-pre signaling information and the configurable L1-post signaling information and is transmitted, the corresponding information is commonly and repeatedly transmitted to all NGH frames in one superframe, and thus, this method is disadvantageous in terms of high overhead. When the frame configuration information is signaled to at least one of the dynamic L1-post signaling information, and in-band signaling information, if frame configuration is changed at a superframe boundary, that is, when L1_CHANGE_COUNTER is set to 1, configuration information of a next superframe is transmitted from a last NGH frame of a current superframe. Thus, in this case, overhead is not significantly increased. However, dynamic L1-post signaling information and a field of in-band signaling information are changed only when a value of the L1_CHANGE_COUNTER field is 1. Thus, the characteristics of a constant field length in each superframe are lost. That is, the dynamic L1-post signaling information and the constant field length of the in-band signaling information are not ensured. Here, the frame configuration information may include information regarding a guard interval, a FFT size, and a next T2 frame length. The receiver may recognize configuration of a next superframe using frame configuration information, NEXT_NGH_SUPERFRAME, and NEXT_NGH_FRAME information which are signaled to at least one of the L1-pre signaling information, configurable L1-post signaling information, dynamic L1-post signaling information, and in-band signaling information, and access a next NGH frame.

As a method of dynamically next NGH frame information according to another embodiment of the present invention, next NGH frame information may be signaled using only the NEXT_NGH_FRAME information. That is, the NEXT_NGH_SUPERFRAME information is not used. In this case, the case in which the next NGH frame is present in a superframe having different configuration does not have to be considered, and configuration information regarding a next superframe does not have to be transmitted. In this case, a definition of the NEXT_NGH_FRAME field is different from in the first embodiment. That is, according to the present embodiment, the NEXT_NGH_FRAME field indicates a value obtained by adding 1 to the number of FEFs between a current NGH frame and the next NGH frame. According to an embodiment of the present invention, the NEXT_NGH_FRAME field is signaled to at least one of the dynamic L1-post signaling information and in-band signaling information. When the NEXT_NGH_FRAME field has a value of 0, a method of signaling the next NGH frame information is not used. That is, according to the present invention, when the NEXT_NGH_FRAME field has a value of 0, a method of detecting a symbol P1 is used.

Figure 35:
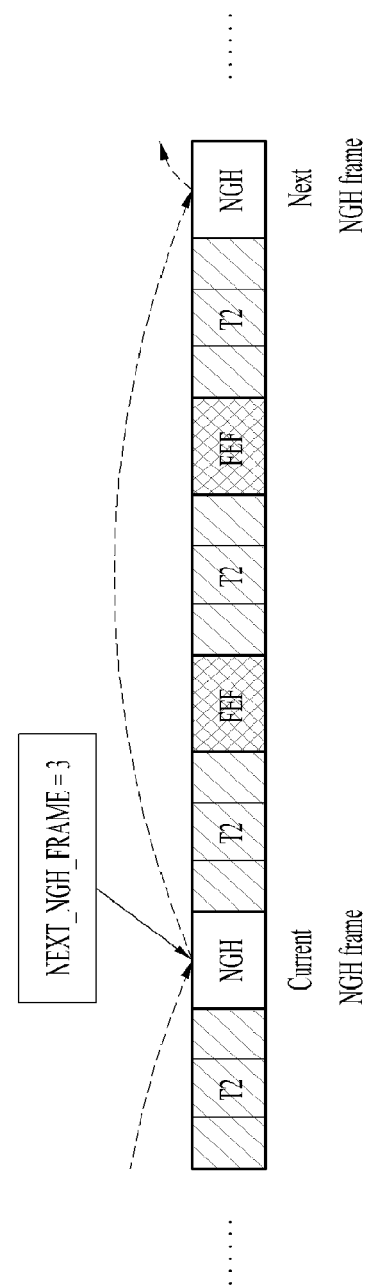
FIG. 35 illustrates a method for dynamically signaling next NGH frame information according to another embodiment of the present invention.

FIG. 35 illustrates a frame structure of a method of dynamically signaling next NGH frame information according to another embodiment of the present invention and illustrates that a current NGH frame and a next NGH frame include two FEFs therebetween. In this case, a NEXT_NGH_FRAME field is obtained by adding 1 to the number of the FEFs between the current NGH frame and the next NGH frame, and thus, is 3. The receiver may recognize a location of the next NGH frame using the NEXT_NGH_FRAME field value and length information of T2 and FEF periods.

The method of dynamically signaling the NGH frame information, which has been described thus far, is flexible. However, NGH frames are not equally distributed, and thus, signaling overhead and complexity are increased.

Hereinafter, a method of configurably signaling next NGH frame information will be described with regard to the present invention. The present invention proposes a configurable method for easy access as a deterministic method by equally mapping NGH frames in one superframe or using irregular and arithmetic calculation.

Signaling information for deterministically positioning NGH frames in one superframe is the same in a superframe, and thus, the signaling information may be signaled to at least one of L1-pre signaling information and configurable L1-post signaling information. In this case, overhead and complexity of the dynamic L1-post signaling information are not increased.

The deterministic NGH frame structure may have various types, which will be described with regard to two embodiments of the present invention.

According to a first embodiment of the present invention, the deterministic NGH frame structure use at least one of FIRST_FRAME_IDX, NUM_NGH_FRAMES, and NGH_FRAME_JUMP information (or parameter). According to an embodiment of the present invention, the FIRST_FRAME_IDX, NUM_NGH_FRAMES, and NGH_FRAME_JUMP information is signaled in the form of field to at least one of L1-pre signaling information and configurable L1-post signaling information. Then, the FIRST_FRAME_IDX, NUM_NGH_FRAMES, and NGH-FRAME_JUMP information will be referred to as FIRST_FRAME_IDX, NUM_NGH_FRAMES, and NGH-FRAME_JUMP fields, respectively.

The FIRST_FRAME_IDX field indicates an index of a first NGH frame in a superframe, and the NUM_NGH_FRAMES field indicates the number of NGH frames included in the superframe. The NGH_FRANE_JUMP field indicates 'the number of FEFs +1' as an NGH frame gap in the superframe, that is, a gap between NGH frames. The receiver may recognize a structure of the NGH frame in the superframe based on at least one of the FIRST_FRAME_IDX, NUM_NGH_FRAMES, and NGH-FRAME_JUMP fields, which are signaled to at least one of the L1-pre signaling information and configurable L1-post signaling information.

Figure 36:
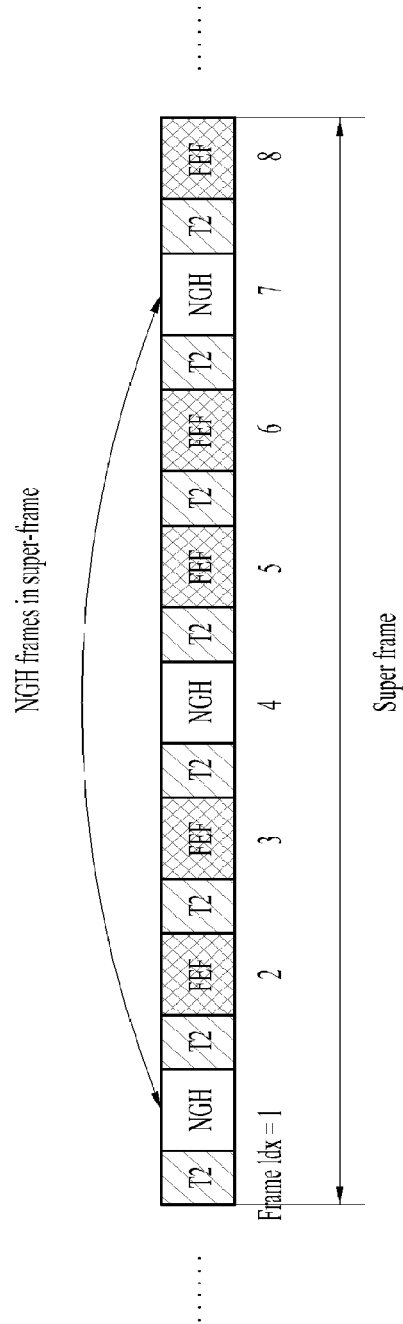
FIG. 36 illustrates a method for configurably signaling next NGH frame information according to an embodiment of the present invention.

FIG. 36 illustrates a frame structure of a method of configurably signaling next NGH frame information according to the present invention and illustrates an example in which two FEFs are included between two NGH frames and three NGH frames are included in one superframe. In FIG. 36, a FIRST_FRAME_IDX field value is set to 1 and a first NGH frame in the superframe is started as idx 1. In addition, a NUM_NGH_FRAMES field value indicating the number of NGH frames included in the superframe is 3 and an NGH_FRAME_JUMP field value indicating a gap between NGH frames is also 3.

According to a second embodiment of the present invention of the deterministic NGH frame structure, deterministic and arithmetic calculation is performed using at least one of NUM_FEF and NUM_NGH_FRAME information (or parameters). According to an embodiment of the present invention, the NUM_FEF and NUM_NGH_FRAME information are signaled in the form of field to at least one of L1-pre signaling information and configurable L1-post signaling information. Hereinafter, the NUM_FEF information is referred to as a NUM_FEF field and the NUM_NGH_FRAME information is referred to as a NUM_NGH_FRAME field.

The NUM_FEF field indicates the number of FEFs (including NGH frames) in the superframe, and the NUM_NGH_FRAMES field indicates the number of NGH frames in the superframe. In this method, the NGH frames in the superframe are mapped based on only values of the NUM_FEF field and NUM_NGH_FRAME field. The receiver may correctly recognize a location of a NGH frame positioned in the superframe using a deterministic function and the values of the NUM_FEF and NUM_NGH_FRAMES fields signaled to at least one of L1-pre signaling information and configurable signaling information.

Figure 37:
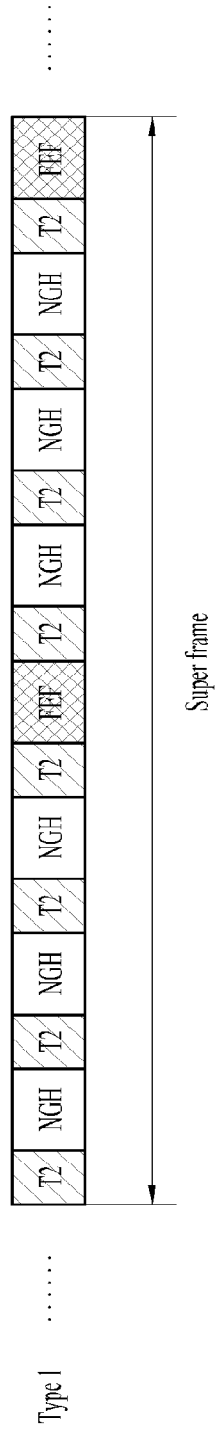
FIG. 37(A) and FIG. 37(B) illustrate a method for configurably signaling next NGH frame information according to another embodiment of the present invention.
Figure 37:
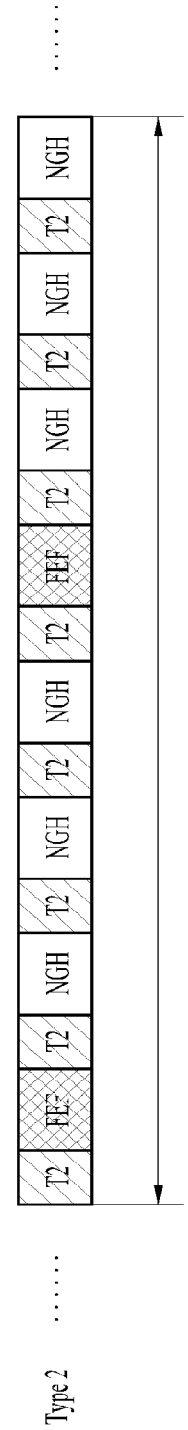

FIGS. 37(A) and 37(B) illustrate frame structures of a method of signaling of configurably signaling next NGH frame information according to the present invention and illustrates and illustrate two types of examples. That is, both the two types indicate an example in which NGH frames are regularly distributed in a superframe. In other words, the NGH frames are deterministically and regularly mapped based on the values of the NUM_FEF field and NUM_NGH_FRAME field. FIGS. 37(A) and 37(B) show examples in which the NUM_FEF field has a value of 8 and the NUM_NGH_FRAMES field has a value of 6.

In addition, in a superframe using the deterministic function, when the values of the NUM_FEF field and NUM_NGH_FRAMES field are applied to Equation 2 below, a frame index at which an NGH frame is positioned in a superframe may be calculated.

$$A(0) = 0;$$ [Equation 2]

$$\text{for } i = 1, \ldots, N_{NGH} \{$$

$$A(i) = A(i-1) + \left\lfloor \frac{N_{FEF}}{N_{NGH}} \right\rfloor;$$

$$\text{if } (i \le N_{FEF} \bmod N_{NGH}) \{$$

$$A(i) = A(i) + 1;$$

$$\}$$

$$\}$$

$$N_{FEF} = \text{NUM\_FEF}$$

$$N_{NGH} = \text{NUM\_FNGH\_FRAMES}$$

In Equation 2 above, A(i) indicates a frame index for an ith NGH frame in the superframe.

For example, as illustrated in FIG. 38(A), when NGH frames are deterministic and regularly mapped in the superframe, if a NUM_FEF field value (=8) and a NUM_NGH_FRAMES field value (=3) are applied to Expression 2 above, values A(1)=3, A(2)=6, and A(3)=8 may be obtained, which means that three NGH frames are positioned in third FEF, sixth FEF, and eighth FEF in the superframe having 8 FEFs. FIG. 38(B) illustrates an example of a structure of a superframe having a similar type to FIG. 38(A).

Hereinafter, a method of signaling the number of subslices constituting a frame will be described. The number of the subslices constituting the frame may be signaled in the form of field to at least one of configurable L1-post signaling information and dynamic L1-post signaling information. Throughout this specification, this field will be referred to as a SUBSLICES_PER_FRAME field. That is, the SUB-SLICES_PER_FRAME field indicates the number of the subslices constituting the frame.

For example, when the SUBSLICES_PER_FRAME field is signaled to the configurable L1-post signaling information, frames constituting one superframe have the same number of subslices.

As another example, when the SUBSLICES_PER_FRAME field is signaled to dynamic L1-post signaling information, frames may have different numbers of subslices. Thus, independent subslice structures may be included in frame units.

The receiver may recognize a structure of subslices constituting each frame using a value of the SUBSLICES_PER_FRAME field signaled to at least one of the configurable L1-post signaling information and the dynamic L1-post signaling information. In addition, the receiver may decode type 2 data PLP mapped to the frame using the structure of the subslices.

According to an embodiment of the present invention, the method of signaling in-band signaling information, which has been described thus far, is performed by the in-band signaling/padding insertion module 603300. The in-band signaling/padding insertion module 603300 signals the in-band signaling information to at least one of data PLP, SI PLP, and common PLP. The in-band signaling information may include information required to decode corresponding PLP from a next signal frame. For example, the in-band signaling information may include at least one of next interleaving frame information, T2 frame length information, and next NGH frame information, which may constitute an embodiment of the present invention. In addition, the in-band signaling information may include at least one of dynamic L1-post signaling information.

According to an embodiment of the present invention, when data of both a base layer and an enhancement layer are transmitted, in-band signaling information of both the base layer and enhancement layer is transmitted to base layer service components, and the in-band signaling information is not signaled to enhancement layer service components. The in-band signaling information is extracted or decoded by the in-band signaling decoder of FIG. 25. The method of signaling the in-band signaling information has been described in detail, and a detailed description thereof is omitted here. According to an embodiment of the present invention, L1-signaling information including L1-pre signaling information, configurable L1-post signaling information, and dynamic L1-post signaling information is performed by the L1 signaling generator 603500 of FIG. 15. In this case, according to an embodiment of the present invention, the L1 signaling generator 603500 associate operates with the scheduler 603100 of FIG. 15 and the frame builder 101400. In addition, the receiver extracts or decodes the L1 signaling information by the L1 signaling decoder 617410 of FIG. 25. Here, according to an embodiment of the present invention, the L1 signaling decoder 617410 associate operates with a cell demapper of the frame parser 107200.

FIG. 39 is a flowchart of a method of signaling and transmitting in-band signaling information by a broadcast signal transmitter according to the present invention. First, in-band signaling information is signaled to at least one of a service component PLP including at least one service component constituting a broadcast service, a first information PLP including first service information applied to one broadcast service, and a second information PLP including second service information commonly applied to various broadcast services (S700010). Here, the step S700010 is performed by at least one of a plurality of in-band signaling/ padding insertion modules according to control of the scheduler 603100 of the input processing module 101200. According to an embodiment of the present invention, the first information PLP will be referred to as SI PLP (or base PLP) and the second information is referred to as common PLP. The method of signaling the in-band signaling information has been described in detail, and thus, a detailed description thereof is omitted.

When in-band signaling information is signaled to at least one of the service component PLP, the first information PLP, and the second information PLP, data included in each of the PLPs is FEC encoded and time interleaved (S700020). According to an embodiment of the present invention, the in-band signaling information includes information regarding a next interleaving frame of each of the PLPs, and the interleaving frame is a unit in which time interleaving is performed. In the step S700020, the FEC encoding is performed by an EFC encoder of the BICM encoder 101300 and the time interleaving is performed by a time interleaver. Detailed operations of the FEC encoding and time interleaving are understood with reference to FIG. 16 or 17, and thus, a detailed description thereof is omitted.

In addition, a transmission frame including the time-interleaved data is generated (S700030), the transmission frame is modulated, and then, a broadcast signal including the modulated transmission frame is transmitted (S700040). According to an embodiment of the present invention, the transmission frame is one of a T2 frame and an NGH frame, and the in-band signaling information includes length information of the T2 frame. The in-band signaling information may further include information of a next NGH frame. The step S700030 is performed by the frame builder 101400, and detailed operations thereof are understood with reference to FIG. 18, and thus, a detailed description thereof is omitted. The step S700040 is performed by the OFDM generator 101500, detailed operations thereof are understood with reference to FIG. 19, and thus, a detailed description thereof is omitted. The OFDM generator 101500 may also be referred to as a modulator.

According to an embodiment of the present invention, when a plurality of service component PLPs are used, if the plural service component PLPs include a base layer service component PLP and an enhancement layer service component PLP, the base layer component PLP includes in-band signaling information of the enhancement layer service component PLP.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

MODES FOR INVENTION

Details about modes for the present invention have been described in the above best mode.

INDUSTRIAL APPLICABILITY

As described above, the present invention can be wholly or partially applied to digital broadcast systems.

The invention claimed is:

1. A method for receiving a broadcast signal by an apparatus for receiving a broadcast signal, the method comprising:

receiving the broadcast signal including a frame;
detecting a first Orthogonal Frequency Division Multiplexing (OFDM) symbol and a second OFDM symbol in front of the frame;
demodulating data of the frame by an OFDM method;
parsing the frame including first layer data of a first physical layer pipe (PLP), second layer data of a second PLP and signaling data;
decoding the signaling data; and
decoding the first layer data and the second layer data,
wherein a postfix of the first OFDM symbol and a prefix of the second OFDM symbol are sequentially positioned in the time domain,
wherein the signaling data includes type information only for the first PLP including the first layer data, and the signaling data does not include type information for the second PLP including the second layer data.

2. The method of claim 1, wherein the type information indicates whether sub-slicing is used for the first PLP including the first layer data.

3. The method of claim 1, wherein the postfix of the first OFDM symbol carries a frequency shifted part of the first OFDM symbol and the prefix of the second OFDM symbol carries a frequency shifted part of the second OFDM symbol.

4. The method of claim 3, wherein the postfix of the first OFDM symbol and the prefix of the second OFDM symbol are frequency shifted with same frequency shift value.

5. The method of claim 1, wherein a length of the postfix of the first OFDM symbol is different from a length of the prefix of the second OFDM symbol.

6. An apparatus for receiving a broadcast signal, the apparatus comprising:

a tuner to receive the broadcast signal including a frame;
a detector to detect a first Orthogonal Frequency Division Multiplexing (OFDM) symbol and a second OFDM symbol in front of the frame;
a demodulator to demodulate data of the frame by an OFDM method;
a frame parser to parse the frame including first layer data of a first physical layer pipe (PLP), second layer data of a second PLP and signaling data;
a first decoder to decode the signaling data; and
a second decoder to decode the first layer data and the second layer data,
wherein a postfix of the first OFDM symbol and a prefix of the second OFDM symbol are sequentially positioned in the time domain,
wherein the signaling data includes type information only for the first PLP including the first layer data, and the signaling data does not include type information for the second PLP including the second layer data.

7. The apparatus of claim 6, wherein the type information indicates whether sub-slicing is used for the first PLP including the first layer data.

8. The apparatus of claim 6, wherein the postfix of the first OFDM symbol carries a frequency shifted part of the first OFDM symbol and the prefix of the second OFDM symbol carries a frequency shifted part of the second OFDM symbol.

9. The apparatus of claim 8, wherein the postfix of the first OFDM symbol and the prefix of the second OFDM symbol are frequency shifted with same frequency shift value.

10. The apparatus of claim 6, wherein a length of the postfix of the first OFDM symbol is different from a length of the prefix of the second OFDM symbol.

* * * * *

UNITED STATES PATENT AND TRADEMARK OFFICE
CERTIFICATE OF CORRECTION

PATENT NO. : 10,158,453 B2
APPLICATION NO. : 15/706441
DATED : December 18, 2018
INVENTOR(S) : Woosuk Ko et al.

It is certified that error appears in the above-identified patent and that said Letters Patent is hereby corrected as shown below:

After Column 40, Line 47, add:
--L1 signal is broadly classified into L1-pre signal and L1-post signal (including L1-configuration signal and L1-dynamic signal). In this regard, the L1-pre signal has a fixed length, and thus, the signal is transmitted using modcod parameters determined at a predetermined position in a transmission frame, and thus, a separate signaling parameter is not required to decode spread L1-pre signal. An L1-post part may be changed according to configuration of a transmitted service, and thus, parameters required to decode L1-post signal in L1-pre signal.
L1 signaling is broadly classified into preamble, L1-pre signaling, L1-configuration signaling, L1-dynamic signaling, and in-band signaling. The preamble transmits system signal detection and most elementary parameters (FFT, MIMO, etc.). L1-pre signaling transmits parameters (System ID, L1 Modcod, etc.) required to decode the remaining L1 signals. The L1-configuration signaling transmits Parameters (PLP ID, PLP Modcod, etc.) having a predetermined value in one superframe. The L1-dynamic signaling transmits parameters (PLP start address, PLP type, etc.) that are changed every frame. The In-band signaling is transmitted in a data PLP and transmits L1-dyn signal required to decode a corresponding PLP in a next transmission frame.--

Signed and Sealed this
Eighth Day of December, 2020

Andrei Iancu
*Director of the United States Patent and Trademark Office*

UNITED STATES PATENT AND TRADEMARK OFFICE
CERTIFICATE OF CORRECTION

PATENT NO. : 10,158,453 B2
APPLICATION NO. : 15/706441
DATED : December 18, 2018
INVENTOR(S) : Ko et al.

Page 1 of 1

It is certified that error appears in the above-identified patent and that said Letters Patent is hereby corrected as shown below:

In the Claims

Column 54, Line 4, of Claim 1, replace "in front" with --in the front--.
Column 54, Line 36, of Claim 6, replace "in front" with --in the front--.

Signed and Sealed this
Sixth Day of September, 2022

Katherine Kelly Vidal
*Director of the United States Patent and Trademark Office*